United States Patent
Ikeda et al.

(10) Patent No.: US 11,761,895 B2
(45) Date of Patent: Sep. 19, 2023

(54) INFORMATION PROCESSING APPARATUS AND MICROSCOPE SYSTEM

(71) Applicant: Sony Group Corporation, Tokyo (JP)

(72) Inventors: Kenji Ikeda, Kanagawa (JP); Noriyuki Kishii, Kanagawa (JP); Hideya Chubachi, Kanagawa (JP); Ayumu Taguchi, Tokyo (JP); Kazuhiro Nakagawa, Saitama (JP); Sakiko Yasukawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/296,197

(22) PCT Filed: Feb. 26, 2020

(86) PCT No.: PCT/JP2020/007882
§ 371 (c)(1),
(2) Date: May 21, 2021

(87) PCT Pub. No.: WO2020/179586
PCT Pub. Date: Sep. 10, 2020

(65) Prior Publication Data
US 2021/0396675 A1 Dec. 23, 2021

(30) Foreign Application Priority Data

Mar. 4, 2019 (JP) .................................. 2019-038500
Feb. 6, 2020 (JP) .................................. 2020-018466

(51) Int. Cl.
*G01N 21/64* (2006.01)
*G02B 21/16* (2006.01)
*G02B 21/36* (2006.01)

(52) U.S. Cl.
CPC ..... *G01N 21/6428* (2013.01); *G01N 21/6458* (2013.01); *G02B 21/16* (2013.01); *G02B 21/365* (2013.01); *G01N 2021/6439* (2013.01)

(58) Field of Classification Search
None
See application file for complete search history.

(56) References Cited

U.S. PATENT DOCUMENTS 6,278,521 B1    8/2001  Jablonski et al.
2012/0056103 A1  3/2012  Sakai
(Continued)

FOREIGN PATENT DOCUMENTS

EP    2426481 A1    3/2012
EP    2664667 A1    11/2013
(Continued)

OTHER PUBLICATIONS

International Search Report and English translation thereof dated Jun. 2, 2020 in connection with International Application No. PCT/JP2020/007882.

(Continued)

*Primary Examiner* — Xiaoyun R Xu
(74) *Attorney, Agent, or Firm* — Wolf, Greenfield & Sacks, P.C.

(57) ABSTRACT

It is possible to more appropriately perform fluorescence separation. An information processing apparatus according to an embodiment includes: a fluorescence signal acquisition unit (112) that acquires a plurality of fluorescence spectra corresponding to each of a plurality of excitation lights having different wavelengths and irradiated to a fluorescence stained specimen (30), the fluorescence stained specimen (30) being created by staining a specimen (20) with a fluorescence reagent (10); a link unit (131) that generates a linked fluorescence spectrum by linking at least parts of the (Continued)

plurality of fluorescence spectra to each other in a wavelength direction; a separation unit (132) that separates the linked fluorescence spectrum into spectra for every fluorescent substance using a reference spectrum including a linked autofluorescence reference spectrum in which spectra of autofluorescent substances in the specimen are linked to each other in the wavelength direction and a linked fluorescence reference spectrum in which spectra of fluorescent substances in the fluorescence stained specimen are linked to each other in the wavelength direction; and an extraction unit (132) that updates the linked autofluorescence reference spectrum using the spectra for every fluorescent substance separated by the separation unit.

17 Claims, 34 Drawing Sheets

(56) References Cited

U.S. PATENT DOCUMENTS

| | | | |
|---|---|---|---|
| 2012/0242859 | A1 | 9/2012 | Sasaki |
| 2013/0288351 | A1 | 10/2013 | Nitta |

FOREIGN PATENT DOCUMENTS

| | | | |
|---|---|---|---|
| EP | 3043168 | A1 | 7/2016 |
| EP | 3 229 000 | A1 | 10/2017 |
| JP | 2012-018108 | A | 1/2012 |
| JP | 2012-052985 | A | 3/2012 |
| JP | 2012-143204 | A | 8/2012 |
| WO | WO 2011/063032 | A1 | 5/2011 |
| WO | WO 2011/074448 | A1 | 6/2011 |

OTHER PUBLICATIONS

Written Opinion and English translation thereof dated Jun. 2, 2020 in connection with International Application No. PCT/JP2020/007882.

International Preliminary Report on Patentability and English translation thereof dated Sep. 16, 2021 in connection with International Application No. PCT/JP2020/007882.

Extended European Search Report dated Feb. 21, 2022 in connection with European Application No. 20766993.8.

Futamura et al., Novel full-spectral flow cytometry with multiple spectrally-adjacent fluorescent proteins and fluorochromes and visualization of in vivo cellular movement. Cytometry Part A. Sep. 2015;87(9):830-42.

Lafi et al., A spectroscopic approach based on Non-negative Matrix Factorization method for multispectral fluorescence images unmixing. IEEE 2nd International Conference on Advanced Technologies for Signal and Image Processing (ATSIP). Mar. 21, 2016:375-80.

Woolfe et al., Autofluorescence Removal by Non-Negative Matrix Factorization. IEEE Transactions on Image Processing. Apr. 1, 2011;20(4):1085-93.

FIG. 2
A
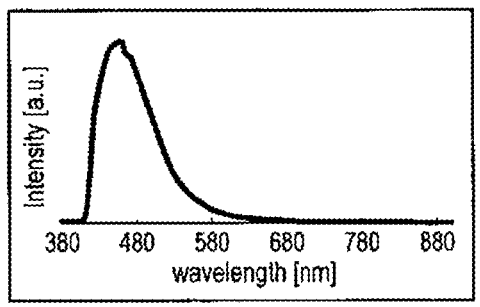
B
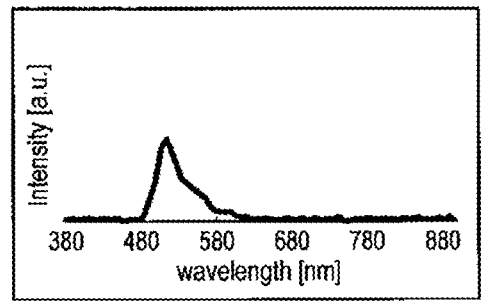
C
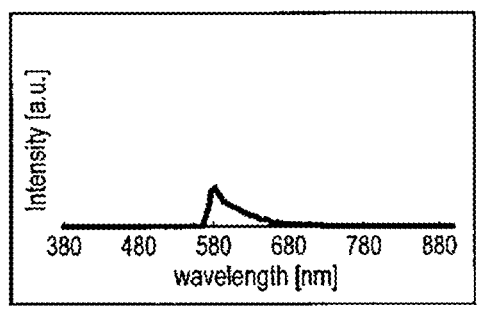
D
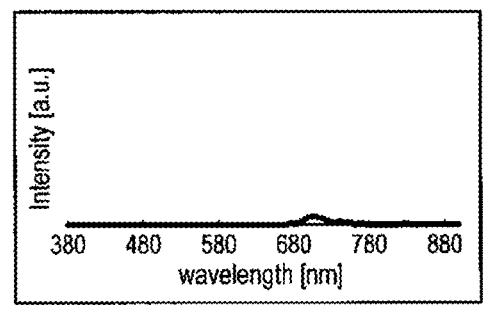

$$N \begin{array}{|c|} \hline A \\ \hline \end{array} M = N \begin{array}{|c|} \hline W \\ \hline \end{array} k * k \begin{array}{|c|} \hline H \\ \hline \end{array} M + N \begin{array}{|c|} \hline D \\ \hline \end{array} M$$

FIG. 40
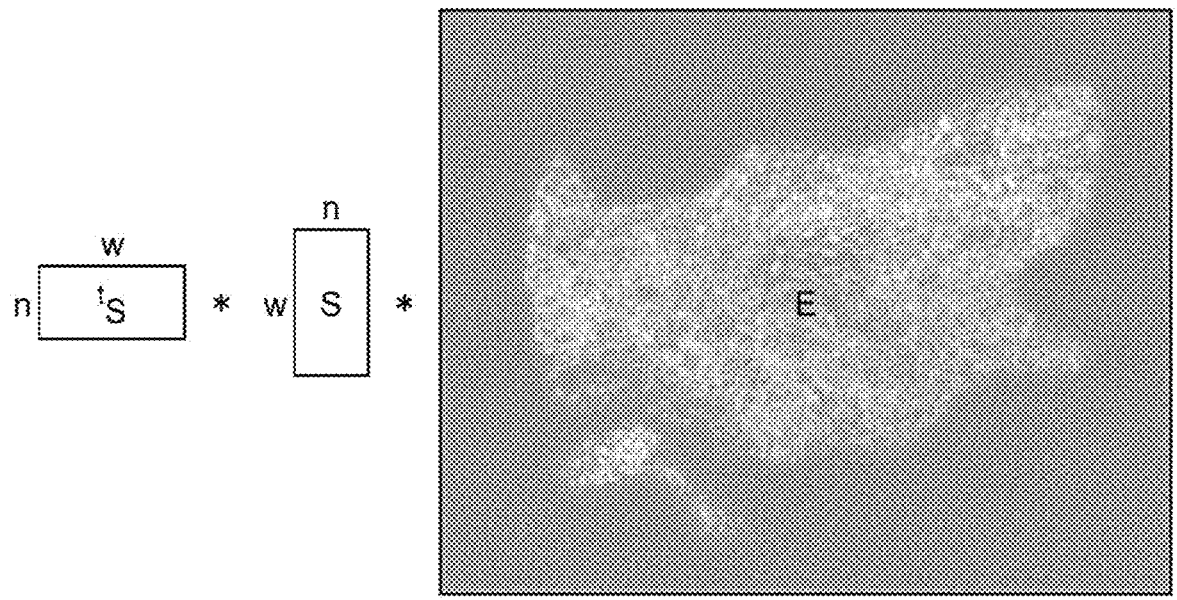
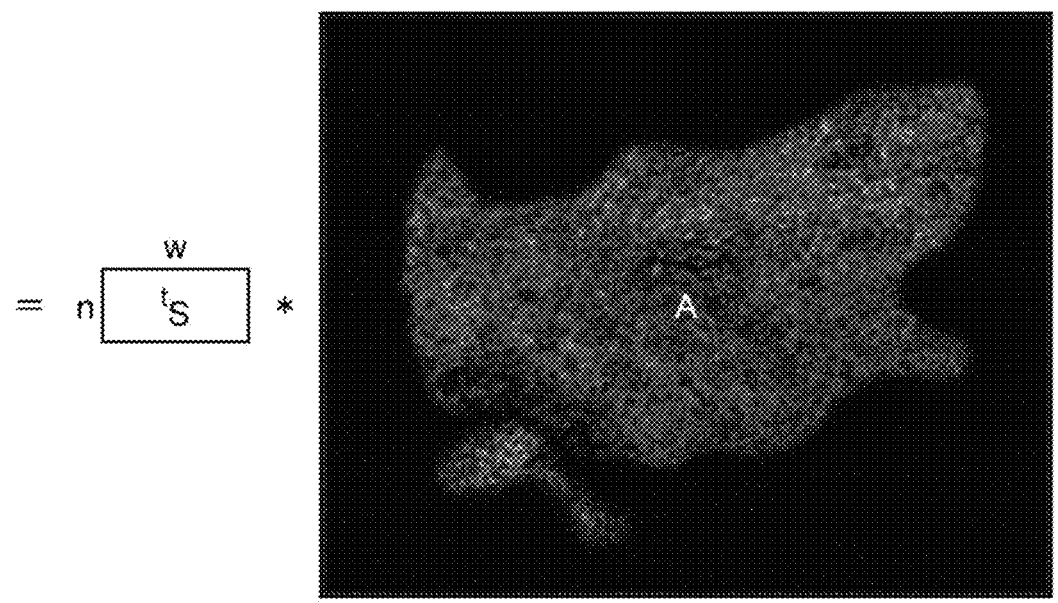

INFORMATION PROCESSING APPARATUS AND MICROSCOPE SYSTEM

CROSS-REFERENCE TO RELATED APPLICATIONS

This application claims the benefit under 35 U.S.C. § 371 as a U.S. National Stage Entry of International Application No. PCT/JP2020/007882, filed in the Japanese Patent Office as a Receiving Office on Feb. 26, 2020, which claims priority to Japanese Patent Application Number JP2020-018466, filed in the Japanese Patent Office on Feb. 6, 2020 and Japanese Patent Application Number JP2019-038500, filed in the Japanese Patent Office on Mar. 4, 2019, each of which is hereby incorporated by reference in its entirety.

TECHNICAL FIELD

The present disclosure relates to an information processing apparatus and a microscope system.

BACKGROUND ART

In recent years, with the development of cancer immunotherapy and the like, fluorescence and multiple labeling of immunostaining have progressed. For example, a method of extracting an autofluorescence spectrum from a non-stained section of the same tissue block, and then performing fluorescence separation of a stained section using the autofluorescence spectrum has been performed.

Furthermore, for example, Patent Document 1 below discloses a technology of approximating fluorescence spectra obtained by irradiating microparticles multi-labeled with a plurality of fluorescent pigments with an excitation light by the linear sum of single-stained spectra obtained by microparticles individually labeled with each fluorescent pigment.

CITATION LIST

Patent Document

Patent Document 1: Japanese Patent Application Laid-Open No. 2012-18108

SUMMARY OF THE INVENTION

Problems to be Solved by the Invention

However, according to these technologies or methods, there were cases where fluorescence separation cannot be appropriately performed. For example, in a case where an autofluorescence spectrum is extracted from a non-stained section of the same tissue block and fluorescence separation of a stained section is then performed using the autofluorescence spectrum, a practitioner is required to extract the autofluorescence spectrum from an appropriate space in the non-stained section, and thus, accuracy of fluorescence separation depends on a work performed by the practitioner. Furthermore, since the fluorescence separation is performed for every excitation wavelength, a separation result is output for every excitation wavelength, such that a spectrum obtained as the separation result is not uniquely determined.

Therefore, the present disclosure has been made in view of the circumstance described above, and provides a new and improved information processing apparatus and a microscope system capable of more appropriately performing fluorescence separation.

Solutions to Problems

According to an embodiment of the present disclosure, an information processing apparatus includes: a fluorescence signal acquisition unit that acquires a plurality of fluorescence spectra corresponding to each of a plurality of excitation lights having different wavelengths and irradiated to a fluorescence stained specimen, the fluorescence stained specimen being created by staining a specimen with a fluorescence reagent; a link unit that generates a linked fluorescence spectrum by linking at least parts of the plurality of fluorescence spectra to each other in a wavelength direction; a separation unit that separates the linked fluorescence spectrum into spectra for every fluorescent substance using a reference spectrum including a linked autofluorescence reference spectrum in which spectra of autofluorescent substances in the specimen are linked to each other in the wavelength direction and a linked fluorescence reference spectrum in which the spectra of the fluorescent substances in the fluorescence stained specimen are linked to each other in the wavelength direction; and an extraction unit that updates the linked autofluorescence reference spectrum using the spectra for every fluorescent substance separated by the separation unit.

BRIEF DESCRIPTION OF DRAWINGS

FIG. 2 is a diagram illustrating a specific example of a fluorescence spectrum acquired by a fluorescence signal acquisition unit.

FIG. 40 is a diagram for describing processing executed by the processing unit in each step in FIG. 37 (part 3).

MODE FOR CARRYING OUT THE INVENTION

Figure 1:
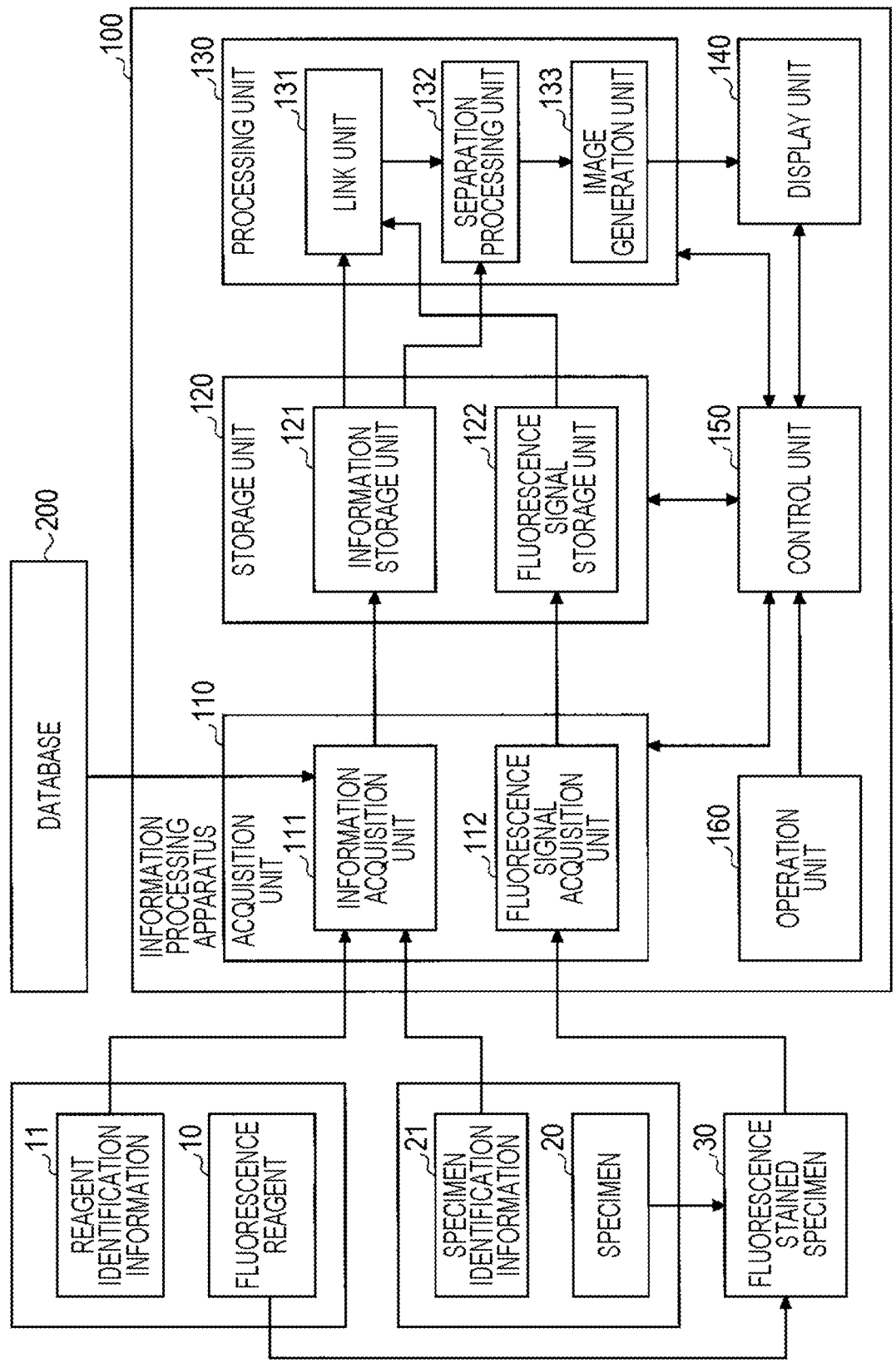
FIG. 1 is a block diagram illustrating a configuration example of an information processing system according to a first embodiment.

Hereinafter, preferred embodiments of the present disclosure will be described in detail with reference to the accompanying drawings. Note that in the present specification and the drawings, components having substantially the same functional configuration will be denoted by the same reference numerals and an overlapping description will be omitted.

Note that a description will be given in the following order.

1. First Embodiment
1.1. Configuration example
1.2. Flow example of processing
2. Second Embodiment
2.1. Flow example of processing
2.2. Reason why principal component analysis (PCA) is not suitable as method of extracting linked autofluorescence reference spectrum from non-stained section
2.3. Application example
3. Modification
4. Third Embodiment
5. Fourth Embodiment
5.1. Fixing method of stained fluorescence spectrum in minimization of mean squared residual D using recurrence formula
5.2. Fixing method of stained fluorescence spectrum in minimization of mean squared residual D using a DFP method, a BFGS method, or the like
6. Fifth Embodiment
6.1. Outline of processing by processing unit
6.2. Configuration example of measurement system
6.3. Operation example
6.4.1. First modification
6.4.2. Second modification
6.5. Effect
7. Hardware configuration example
8. Conclusion

1. First Embodiment

First, a first embodiment of the present disclosure will be described.

(1.1. Configuration Example)

A configuration example of an information processing system according to the present embodiment will be described with reference to FIG. 1. As illustrated in FIG. 1, the information processing system according to the present embodiment includes an information processing apparatus 100 and a database 200, and there are a fluorescence reagent 10, a specimen 20, and a fluorescence stained specimen 30 as inputs to the information processing system.

(Fluorescence Reagent 10)

The fluorescence reagent 10 is a chemical used for staining the specimen 20. The fluorescence reagent 10 is, for example, a fluorescent antibody (including a primary antibody used for direct labeling or a secondary antibody used for indirect labeling), a fluorescent probe, a nuclear staining reagent, or the like, but is a type of the fluorescence reagent 10 is not limited thereto. Furthermore, the fluorescence reagent 10 is managed by attaching identification information (hereinafter referred to as "reagent identification information 11") capable of identifying the fluorescence reagent 10 (or a production lot of the fluorescence reagent 10) to the fluorescence reagent 10. The reagent identification information 11 is, for example, barcode information or the like (one-dimensional barcode information, two-dimensional barcode information, or the like), but is not limited thereto. A property of the fluorescence reagent 10 differs for every production lot depending on a production method, a state of a cell from which an antibody is acquired, and the like, even though products are the same as each other. For example, in the fluorescence reagent 10, a spectrum, a quantum yield, a fluorescent labeling rate, or the like, differs for every production lot. Therefore, in the information processing system according to the present embodiment, the fluorescence reagent 10 is managed for every production lot by attaching the reagent identification information 11 to the fluorescence reagent 10. Therefore, the information processing apparatus 100 can perform fluorescence separation in consideration of a slight difference in a property that appears for every production lot.

(Specimen 20)

The specimen 20 is prepared for the purpose of pathological diagnosis and the like from a clinical specimen or a tissue sample collected from a human body. The specimen 20 may be a tissue section, a cell, or a fine particle, and with respect to the specimen 20, a type of used tissue (for example, an organ or the like), a type of target disease, an attribute (for example, an age, a gender, a blood type, a race, or the like) of a target person, or a lifestyle (for example, eating habits, exercise habits, smoking habits, or the like) of the target person is not particularly limited. Note that the tissue section can include, for example, a section before staining of a tissue section to be stained (hereinafter also simply referred to as a section), a section adjacent to a stained section, a section different from the stained section in the same block (sampled from the same place as that of the stained section), a section in a different block (sampled from a place different from that of the stained section) in the same tissue, a section collected from a different patient, or the like. Furthermore, the specimen 20 is managed by attaching identification information (hereinafter referred to as "specimen identification information 21") capable of identifying each specimen 20 to the specimen 20. The specimen identification information 21 is, for example, barcode information or the like (one-dimensional barcode information, two-dimensional barcode information, or the like), similar to the reagent identification information 11, but is not limited thereto. A property of the specimen 20 differs depending on the type of used tissue, the type of target disease, the attribute of the target person, the lifestyle of the target person, or the like. For example, in the specimen 20, a measurement channel, a spectrum, or the like differs depending on the type of used tissue, or the like. Therefore, in the information processing system according to the present embodiment, the specimen 20 is individually managed by attaching the specimen identification information 21 to the specimen 20. Therefore, the information processing apparatus 100 can perform fluorescence separation in consideration of a slight difference in a property that appears for every specimen 20.

(Fluorescence Stained Specimen 30)

The fluorescence stained specimen 30 is created by staining the specimen 20 with the fluorescence reagent 10. In the present embodiment, it is assumed that the fluorescence stained specimen 30 is created by staining the specimen 20 with one or more fluorescence reagents 10, but the number of fluorescence reagents 10 used for staining is not particularly limited. Furthermore, a staining method is determined by a combination of the specimen 20 and the fluorescence reagent 10, or the like, and is not particularly limited.

(Information Processing Apparatus 100)

The information processing apparatus 100 includes an acquisition unit 110, a storage unit 120, a processing unit 130, a display unit 140, a control unit 150, and an operation unit 160, as illustrated in FIG. 1. The information processing apparatus 100 may be, for example, a fluorescence microscope or the like, but is not necessarily limited thereto, and may include various apparatuses. For example, the information processing apparatus 100 may be a personal computer (PC) or the like.

(Acquisition Unit 110)

The acquisition unit 110 is a configuration that acquires information used for various processing of the information processing apparatus 100. As illustrated in FIG. 1, the acquisition unit 110 includes an information acquisition unit 111 and a fluorescence signal acquisition unit 112.

(Information Acquisition Unit 111)

The information acquisition unit 111 is a configuration that acquires information regarding the fluorescence reagent 10 (hereinafter referred to as "reagent information") or information regarding the specimen 20 (hereinafter referred to as "specimen information"). More specifically, the information acquisition unit 111 acquires the reagent identification information 11 attached to the fluorescence reagent 10 used for generating the fluorescence stained specimen 30 and the specimen identification information 21 attached to the specimen 20. For example, the information acquisition unit 111 acquires the reagent identification information 11 and the specimen identification information 21 using a barcode reader and the like. Then, the information acquisition unit 111 acquires the reagent information on the basis of the reagent identification information 11 and the specimen information on the basis of the specimen identification information 21 from the database 200, respectively. The information acquisition unit 111 stores the acquired information in an information storage unit 121 as described later.

Here, in the present embodiment, it is assumed that the specimen information includes a linked autofluorescence reference spectrum in which spectra of autofluorescent substances in the specimen 20 are linked to each other in a wavelength direction and the reagent information includes a linked fluorescence reference spectrum in which spectra of fluorescent substances in the fluorescence stained specimen 30 are linked to each other in the wavelength direction. Note that the linked autofluorescence reference spectrum and the linked fluorescence reference spectrum are collectively referred to as a "reference spectrum".

(Fluorescence Signal Acquisition Unit 112)

The fluorescence signal acquisition unit 112 is a configuration that acquires a plurality of fluorescence signals each corresponding to a plurality of excitation lights having different wavelengths when the fluorescence stained specimen 30 (specimen created by staining the specimen 20 with the fluorescence reagent 10) is irradiated with the plurality of excitation lights. More specifically, the fluorescence signal acquisition unit 112 receives a light and outputs a detection signal according to an amount of received light to acquire a fluorescence spectrum of the fluorescence stained specimen 30 on the basis of the detection signal. Here, a content (including an excitation wavelength, an intensity, or the like) of the excitation light is determined on the basis of the reagent information and the like (in other words, the information regarding the fluorescence reagent 10, and the like). Note that the fluorescence signal mentioned here is not particularly limited as long as it is a signal derived from fluorescence, and may be, for example, a fluorescence spectrum.

A to D of FIG. 2 are specific examples of fluorescence spectra acquired by the fluorescence signal acquisition unit 112. In A to D of FIG. 2, specific examples of fluorescence spectra acquired in a case where the fluorescence stained specimen 30 includes four types of fluorescent substances such as DAPI, CK/AF488, PgR/AF594, and ER/AF647 and is irradiated with excitation lights each having excitation wavelengths of 392 [nm] (A of FIG. 2), 470 [nm] (B in FIG. 2), 549 [nm] (C in FIG. 2), and 628 [nm] (D in FIG. 2) are illustrated. It should be noted that energy is discharged for fluorescence emission, such that a fluorescence wavelength shifts to a longer wavelength side than the excitation wavelength (Stokes shift). Furthermore, the fluorescent substances included in the fluorescence stained specimen 30 and the excitation wavelengths of the irradiated excitation lights are not limited to those described above. The fluorescence signal acquisition unit 112 stores the acquired fluorescence spectrum in a fluorescence signal storage unit 122 as described later.

(Storage Unit 120)

The storage unit 120 is a configuration that stores information used for various processing of the information processing apparatus 100 or information output by various processing. As illustrated in FIG. 1, the storage unit 120 includes an information storage unit 121 and a fluorescence signal storage unit 122.

(Information Storage Unit 121)

The information storage unit 121 is a configuration that stores the reagent information and the specimen information acquired by the information acquisition unit (Fluorescence Signal Storage Unit 122)

The fluorescence signal storage unit 122 is a configuration that stores the fluorescence signal of the fluorescence stained specimen 30 acquired by the fluorescence signal acquisition unit 112.

(Processing Unit 130)

The processing unit 130 is a configuration that performs various processing including fluorescence separation processing. As illustrated in FIG. 1, the processing unit 130 includes a link unit 131, a separation processing unit 132, and an image generation unit 133.

(Link Unit 131).

The link unit 131 is a configuration that generates a linked fluorescence spectrum by linking at least parts of a plurality of fluorescence spectra acquired by the fluorescence signal acquisition unit 112 to each other in the wavelength direction. For example, the link unit 131 extracts data of a predetermined width in each fluorescence spectrum so as to include a maximum value of a fluorescence intensity in each of the four fluorescence spectra (A to D of FIG. 3) acquired by the fluorescence signal acquisition unit 112 as described above. Widths of wavelength bands in which the link unit 131 extracts the data can be determined on the basis of the reagent information, the excitation wavelengths, the fluorescence wavelengths, or the like, and may be different from each other for each fluorescent substance (in other words, the widths of the wavelength bands in which the link unit 131 extracts the data may be different from each other for each of the fluorescence spectra illustrated in A to D of FIG. 3). Then, as illustrated in E of FIG. 3, the link unit 131 generates one linked fluorescence spectrum by linking the extracted data to each other in the wavelength direction. It should be noted that since the linked fluorescence spectrum includes data extracted from the plurality of fluorescence spectra, a wavelength is not continuous at a boundary of each linked data.

At this time, the link unit 131 performs the link described above after aligning the intensities of the excitation lights corresponding to each of the plurality of fluorescence spectra with each other (in other words, after correcting the plurality of fluorescence spectra), on the basis of the intensities of the excitation lights. More specifically, the link unit 131 performs the link described above after aligning the intensities of the excitation lights corresponding to each of the plurality of fluorescence spectra with each other by dividing each fluorescence spectrum by an excitation power density, which is the intensity of the excitation light. Therefore, the fluorescence spectrum in a case where the excitation light of the same intensity is irradiated is obtained. Furthermore, in a case where the intensities of the irradiated excitation lights are different from each other, intensities of spectra absorbed by the fluorescence stained specimen 30 (hereinafter referred to as "absorption spectra") are also different from each other depending on the intensities of the irradiated excitation lights. Therefore, as described above, the absorption spectra can be appropriately evaluated by aligning the intensities of the excitation lights corresponding to each of the plurality of fluorescence spectra with each other.

The intensity of the excitation light in the present description may be the excitation power or the excitation power density, as described above. The excitation power or the excitation power density may be a power or a power density obtained by actually measuring an excitation light emitted from a light source 104 or may be a power or a power density obtained from a drive voltage applied to the light source 104. Note that the intensity of the excitation light in the present description may be a value obtained by correcting the excitation power density described above with an absorption rate for each excitation light of a section, which is an observation target, an amplification factor of a detection signal in a detection system (fluorescence signal acquisition unit 112 and the like) that detects a fluorescence emitted from the section, or the like. That is, the intensity of the excitation light in the present description may be a power density of an excitation light that has actually contributed to excitation of the fluorescent substance, a value obtained by correcting the power density with the amplification factor of the detection system, or the like. By taking the absorption rate, the amplification factor, or the like, into consideration, it becomes possible to appropriately correct the intensity of the excitation light that changes according to a change in a machine state, an environment, or the like, and it becomes thus possible to generate a linked fluorescence spectrum that enables more accurate color separation.

Note that a correction value (also referred to as an intensity correction value) based on the intensity of the excitation light for each fluorescence spectrum is not limited to a value for aligning the intensities of the excitation lights corresponding to each of the plurality of fluorescence spectra with each other, and may be variously modified. For example, a signal intensity of a fluorescence spectrum having an intensity peak on a long wavelength side tends to be lower than that of a fluorescence spectrum having an intensity peak on a short wavelength side. Therefore, in a case where the linked fluorescence spectrum includes both of the fluorescence spectrum having the intensity peak on the long wavelength side and the fluorescence spectrum having the intensity peak on the short wavelength side, there is a case where the fluorescence spectrum having the intensity peak on the long wavelength side is hardly added and only the fluorescence spectrum having the intensity peak on the short wavelength side is extracted. In such a case, for example, by setting an intensity correction value for the fluorescence spectrum having the intensity peak on the long wavelength side to a larger value, it is possible to improve separation accuracy of the fluorescence spectrum on the short wavelength side.

Furthermore, the link unit 131 may correct a wavelength resolution of each of the plurality of fluorescence spectra to be linked to each other, independently of other fluorescence spectra. For example, a fluorescence spectrum of AF546 and a fluorescence spectrum of AF555 have almost the same spectral shape and peak wavelength, and a difference between the fluorescence spectrum of AF546 and the fluorescence spectrum of AF555 is that the fluorescence spectrum of AF555 has a shoulder at a bottom portion on a high wavelength side, whereas the fluorescence spectrum of AF546 does not have the shoulder. As such, in a case where two fluorescence spectra are close to each other, a problem that it is difficult to color-separate the two fluorescence spectra from each other by spectrum extraction occurs.

Figure 4:
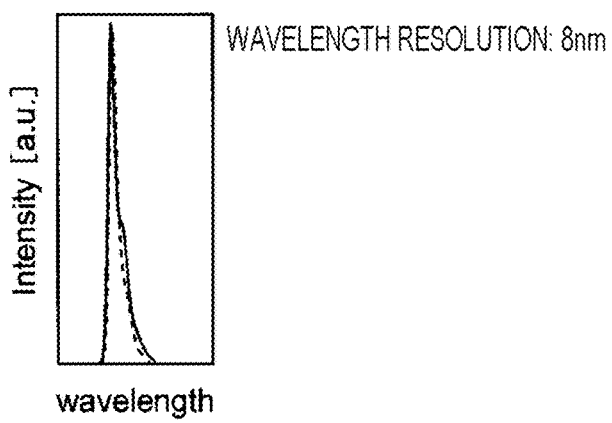
FIG. 4 is a diagram illustrating fluorescence spectra of AF546 and AF555 in a case where a wavelength resolution is 8 nm.
Figure 5:
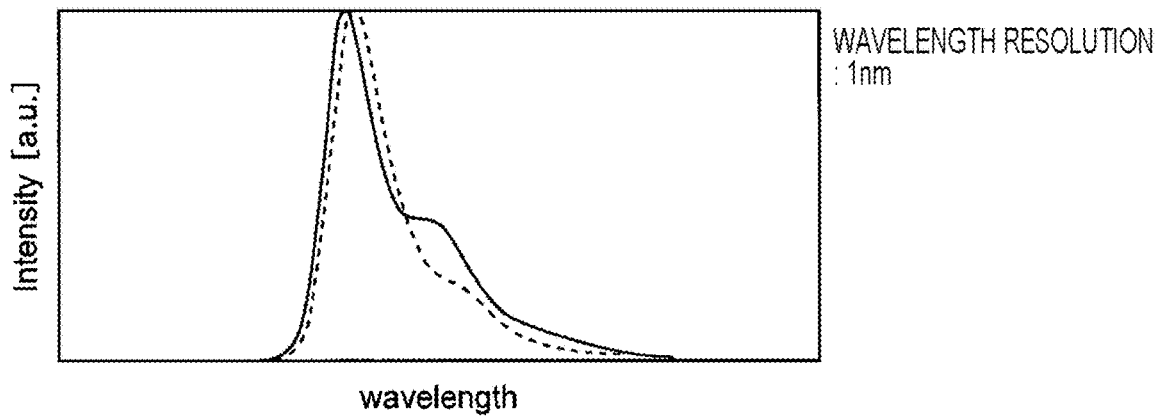
FIG. 5 is a diagram illustrating fluorescence spectra of AF546 and AF555 in a case where a wavelength resolution is 1 nm.

Such a problem may be solved by increasing the wavelength resolution of the linked fluorescence spectrum. FIG. 4 is a diagram illustrating fluorescence spectra of AF546 and AF555 in a case where the wavelength resolution is 8 nm, and FIG. 5 is a diagram illustrating fluorescence spectra of AF546 and AF555 in a case where the wavelength resolution is 1 nm. As illustrated in FIG. 4, in a case where the wavelength resolution is 8 nm, a spectral shape and a peak wavelength of AF546 and a spectral shape and a peak wavelength of AF555 substantially coincide with each other. Therefore, it becomes actually difficult to color-separate these spectral shapes and peak wavelengths from each other using a least square method, for example. On the other hand, in a case where the wavelength resolution is 8 times the wavelength resolution illustrated in FIG. 4, that is, 1 nm, as illustrated in FIG. 5, a spectral shape and a peak wavelength of AF546 and a spectral shape and a peak wavelength of AF555 can be clearly separated from each other. This indicates that even in a case of using a plurality of fluorescence spectra having close spectral shapes and peak wavelengths, it is possible to perform color separation using the plurality of fluorescence spectra by increasing the wavelength resolution.

However, when the wavelength resolution is increased, a data amount of the linked fluorescence spectrum becomes large, such that a required memory capacity, a calculation cost in fluorescence separation processing, or the like, increases. Therefore, the link unit 131 corrects a fluorescence spectrum assumed to be difficult to be color-separated among the plurality of fluorescence spectra to be linked to each other so that a wavelength resolution of the fluorescence spectrum becomes high, and corrects a fluorescence spectrum assumed to be easy to be color-separated among the plurality of fluorescence spectra so that a wavelength resolution of the fluorescence spectrum becomes low. Therefore, it becomes possible to improve accuracy of color separation while suppressing an increase in a data amount.

Here, a method of generating the linked fluorescence spectrum by the link unit 131 will be described by a specific example. In the present description, similar to the method of generating the linked fluorescence spectrum described with reference to FIG. 3, a case of linking four fluorescence spectra obtained by irradiating the fluorescence stained specimen 30 including four types of fluorescent substances such as DAPI, CK/AF488, PgR/AF594, and ER/AF647 with excitation lights each having excitation wavelengths of 392 nm, 470 nm, 549 nm, and 628 nm is exemplified.

Figure 3:
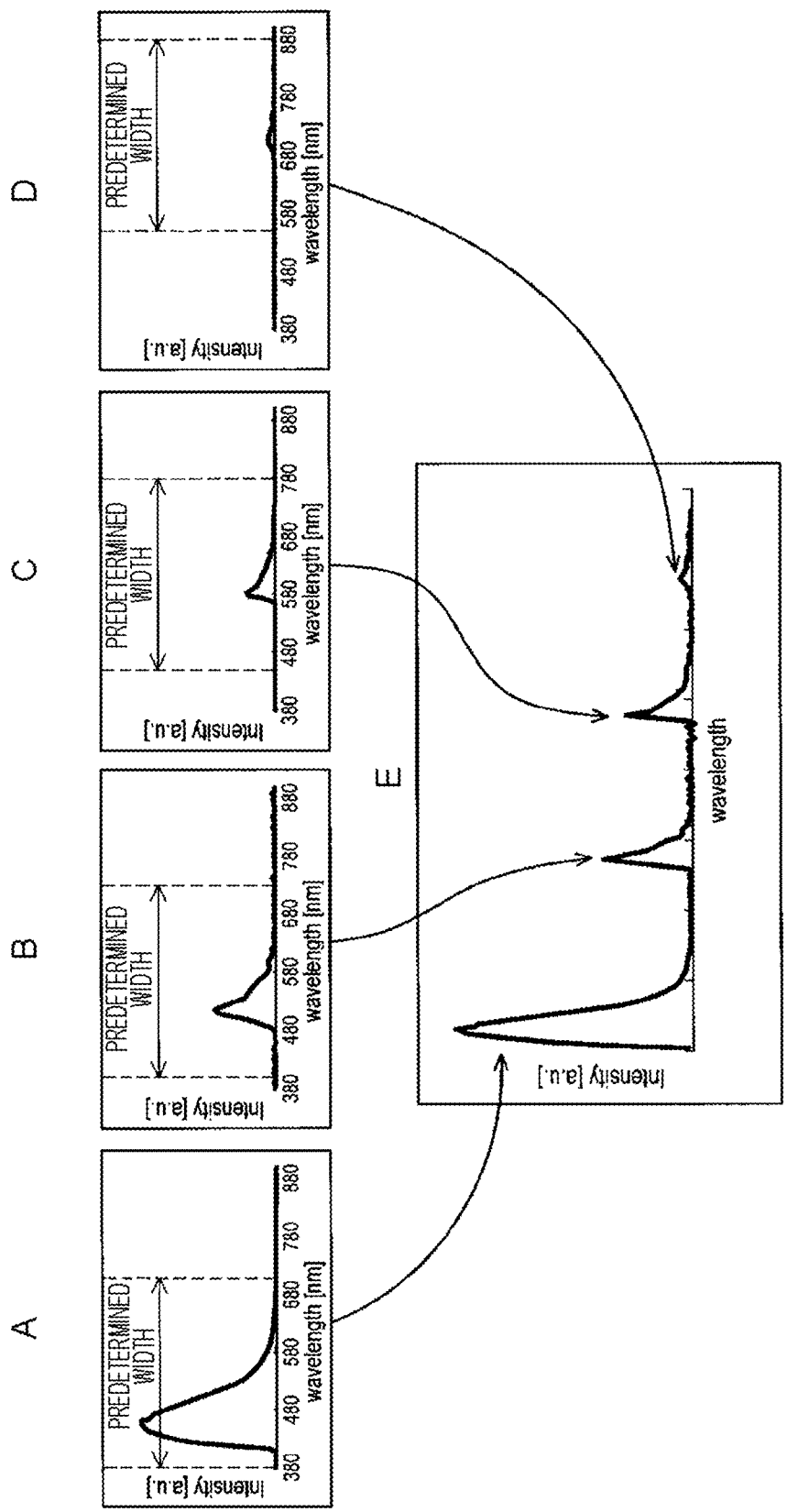
FIG. 3 is a diagram for describing a method of generating a linked fluorescence spectrum by a link unit.
Figure 6:
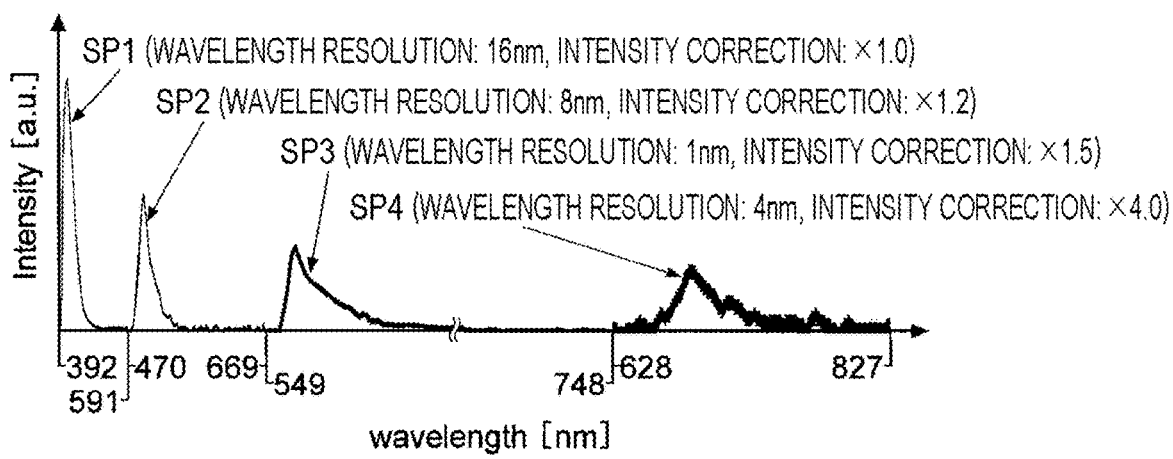
FIG. 6 is a diagram illustrating an example of a linked fluorescence spectrum generated from fluorescence spectra illustrated in A to D of FIG. 3.

FIG. 6 is a diagram illustrating an example of a linked fluorescence spectrum generated from the fluorescence spectra illustrated in A to D of FIG. 3. As illustrated in FIG. 6, the link unit 131 extracts a fluorescence spectrum SP1 in a wavelength band of an excitation wavelength of 392 nm or more and 591 nm or less from the fluorescence spectrum illustrated in A of FIG. 3, extracts a fluorescence spectrum SP2 in a wavelength band of an excitation wavelength of 470 nm or more and 669 nm or less from the fluorescence spectrum illustrated in B of FIG. 3, extracts a fluorescence spectrum SP3 in a wavelength band of an excitation wavelength of 549 nm or more and 748 nm or less from the fluorescence spectrum illustrated in C of FIG. 3, and extracts a fluorescence spectrum SP4 in a wavelength band of an excitation wavelength of 628 nm or more and 827 nm or less from the fluorescence spectrum illustrated in D of FIG. 3. Next, the link unit 131 corrects a wavelength resolution of the extracted fluorescence spectrum SP1 to 16 nm (no intensity correction), corrects an intensity of the fluorescence spectrum SP2 to 1.2 times and corrects a wavelength resolution of the fluorescence spectrum SP2 to 8 nm, corrects an intensity of the fluorescence spectrum SP3 to 1.5 times (no wavelength resolution correction), and corrects an intensity of the fluorescence spectrum SP4 to 4.0 times and corrects a wavelength resolution of the fluorescence spectrum SP4 to 4 nm. Then, the link unit 131 generates the linked fluorescence spectrum as illustrated in FIG. 6 by sequentially linking the fluorescence spectra SP1 to SP4 after being corrected to each other.

Note that a case where the link unit 131 has extracted and linked the fluorescence spectra SP1 to SP4 having a predetermined bandwidth (width of 200 nm in FIG. 6) from the excitation wavelengths when each fluorescence spectrum has been acquired is illustrated in FIG. 6, but bandwidths of the fluorescence spectra extracted by the link unit 131 do not need to coincide with each other in each fluorescence spectrum and may be different from each other. That is, a region extracted from each fluorescence spectrum by the link unit 131 is only required to be a region including a peak wavelength of each fluorescence spectrum, and a wavelength band and a bandwidth of each fluorescence spectrum may be appropriately changed. At that time, a shift of the spectral wavelength due to the Stokes shift may be taken into consideration. As such, by narrowing down the wavelength band to be extracted, it becomes possible to reduce a data amount, and it becomes thus possible to execute fluorescence separation processing at a higher speed.

(Separation Processing Unit 132)

Figure 7:
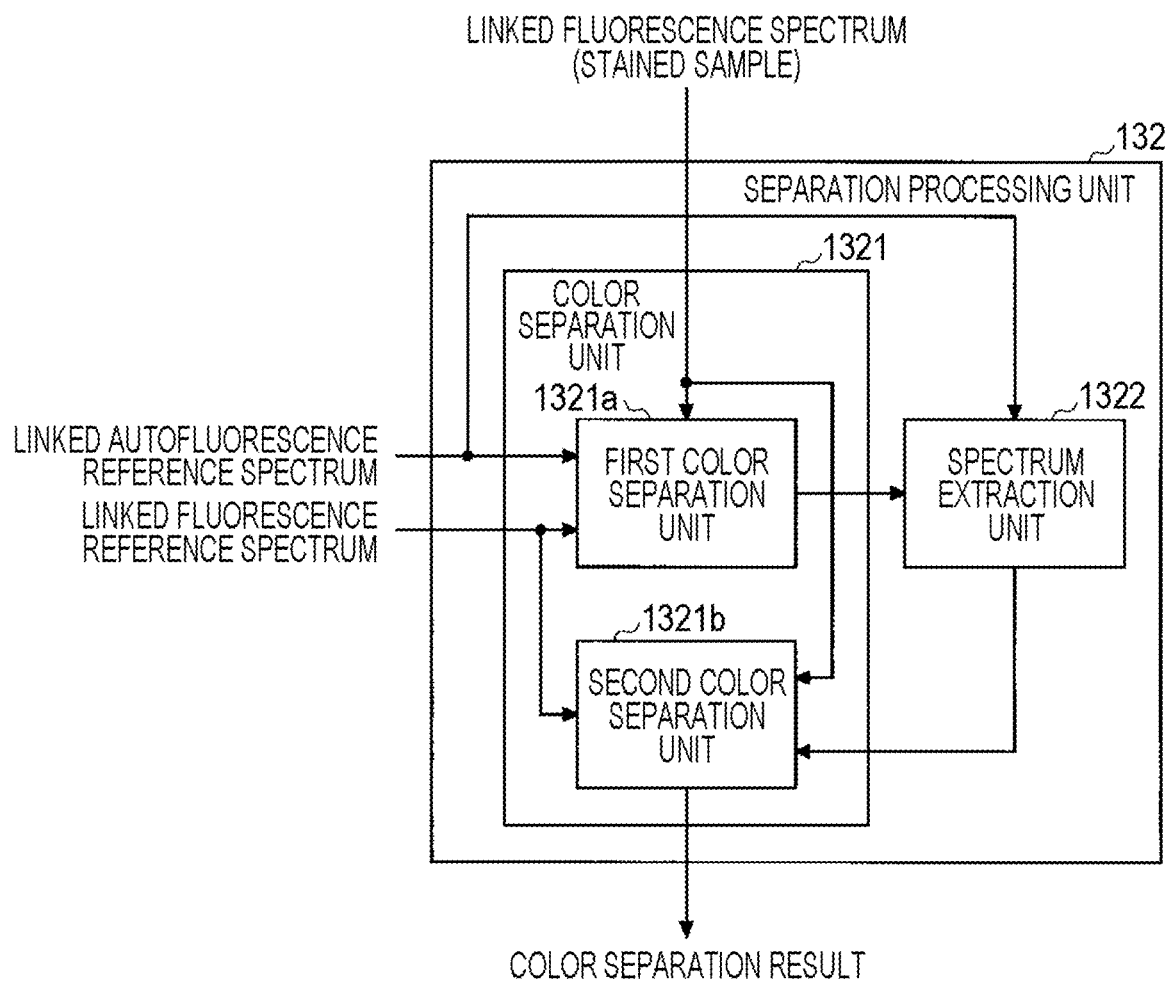
FIG. 7 is a block diagram illustrating a more specific configuration example of a separation processing unit according to an embodiment according to the first embodiment.

The separation processing unit 132 is a configuration that separates the linked fluorescence spectrum for every molecule. FIG. 7 is a block diagram illustrating a more specific configuration example of the separation processing unit according to the present embodiment. As illustrated in FIG. 7, the separation processing unit 132 includes a color separation unit 1321 and a spectrum extraction unit 1322.

The color separation unit 1321 includes, for example, a first color separation unit 1321a and a second color separation unit 1321b, and color-separates a linked fluorescence spectrum of a stained section (also referred to as a stained sample) input from the link unit 131 for every molecule.

The spectrum extraction unit 1322 is a configuration that improves the linked autofluorescence reference spectrum so as to be able to obtain a more accurate color separation result, and adjusts the linked autofluorescence reference spectrum included in the specimen information input from the information storage unit 121 on the basis of a color separation result by the color separation unit 1321 so as to obtain a more accurate color separation result.

More specifically, the first color separation unit 1321a separates the linked fluorescence spectrum into spectra for every molecule by executing color separation processing using the linked fluorescence reference spectrum included in the reagent information and the linked autofluorescence reference spectrum included in the specimen information, which are input from the information storage unit 121, for the linked fluorescence spectrum of the stained sample input from the link unit 131. Note that, for example, a least square method (LSM), a weighted least square method (WLSM), or the like may be used for the color separation processing.

The spectrum extraction unit 1322 improves the linked autofluorescence reference spectrum so as to obtain a more accurate color separation result by executing spectrum extraction processing using a color separation result input from the first color separation unit 1321a for the linked autofluorescence reference spectrum input from the information storage unit 121 and adjusting the linked autofluorescence reference spectrum on the basis of a result of the spectrum extraction processing. Note that, for example, non-negative matrix factorization (NMF), singular value decomposition (SVD), or the like may be used for the spectrum extraction processing.

The second color separation unit 1321b separates the linked fluorescence spectrum into spectra for every molecule by executing color separation processing using the adjusted linked autofluorescence reference spectrum input from the spectrum extraction unit 1322 for the linked fluorescence spectrum of the stained sample input from the link unit 131. Note that, for example, a least square method (LSM), a weighted least square method (WLSM), or the like may be used for the color separation processing, similar to the first color separation unit 1321a.

Note that a case where the adjustment of the linked autofluorescence reference spectrum has been performed once has been exemplified in FIG. 7, but the present disclosure is not limited thereto, and a final color separation result may be acquired after a color separation result by the second color separation unit 1321b is input to the spectrum extraction unit 1322 and processing for executing the adjustment of the linked autofluorescence reference spectrum again is repeated once or more in the spectrum extraction unit 1322.

Figure 8:
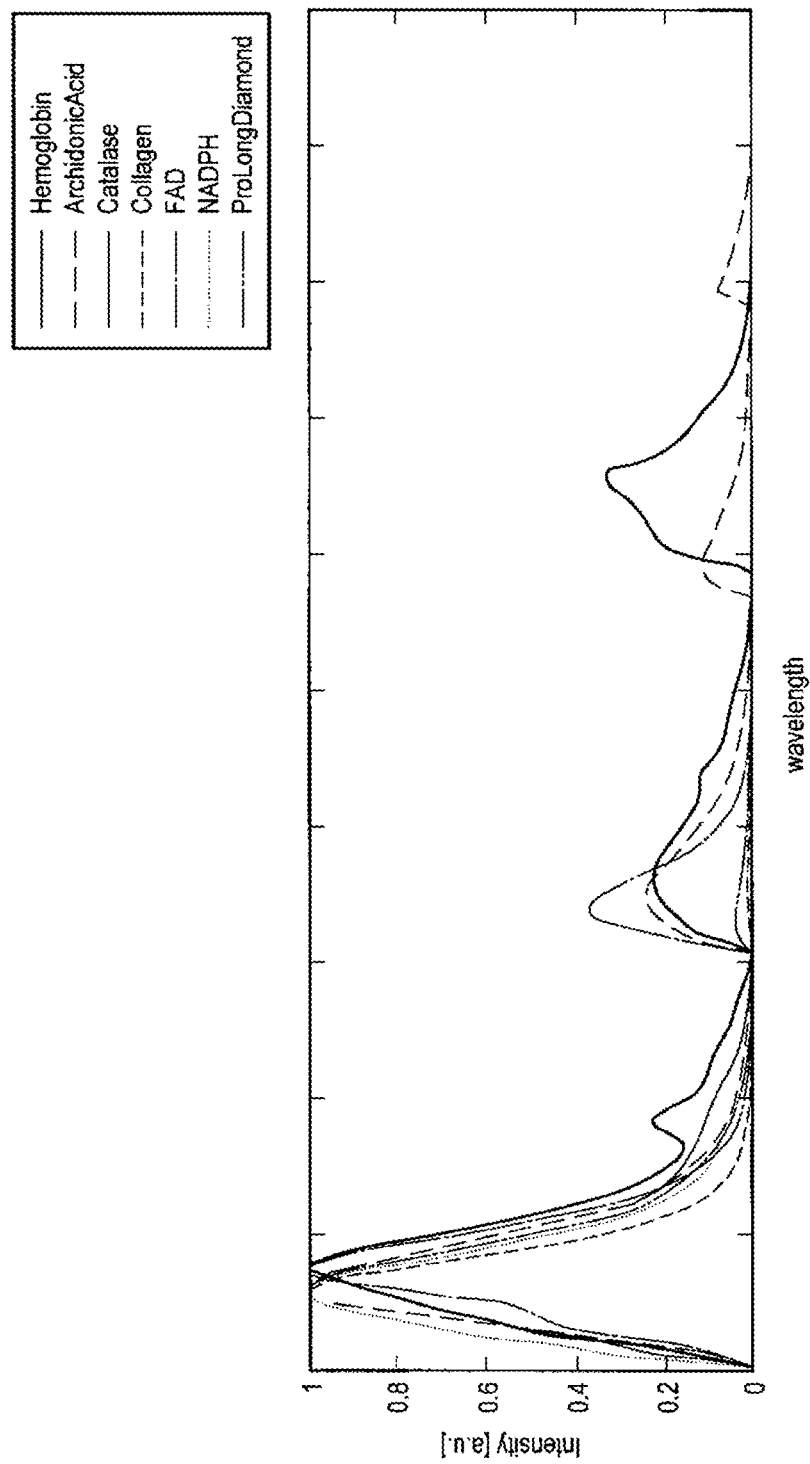
FIG. 8 is a diagram illustrating specific examples of linked autofluorescence reference spectra.
Figure 9:
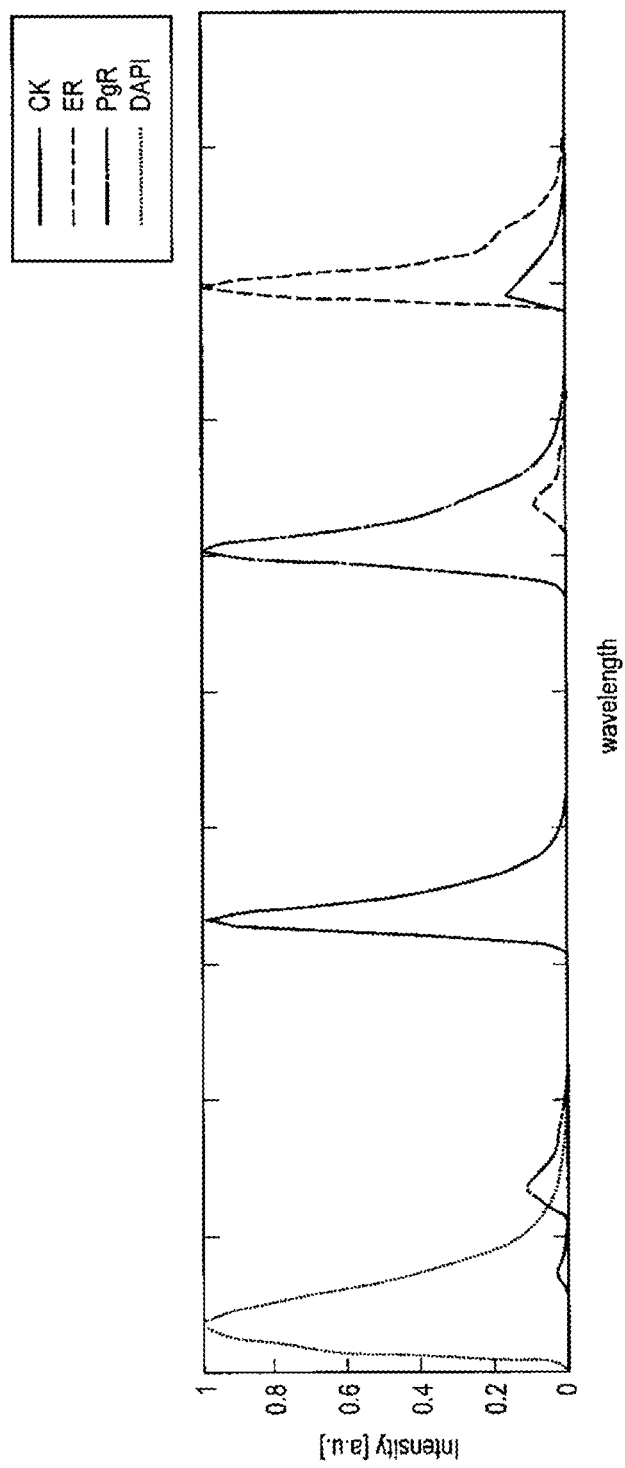
FIG. 9 is a diagram illustrating specific examples of linked fluorescence reference spectra.

In FIG. 8, specific examples of linked autofluorescence reference spectra in a case where autofluorescent substances are Hemoglobin, ArchidonicAcid, Catalase, Collagen, FAD, NADPH, and ProLongDiamond are illustrated. In FIG. 9, specific examples of linked fluorescence reference spectrum in a case where fluorescent substances are CK, ER, PgR, and DAPI are illustrated. Both of the linked fluorescence reference spectrum and the linked autofluorescence reference spectrum can be generated by a method similar to a method of generating the linked fluorescence spectrum by the link unit 131 (but are not necessarily limited thereto). More specifically, the linked fluorescence reference spectrum and the linked autofluorescence reference spectrum can be generated by linking data having a predetermined wavelength bandwidth in a plurality of spectra acquired by a plurality of excitation lights having the same excitation wavelength as that at the time of generating the linked fluorescence spectrum with each other in the wavelength direction. At this time, it is assumed that intensities of excitation lights corresponding to each of the plurality of spectra are aligned with each other on the basis of intensities (for example, excitation power densities) of the excitation lights (but is not necessarily limited thereto). Note that a method of generating the linked fluorescence reference spectrum and the linked autofluorescence reference spectrum is not necessarily limited to that described above. For example, the linked fluorescence reference spectrum and the linked autofluorescence reference spectrum may be generated on the basis of a theoretical value, a catalog value, or the like of a spectrum of each substance.

Next, calculation regarding the least square method will be described. The least square method is to calculate a color mixture rate by fitting the linked fluorescence spectrum generated by the link unit 131 to the reference spectrum. Note that the color mixture rate is an index indicating a degree to which respective substances are mixed with each other. The following Equation (1) is an equation representing a residual obtained by subtracting the reference spectra (St) (linked fluorescence reference spectrum and linked autofluorescence reference spectrum) mixed at a color mixture rate a from the linked fluorescence spectrum (Signal). Note that "Signal(1×number of channels)" in Equation (1) indicates that the linked fluorescence spectra (Signal) exist by the number of channels of a wavelength (for example, Signal is a matrix representing the linked fluorescence spectra). Furthermore, "St(number of substances×number of channels)" indicates that the reference spectra exist by the number of channels of wavelength for each substance (fluorescent substance and autofluorescent substance) (for example, St is a matrix representing the reference spectra). Furthermore, "a(1×number of substances)" indicates that a color mixture rate a is provided for each substance (fluorescent substance and autofluorescent substance) (for example, a is a matrix representing the color mixture rate of each of reference spectra in the linked fluorescence spectrum).

[Equation 1]

$$\text{Signal}(1 \times \text{number of channels}) - a(1 \times \text{number of substances}) * St(\text{number of substances} \times \text{number of channels}) \quad (1)$$

Then, the first color separation unit 1321a or the second color separation unit 1321b calculates a color mixture rate a of each substance at which the sum of squares of a residual Equation (1) becomes minimum. Since the sum of squares of the residual becomes minimum in a case where a result of partial differentiation with respect to the color mixture rate a is 0 for Equation (1) representing the residual, the first color separation unit 1321a or the second color separation unit 1321b calculates the color mixture rate a of each substance at which the sum of squares of the residual becomes minimum by solving the following Equation (2). Note that "St'" in Equation (2) indicates a transposed matrix of the reference spectrum St. Furthermore, "inv(St*St')" indicates an inverse matrix of St*St'.

[Equation 2]

$$\frac{\delta(\text{Signal} - a * St)}{\delta a} = 0 \quad (2)$$

$$\Leftrightarrow 2(\text{Signal} - a * St) * St' = 0$$

$$\Leftrightarrow (\text{Signal} - a * St)St' = 0$$

$$\Leftrightarrow \text{Signal} * St' - a * (St * St') = 0$$

$$\Leftrightarrow a = \text{Signal} * St' * inv(St * St')$$

Here, specific examples of each value of the above Equation (1) are expressed by the following Equations (3) to (5). In the examples of Equations (3) to (5), a case where reference spectra (St) of three types of substances (the number of substances is 3) are mixed with each other at different color mixture rates a in the linked fluorescence spectrum (Signal) is expressed.

[Equation 3]

$$St = \begin{pmatrix} 50 & 100 & 60 & 25 & 4 \\ 10 & 20 & 100 & 20 & 8 \\ 0.1 & 11 & 30 & 100 & 50 \end{pmatrix} \quad (3)$$

[Equation 4]

$$a = (3\ 2\ 1) \quad (4)$$

[Equation 5]

$$\text{Signal} = a * St = (170.1\ 351\ 410\ 215\ 78) \quad (5)$$

Then, a specific example of a calculation result of the above Equation (2) by each value of Equations (3) and (5) is expressed by the following Equation (6). As can be seen from Equation (6), "a=(3 2 1)" (that is, the same value as the above Equation (4)) is correctly calculated as the calculation result.

[Equation 6]

$$a = \text{Signal} * St' * inv(St * St') = (3\ 2\ 1) \quad (6)$$

The first color separation unit 1321a or the second color separation unit 1321b can output a unique spectrum as a separation result (separation result does not differ for every excitation wavelength) by executing the fluorescence separation processing using the reference spectrum linked (linked autofluorescence reference spectrum and linked fluorescence reference spectrum) in the wavelength direction, as described above. Therefore, a practitioner can more easily obtain a correct spectrum. Furthermore, the reference spectrum (linked autofluorescence reference spectrum) regarding autofluorescence used for separation is automatically acquired, and the fluorescence separation processing is performed, such that the practitioner does not need to extract a spectrum corresponding to the autofluorescence from an appropriate space of a non-stained section.

Note that the first color separation unit 1321a or the second color separation unit 1321b may extract spectra for every fluorescent substance from the linked fluorescence spectrum by performing calculation regarding a weighted least square method rather than the least square method, as described above. In the weighted least square method, a weight is assigned so as to attach importance to an error at a low signal level, using the fact that a noise of the linked fluorescence spectrum (Signal), which is a measured value, has a Poisson distribution However, an upper limit value at which weighting is not performed by the weighted least square method is set as an Offset value. The Offset value is determined by characteristics of a sensor used for measurement, and needs to be separately optimized in a case where an imaging element is used as the sensor. In a case where the weighted least square method is performed, the reference spectrum St in the above Equations (1) and (2) is replaced with St_ represented by the following Equation (7). Note that the following Equation (7) means that St_ is calculated by dividing (in other words, element-dividing) each element (each component) of St represented by a matrix by each corresponding element (each component) in a "Signal+ Offset value" also represented by a matrix.

[Equation 7]

$$St\_ = \frac{St}{\text{Signal} + \text{Offset value}} \quad (7)$$

Here, a specific example of St_ represented by the above Equation (7) in a case where the Offset value is 1 and values of the reference spectrum St and the linked fluorescence spectrum Signal are represented by the above Equations (3) and (5), respectively, is expressed by the following Equation (8).

[Equation 8]

$$St\_ = \quad (8)$$

$$\frac{St}{\text{Signal} + \text{Offset value}} = \begin{pmatrix} 0.2922 & 0.2841 & 0.1460 & 0.1157 & 0.0506 \\ 0.0584 & 0.0568 & 0.2433 & 0.0926 & 0.1013 \\ 5.8445e^{-5} & 0.0313 & 0.0730 & 0.4630 & 0.6329 \end{pmatrix}$$

Then, a specific example of a calculation result of the color mixture rate a in this case is expressed by the following Equation (9). As can be seen from Equation (9), "a=(3 2 1)" is correctly calculated as the calculation result.

[Equation 9]

$$a = \text{Signal} * St\_' * inv(St * St\_') = (3\ 2\ 1) \quad (9)$$

(Image Generation Unit 133)

The image generation unit 133 is a configuration that generates image information on the basis of the separation result of the linked fluorescence spectrum by the separation processing unit 132. For example, the image generation unit 133 can generate image information using a fluorescence spectrum corresponding to one or a plurality of fluorescent molecules or generate image information using an autofluorescence spectrum corresponding to one or a plurality of autofluorescent molecules. Note that the number or a combination of fluorescent molecules or autofluorescent molecules used by the image generation unit 133 to generate the image information is not particularly limited. Furthermore, in a case where various processing (for example, segmentation, calculation of S/N value, or the like) using the separated fluorescence spectrum or autofluorescence spectrum is performed, the image generation unit 133 may generate image information indicating results of those processing.

(Display Unit 140)

The display unit 140 is a configuration that displays the image information generated by the image generation unit 133 on a display to present the image information to the practitioner. Note that a type of display used as the display unit 140 is not particularly limited. Furthermore, although not described in detail in the present embodiment, the image information generated by the image generation unit 133 may be projected by a projector or may be printed by a printer to be presented to the practitioner (in other words, a method of outputting the image information is not particularly limited).

(Control Unit 150)

The control unit 150 is a functional configuration that comprehensively controls general processing performed by the information processing apparatus 100. For example, the control unit 150 controls the start, the end, or the like of the various processing as described above (for example, adjustment processing of a placement position of the fluorescence stained specimen 30, irradiation processing of the excitation light to the fluorescence stained specimen 30, acquisition processing of the spectrum, generation processing of the linked fluorescence spectrum, fluorescence separation processing, generation processing of the image information, display processing of the image information, and the like) on the basis of an operation input performed by the practitioner via the operation unit 160. Note that a control content of the control unit 150 is not particularly limited. For example, the control unit 150 may control processing (for example, processing regarding an operating system (OS)) generally performed on a general-purpose computer, a PC, a tablet PC, or the like.

(Operation Unit 160)

The operation unit 160 is a configuration that receives an operation input from the practitioner. More specifically, the operation unit 160 includes various input means such as a keyboard, a mouse, a button, a touch panel, a microphone, or the like, and the practitioner can perform various inputs to the information processing apparatus 100 by operating these input means. Information regarding an operation input performed via the operation unit 160 is provided to the control unit 150.

(Database 200)

The database 200 is an apparatus that manages the reagent information, the specimen information, and the like. More specifically, the database 200 manages the reagent identification information 11 and the reagent information, and the specimen identification information 21 and the specimen information in association with each other. Therefore, the information acquisition unit 111 can acquire the reagent information on the basis of the reagent identification information 11 of the fluorescence reagent 10 and acquire the specimen information on the basis of the specimen identification information 21 of the specimen 20, from the database 200.

The reagent information managed by the database 200 is assumed to be information including a measurement channel and a linked fluorescence reference spectrum specific to the fluorescent substance possessed by the fluorescence reagent 10 (but is not necessarily limited thereto). The "measurement channel" is a concept indicating fluorescent substances included in the fluorescence reagent 10, and is a concept indicating CK, ER, PgR, and DAPI in the example of FIG. 9. Since the number of fluorescent substances varies depending on the fluorescence reagent 10, the measurement channel is managed in association with each fluorescence reagent 10 as reagent information. Furthermore, the linked fluorescence reference spectrum included in the reagent information is a spectrum generated by linking the fluorescence spectra to each other in the wavelength direction for each of the fluorescent substances included in the measurement channel, as described above.

Furthermore, the specimen information managed by the database 200 is assumed to be information including a measurement channel and a linked autofluorescence reference spectrum specific to the autofluorescent substance possessed by the specimen 20 (but is not necessarily limited thereto). The "measurement channel" is a concept indicating autofluorescent substances included in the specimen 20, and is a concept indicating Hemoglobin, ArchidonicAcid, Catalase, Collagen, FAD, NADPH, and ProLongDiamond in the example of FIG. 8. Since the number of autofluorescent substances varies depending on the specimen 20, the measurement channel is managed in association with each specimen 20 as specimen information. Furthermore, the linked autofluorescence reference spectrum included in the specimen information is a spectrum generated by linking the autofluorescence spectra to each other in the wavelength direction for each of the autofluorescent substances included in the measurement channel, as described above. Note that the information managed by the database 200 is not necessarily limited to those described above.

The configuration example of the information processing system according to the present embodiment has been described hereinabove. Note that the configuration described above with reference to FIG. 1 is merely an example, and a configuration of the information processing system according to the present embodiment is not limited to such an example. For example, the information processing apparatus 100 may not necessarily include all of the configurations illustrated in FIG. 1 or may include a configuration that is not illustrated in FIG. 1.

Here, the information processing system according to the present embodiment may include an imaging apparatus (for example, including a scanner and the like) that acquires a fluorescence spectrum and an information processing apparatus that performs processing using the fluorescence spectrum. In this case, the fluorescence signal acquisition unit 112 illustrated in FIG. 1 can be realized by the imaging apparatus, and the other configurations can be realized by an information processing apparatus. Furthermore, the information processing system according to the present embodiment may include an imaging apparatus that acquires a fluorescence spectrum and software used for processing that uses the fluorescence spectrum. In other words, the information processing system may not be provided with a physical configuration (for example, a memory, a processor, or the like) that stores or executes the software. In this case, the fluorescence signal acquisition unit 112 illustrated in FIG. 1 can be realized by the imaging apparatus, and the other configurations can be realized by the information processing apparatus on which the software is executed. Then, the software may be provided (for example, from a website, a cloud server, or the like) to the information processing apparatus via a network or may be provided to the information processing apparatus via an arbitrary storage medium (for example, a disk or the like). Furthermore, the information processing apparatus on which the software is executed can be various servers (for example, a cloud server and the like), a general-purpose computer, a PC, a tablet PC, or the like. Note that a method of providing the software to the information processing apparatus and a type of the information processing apparatus are not limited to those described above. Furthermore, it should be noted that the configuration of the information processing system according to the present embodiment is not necessarily limited to that described above, and a configuration that can be conceived by so-called those skilled in the art can be applied on the basis of a technical level at the time of use.

The information processing system described above may be realized as, for example, a microscope system. Therefore, next, a configuration example of a microscope system in a case where the information processing system according to the present embodiment is realized as the microscope system will be described with reference to FIG. 10.

Figure 10:
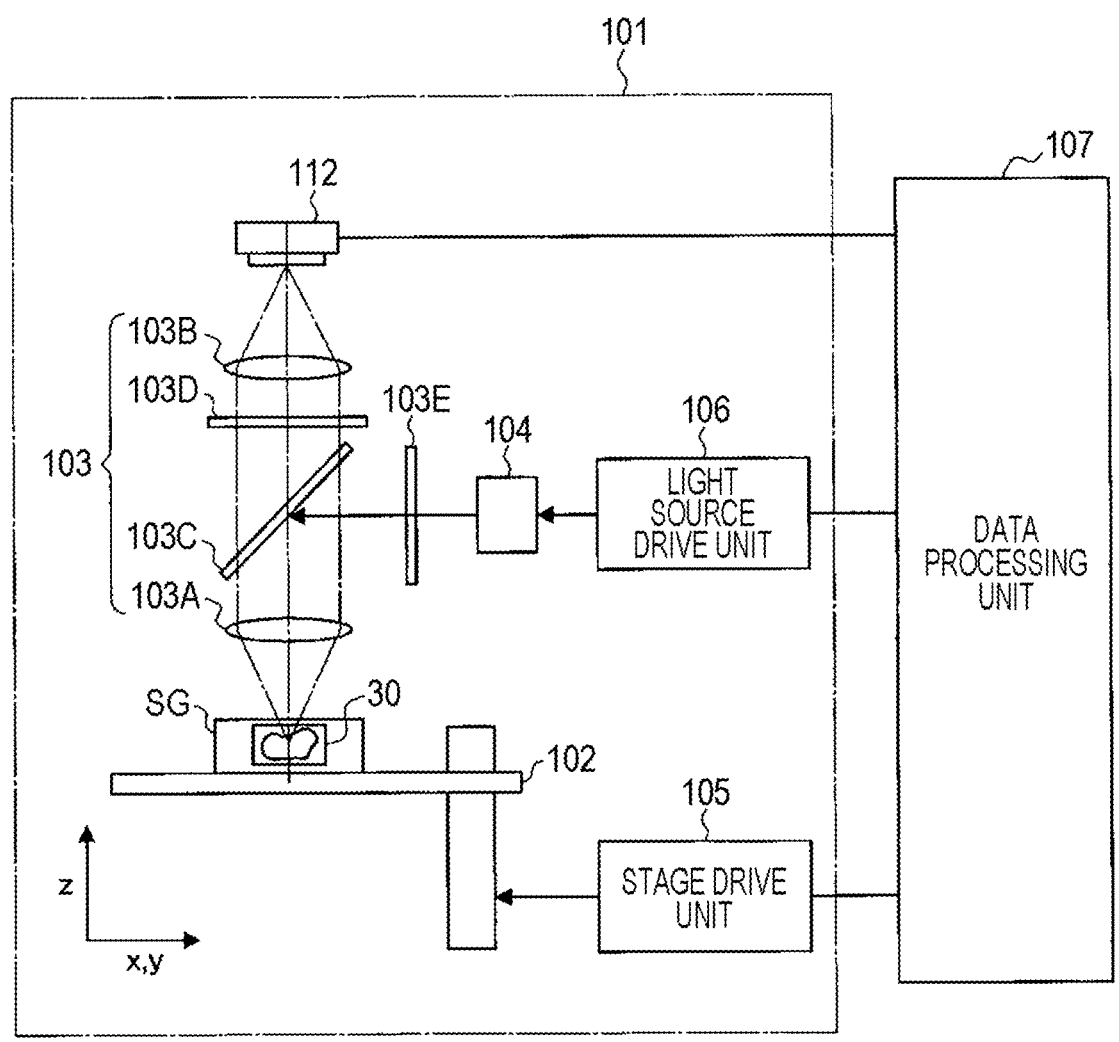
FIG. 10 is a block diagram illustrating a configuration example of a microscope system in a case where the information processing system according to the first embodiment is realized as a microscope system.

As illustrated in FIG. 10, the microscope system according to the present embodiment includes a microscope 101 and a data processing unit 107.

The microscope 101 includes a stage 102, an optical system 103, a light source 104, a stage drive unit 105, a light source drive unit 106, and a fluorescence signal acquisition unit 112.

The stage 102 has a placement surface on which the fluorescence stained specimen 30 can be placed, and is movable in a direction (x-y plane direction) parallel to the placement surface and a direction (z-axis direction) perpendicular to the placement surface by the drive of the stage drive unit 105. The fluorescence stained specimen 30 has a thickness of, for example, several micrometers to several tens of micrometers in a Z direction, and is sandwiched between a slide glass SG and a cover glass (not illustrated) and is fixed by a predetermined fixing method.

The optical system 103 is arranged above the stage 102. The optical system 103 includes an objective lens 103A, an image forming lens 103B, a dichroic mirror 103C, an emission filter 103D, and an excitation filter 103E. The light source 104 is, for example, a bulb such as a mercury lamp or the like, a light emitting diode (LED), or the like, and irradiates a fluorescent label attached to the fluorescence stained specimen 30 with an excitation light by the drive of the light source drive unit 106.

The excitation filter 103E generates an excitation light by transmitting only a light of an excitation wavelength that excites a fluorescent pigment in a light emitted from the light source 104 in a case of obtaining a fluorescence image of the fluorescence stained specimen 30. The dichroic mirror 103C reflects the excitation light transmitted through the excitation filter and then incident on the dichroic mirror 103C and guides the excitation light to the objective lens 103A. The objective lens 103A focuses the excitation light on the fluorescence stained specimen 30. Then, the objective lens 103A and the image forming lens 103B magnify an image of the fluorescence stained specimen 30 to a predetermined magnification, and form the magnified image on an image forming surface of the fluorescence signal acquisition unit 112.

When the fluorescence stained specimen 30 is irradiated with the excitation light, a staining agent bound to each tissue of the fluorescence stained specimen 30 emits fluorescence. This fluorescence is transmitted through the dichroic mirror 103C via the objective lens 103A and reaches the image forming lens 103B via the emission filter 103D. The emission filter 103D absorbs the light that has been magnified by the objective lens 103A described above and has been transmitted through the excitation filter 103E, and transmits only a part of a colored light. An image of the colored light from which an external light is lost is magnified by the image forming lens 103B and is formed on the fluorescence signal acquisition unit 112, as described above.

The data processing unit 107 is a configuration that drives the light source 104, acquires a fluorescent image of the fluorescence stained specimen 30 using the fluorescence signal acquisition unit 112, and performs various processing using the fluorescent image. More specifically, the data processing unit 107 can function as some or all of the information acquisition unit 111, the storage unit 120, the processing unit 130, the display unit 140, the control unit 150, and the operation unit 160 of the information processing apparatus 100 or the database 200 described with reference to FIG. 1. For example, the data processing unit 107 functions as the control unit 150 of the information processing apparatus 100 to control the drive of the stage drive unit 105 and the light source drive unit 106 or control the acquisition of the spectrum by the fluorescence signal acquisition unit 112.

Furthermore, the data processing unit 107 functions as the processing unit 130 of the information processing apparatus 100 to generate the linked fluorescence spectrum, separate the linked fluorescence spectrum for every molecule, or generate image information on the basis of the separation result.

The configuration example of the microscope system in a case where the information processing system according to the present embodiment is realized as the microscope system has been described hereinabove. Note that the configuration described above with reference to FIG. 10 is merely an example, and a configuration of the microscope system according to the present embodiment is not limited to such an example. For example, the microscope system may not necessarily include all of the configurations illustrated in FIG. 10 or may include a configuration that is not illustrated in FIG. 10.

(1.2. Flow Example of Processing)

Figure 11:
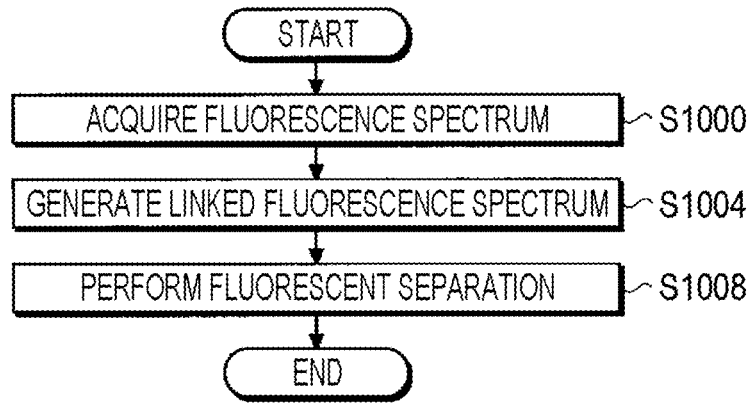
FIG. 11 is a flowchart illustrating a flow example of processing of fluorescence separation by an information processing apparatus according to the first embodiment.

The configuration example of the information processing system according to the present embodiment has been described hereinabove. Next, a flow example of a series of processing accompanying fluorescence separation by the information processing apparatus 100 will be described with reference to FIG. 11. FIG. 11 is a flowchart illustrating a flow example of a series of processing accompanying the fluorescence separation by the information processing apparatus 100.

In step S1000, the fluorescence signal acquisition unit 112 of the information processing apparatus 100 acquires a fluorescence spectrum. More specifically, the fluorescence stained specimen 30 is irradiated with a plurality of excitation lights having different excitation wavelengths, and the fluorescence signal acquisition unit 112 acquires a plurality of fluorescence spectra corresponding to each excitation light. Then, the fluorescence signal acquisition unit 112 stores the acquired fluorescence spectrum in the fluorescence signal storage unit 122.

In step S1004, the link unit 131 generates a linked fluorescence spectrum by linking at least parts of the plurality of fluorescence spectra stored in the fluorescence signal storage unit 122 to each other in the wavelength direction. More specifically, the link unit 131 generates one linked fluorescence spectrum by extracting data of a predetermined width in each fluorescence spectrum so as to include maximum values of fluorescence intensities in each of the plurality of fluorescence spectra and linking the data to each other in the wavelength direction.

In step S1008, the separation processing unit 132 separates the linked fluorescence spectra for every molecule (performs fluorescence separation). More specifically, the separation processing unit 132 separates the linked fluorescence spectrum for every molecule by executing the processing described with reference to FIG. 7.

In the subsequent processing, for example, the image generation unit 133 generates image information using the separated fluorescence spectrum corresponding to one or a plurality of fluorescent molecules (or the separated autofluorescence spectrum corresponding to the autofluorescent molecule), and the display unit 140 displays the image information on the display to present the image information to the practitioner.

2. Second Embodiment

The first embodiment of the present disclosure has been described hereinabove. Next, a second embodiment of the present disclosure will be described.

The information processing apparatus 100 according to the first embodiment has performed the fluorescence separation processing using the linked autofluorescence reference spectrum (and the linked fluorescence reference spectrum) prepared in advance. On the other hand, an information processing apparatus 100 according to a second embodiment performs fluorescence separation processing using an actually measured linked autofluorescence reference spectrum.

More specifically, a spectrum extraction unit 1322 of a separation processing unit 132 according to the second embodiment extracts a linked autofluorescence reference spectrum for each autofluorescent substance from a linked autofluorescence spectrum, the linked autofluorescence spectrum being generated by linking at least parts of a plurality of autofluorescence spectra to each other in a wavelength direction, the plurality of autofluorescence spectra being acquired by irradiating a section with a plurality of excitation lights having different excitation wavelengths, and the section being same as or similar to a specimen 20. Then, the spectrum extraction unit 1322 performs fluorescence separation processing using the extracted linked autofluorescence reference spectrum and a linked fluorescence reference spectrum (linked fluorescence reference spectrum that is similar to that of the first embodiment) as reference spectra.

Figure 12:
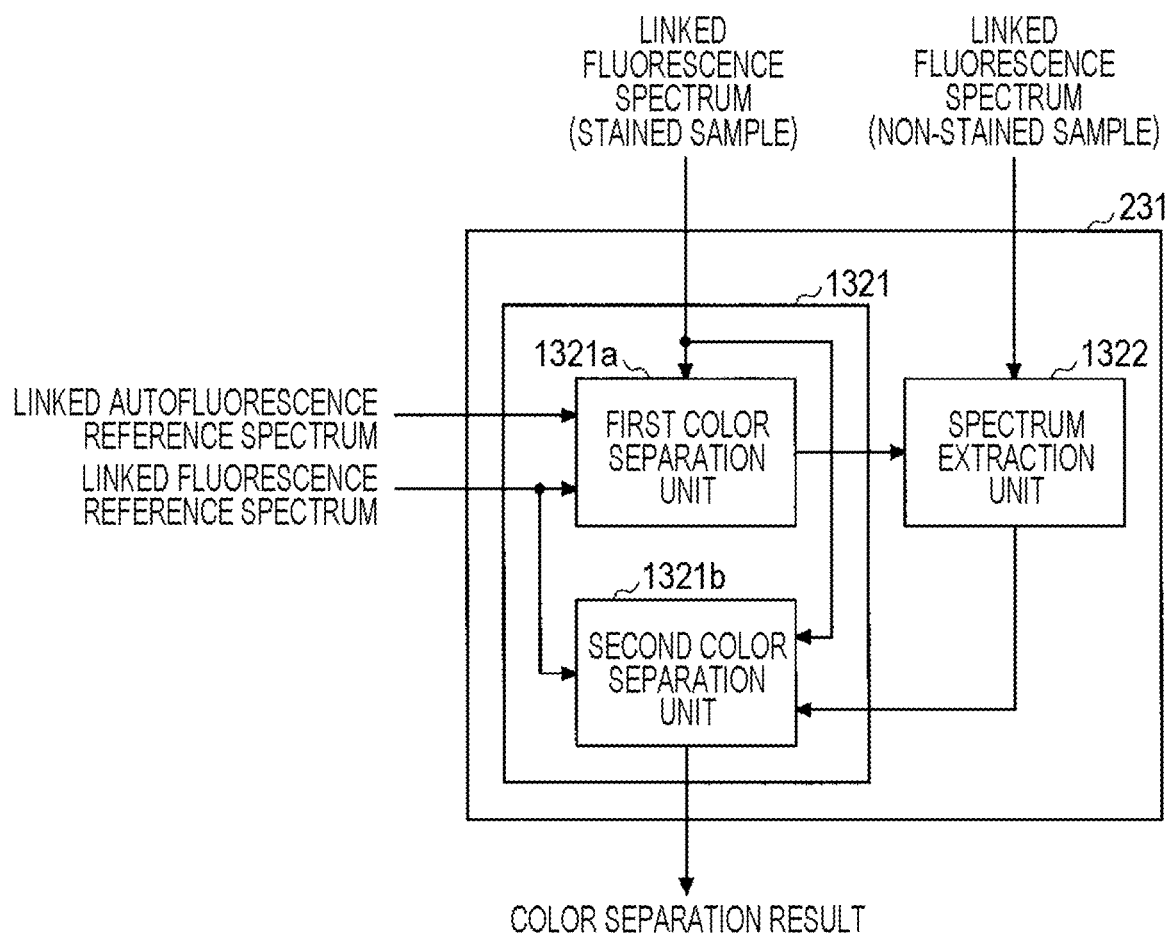
FIG. 12 is a block diagram illustrating a more specific configuration example of a separation processing unit according to a second embodiment.

FIG. 12 is a block diagram illustrating a more specific configuration example of the separation processing unit according to the present embodiment. As illustrated in FIG. 12, the separation processing unit 132 according to the present embodiment has a configuration similar to that of the separation processing unit 132 described with reference to FIG. 7 in the first embodiment.

In such a configuration, instead of a linked autofluorescence reference spectrum included in specimen information, a linked fluorescence spectrum (also referred to as a linked autofluorescence spectrum) of a non-stained section (also referred to as a non-stained sample) input from a link unit 131 is input to the spectrum extraction unit 1322.

The spectrum extraction unit 1322 improves the linked autofluorescence reference spectrum so as to obtain a more accurate color separation result by executing spectrum extraction processing using a color separation result input from a first color separation unit 1321a for the linked autofluorescence spectrum of the non-stained sample input from the link unit 131 and adjusting the linked autofluorescence reference spectrum on the basis of a result of the spectrum extraction processing. For example, non-negative matrix factorization (NMF), singular value decomposition (SVD), or the like may be used for the spectrum extraction processing, similar to the first embodiment. Furthermore, other operations may be similar to those of the separation processing unit 132 according to the first embodiment, and a detailed description thereof will thus be omitted.

Note that any one of a non-stained section and a stained section can be used for the section that is the same as or similar to the specimen 20 used to extract the linked autofluorescence reference spectrum. For example, in a case where the non-stained section is used, a section before staining used as a stained section, a section adjacent to the stained section, a section different from the stained section in the same block (sampled from the same place as that of the stained section), a section in a different block (sampled from a place different from that of the stained section) in the same tissue, or the like, can be used.

Furthermore, in a case where the stained section is used, by executing fluorescence separation processing by a method according to a third embodiment as described later, it is also possible to obtain a color separation result for every molecule directly from the linked fluorescence spectrum without extracting the linked autofluorescence reference spectrum.

Here, principal component analysis (hereinafter referred to as "PCA") can be generally used as a method of extracting the autofluorescence spectrum from the non-stained section, but the PCA is not suitable in a case where the autofluorescence spectra linked to each other in the wavelength direction are used for processing as in the present embodiment. Therefore, the spectrum extraction unit 1322 according to the present embodiment extracts the linked autofluorescence reference spectrum from the non-stained section by performing non-negative matrix factorization (hereinafter referred to as NMF) rather than the PCA. Note that the reason why the PCA is not suitable as a method of extracting the linked autofluorescence reference spectrum from the non-stained section will be described later in detail.

Figures 13, 14:
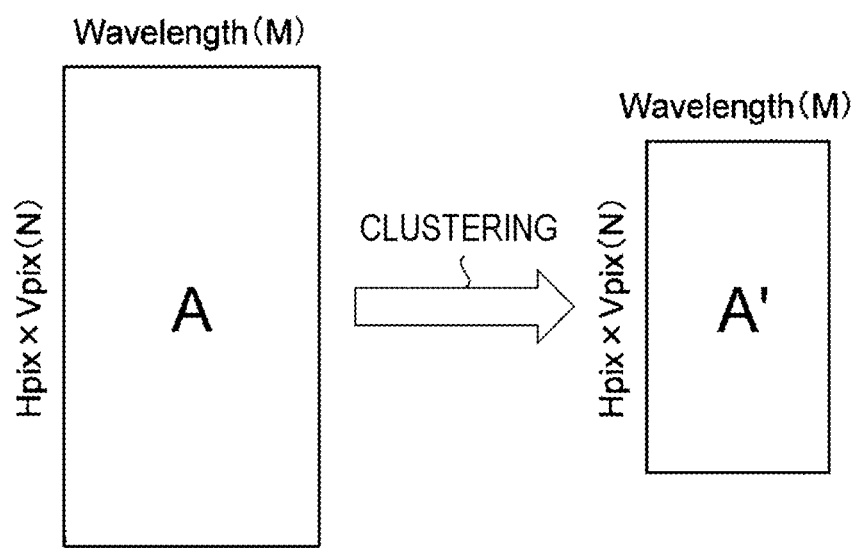
FIG. 13 is a diagram for describing an outline of non-negative matrix factorization.
FIG. 14 is a diagram for describing an outline of clustering.

FIG. 13 is a diagram for describing an outline of the NMF. As illustrated in FIG. 13, the NMF decomposes a non-negative N-row M-column (N×M) matrix A into a non-negative N-row k-column (N×k) matrix W and a non-negative k-row M-column (k×M) matrix H. The matrix W and the matrix H are determined so that a mean squared residual D between the matrix A and the product (W*H) of the matrix W and the matrix H becomes minimum. In the present embodiment, the matrix A corresponds to a spectrum (N is the number of pixels and M is the number of wavelength channels) before the linked autofluorescence reference spectrum is extracted, and the matrix H corresponds to the extracted linked autofluorescence reference spectrum (k is the number of linked autofluorescence reference spectra (in other words, the number of autofluorescent substances) and M is the number of wavelength channels). Here, the mean squared residual D is represented by the following Equation (10). Note that "norm(D, 'fro')" refers to a Frobenius norm of the mean squared residual D.

[Equation 10]

$$D = \frac{norm(D, \text{'fro'})}{\sqrt{N*M}} \quad (10)$$

Factorization in the NMF uses an iterative method starting with random initial values for the matrix W and the matrix H. In the NMF, a value (the number of linked autofluorescence reference spectra) of k is mandatory, but the initial values of the matrix W and the matrix H can be set as an option rather than being mandatory, and a solution is constant when the initial values of the matrix W and the matrix H are set. On the other hand, in a case where the initial values of the matrix W and the matrix H are not set, these initial values are randomly set and a solution is not constant.

A property of the specimen 20 differs and an autofluorescence spectrum of the specimen 20 also differs, depending on a type of used tissue, a type of target disease, an attribute of a target person, lifestyle of the target person, or the like. Therefore, the information processing apparatus 100 according to the second embodiment can realize more accurate fluorescence separation processing by actually measuring the linked autofluorescence reference spectra for every specimen 20, as described above.

Note that the matrix A, which is an input of the NMF, is a matrix including the same number of rows as the number N (=Hpix×Vpix) of pixels of a specimen image and the same number of columns as the number M of wavelength channels, as described above. Therefore, in a case where the number of pixels of the specimen image is large or in a case where the number M of wavelength channels is large, the matrix A becomes a very large matrix, such that a calculation cost of the NMF is increased and a processing time becomes long.

In such a case, for example, as illustrated in FIG. 14, by clustering the number N (=Hpix×Vpix) of pixels of the specimen image into the designated number N (<Hpix× Vpix) of classes, it is possible to suppress redundancy of a processing time due to enlargement of the matrix A.

In the clustering, for example, similar spectra in the wavelength direction and an intensity direction in the specimen image are classified into the same class. Therefore, an image having a smaller number of pixels than the number of pixels of the specimen image is generated, and it becomes thus possible to reduce a scale of a matrix A' using this image as an input.

(2.1. Flow Example of Processing)

Figure 15:
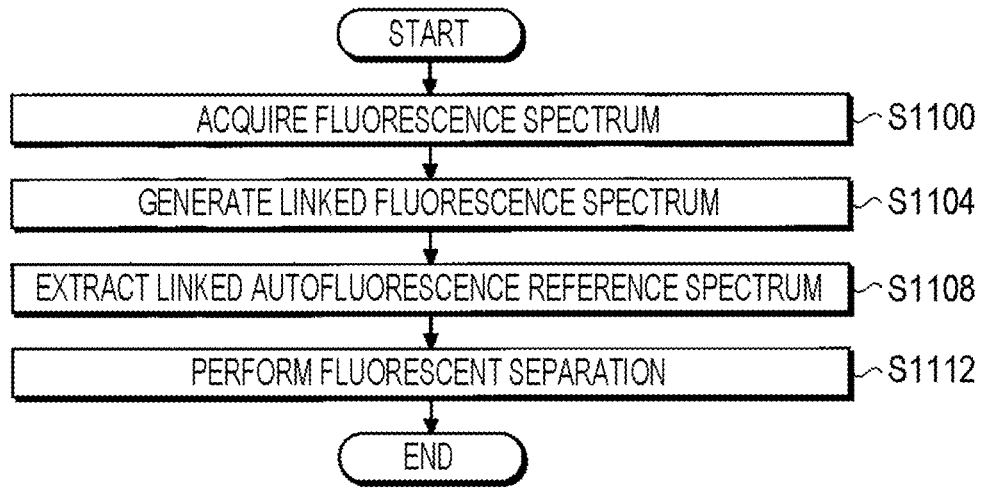
FIG. 15 is a flowchart illustrating a flow example of processing of fluorescence separation by an information processing apparatus according to the second embodiment.

Next, a flow example of a series of processing accompanying fluorescence separation by the information processing apparatus 100 according to the second embodiment will be described with reference to FIG. 15. FIG. 15 is a flowchart illustrating a flow example of a series of processing accompanying fluorescence separation by the information processing apparatus 100 according to the second embodiment.

In step S1100 and step S1104, similar to the flow example (step S1000 and step S1004 of FIG. 11) of the processing in the first embodiment, a fluorescence signal acquisition unit 112 acquires a plurality of fluorescence spectra corresponding to excitation lights having different excitation wavelengths, and the link unit 131 generate a linked fluorescence spectrum by linking at least parts of the plurality of fluorescence spectra to each other in the wavelength direction.

In step S1108, the spectrum extraction unit 1322 extracts a linked autofluorescence reference spectrum by executing the NMF using the linked autofluorescence spectrum generated by linking at least parts of the plurality of autofluorescence spectra to each other in the wavelength direction, the plurality of autofluorescence spectra being acquired by irradiating the non-stained section with the plurality of excitation lights having the different excitation wavelengths.

In step S1112, the color separation unit 1321 performs fluorescence separation processing using the linked autofluorescence reference spectrum extracted as described above and the linked fluorescence reference spectrum (linked fluorescence reference spectrum that is similar to that of the first embodiment) as reference spectra.

In the subsequent processing, similar to the first embodiment, for example, an image generation unit 133 generates image information using the separated fluorescence spectrum corresponding to one or a plurality of fluorescent molecules (or the separated autofluorescence spectrum corresponding to the autofluorescent molecule), and a display unit 140 displays the image information on a display to present the image information to a practitioner.

(2.2. Reason why PCA is not Suitable as Method of Extracting Linked Autofluorescence Reference Spectrum from Non-Stained Section)

The flow example of the series of processing accompanying the fluorescence separation by the information processing apparatus 100 according to the second embodiment has been described hereinabove. Then, details of the reason why the PCA is not suitable as a method of extracting the linked autofluorescence reference spectrum from the non-stained section will be described.

First, when a fluorescence spectrum, for one excitation wavelength, of a certain pixel i in the number n of pixels is ai and a resolution is m, the fluorescence spectrum ai is represented by the following Equation (11) (m-th order vector).

[Equation 11]

$$ai=(ai1,ai2,\sim aim) \quad (11)$$

Similarly, fluorescence spectra for other excitation wavelengths are also represented as bi, ci, and di, which are m-th order vectors (here, a case where the number of types of excitation wavelengths is four is assumed as an example). Then, a matrix in which these vectors regarding all pixels (pixel 1 to pixel n) are integrated with each other is represented by the following Equation (12) (n-row and 4m-column matrix P). Since the number of pixels is significantly (substantially) larger than a wavelength resolution, a rank of the matrix P represented by Equation (12) is 4m at the maximum, and up to 4m eigenvalues and eigenvectors exist.

[Equation 12]

$$P = \begin{pmatrix} a1 & b1 & c1 & d1 \\ ai & bi & ci & di \\ an & bn & cn & dn \end{pmatrix} = \quad (12)$$

$$\begin{pmatrix} a11 \sim a1m & b11 \sim b1m & c11 \sim c1m & d11 \sim d1m \\ ai1 \sim aim & bi1 \sim bim & ci1 \sim cim & di1 \sim dim \\ an1 \sim anm & bn1 \sim bnm & cn1 \sim cnm & dn1 \sim dnm \end{pmatrix}$$

Here, singular value decomposition (SVD) as expressed by the following Equation (13) can be performed on an n-row and m-column (n×m) real number matrix A of a rank k. U and V in Equation (13) each represent a singular matrix and form a normal matrix system (that is, $^tU=U^{-1}$ and $UU^{-1}=1$). Furthermore, in a case where the real matrix A is a square matrix having different eigenvalues, U and V are eigenvectors.

[Equation 13]

$$A = UD^t V \tag{13}$$

By performing eigenvalue decomposition (ED) or singular value decomposition (SVD) on the real matrix A to calculate a singular (eigen) vector, it is possible to analyze independent factors of the real matrix A. In a case where the real matrix A is a square matrix and has different eigenvalues, an eigenvalue of $^tAA$ is the square of an eigenvalue of A, and an eigenvector of $^tAA$ is equal to the eigenvector of A (see the following Equation (14). $A=VD^tV$ in Equation (14)).

[Equation 14]

$$^tAA = {}^t(VD^tV)(VD^tV) = V^t D^t VVD^t V = V(DD)^t V \tag{14}$$

The spectrum obtained in the present embodiment is not a square matrix, but since it can be considered that the spectrum is determined by linear combination of elements that configure an autofluorescence, it is considered that it is possible to convolute the spectrum into a square matrix by duplication or linear conversion. Even in a case where there is an error, an eigenvalue of $^tAA=0$ is a least square solution of A. Therefore, by obtaining the eigenvector of $^tAA$, an independent component (eigenvector) in the spectrum can be calculated. Furthermore, the following Equations (15) and (16) are obvious because singular value decomposition is established. However, in a case where the rank is not satisfied, L and R become a subset of eigenvectors, such that all points cannot be represented.

[Equation 15]

$$Anm = LnrRrm \tag{15}$$

[Equation 16]

$$Arm = (aij)nm = \begin{pmatrix} a1 \\ ai \\ an \end{pmatrix} = \begin{pmatrix} a11 \sim & a1j \sim & a1m \\ ai1 \sim & aij \sim & aim \\ an1 \sim & anj \sim & anm \end{pmatrix} \tag{16}$$

The PCA is equivalent to obtaining eigenvalues and eigenvectors of a variance-covariance matrix of a data matrix. As expressed by the following Equation (17), the variance-covariance matrix is the product between a matrix obtained by subtracting a mean value from the data matrix and a transposed matrix. This is (the product between the data matrix and the transpose—the product of averages of each column).

[Equation 17]

$$Bnm = (aij - a)nm = \begin{pmatrix} (a11-a1) \sim & (a1j-aj) \sim & (a1m-am) \\ (ai1-a1) \sim & (aij-aj) \sim & (aim-am) \\ (an1-a1) \sim & (anj-aj) \sim & (anm-am) \end{pmatrix} \tag{17}$$

[Equation 18]

$$aj = \left(\frac{1}{n}\right) \sum aij \tag{18}$$

As expressed by the following Equations (19) to (23), eigenvectors of $^tBB$ can become eigenvectors of B to construct B, and a difference between $^tBB$ and $^tAA$ is $^taa$ (matrix of the product of average values of columns of A). Therefore, in singular value decomposition of A, eigenvectors that configure points are obtained, whereas in the PCA, eigenvectors that represent a degree of a variation of points are calculated (eigenvectors of $^tBB$ and the eigenvector of $^tAA$ are not equal to each other).

[Equation 19]

$$^tBBij = \Sigma(aki-ai)(akj-aj) = \Sigma(akiakj-aiaj) = {}^tAAij - aiaj \tag{19}$$

[Equation 20]

$$^tAAij = \Sigma akiakj \tag{20}$$

[Equation 21]

$$a = (a1, a2, \sim am) \tag{21}$$

[Equation 22]

$$aiaj = {}^taa \tag{22}$$

[Equation 23]

$$^tBB = {}^tAA - {}^taa \tag{23}$$

At this time, in a case of a matrix such as the above Equation (12) in which fluorescence spectra for each excitation wavelength are integrated with each other, in the singular value decomposition, if they are independent of each other, they are not affected, but in the PCA, a term of the product of averages occurs, and eigenvectors are thus affected. Therefore, in order to perform the PCA, it is required to perform analysis on each data set. As described above, the PCA is not suitable in a case where the spectra linked to each other in the wavelength direction are used for processing as in the present embodiment.

(2.3. Application Example)

The details of the reason why the PCA is not suitable as the method of extracting the linked autofluorescence reference spectrum from the non-stained section have been described hereinabove. Next, an application example according to the second embodiment will be described.

As described above, the spectrum extraction unit 1322 of the separation processing unit 132 according to the second embodiment extracts the linked autofluorescence reference spectrum by executing the NMF using the linked autofluorescence spectrum generated by linking at least parts of the plurality of autofluorescence spectra to each other in the wavelength direction, the plurality of autofluorescence spectra being acquired by irradiating the non-stained section with the plurality of excitation lights having the different excitation wavelengths. At this time, a spectrum extraction unit 1322 according to an application example may extract the linked autofluorescence reference spectrum by setting an initial value in the NMF (an initial value of the matrix H in FIG. 13) using the autofluorescence spectrum acquired in advance according to the first embodiment or the like (more specifically, by setting the linked autofluorescence spectrum generated by linking at least parts of the autofluorescence spectra to each other in the wavelength direction as an initial value in the NMF). Therefore, the spectrum obtained as a separation result is uniquely determined, and it is possible to perform more accurate fluorescence separation.

3. Modification

The second embodiment of the present disclosure has been described hereinabove. Next, a modification of the present disclosure will be described.

Since the information obtained by the fluorescence separation processing described above is a brightness (or a fluorescence intensity) in the image information, there was a case that a practitioner cannot sufficiently perform a quantitative analysis. More specifically, since the practitioner cannot obtain information such as the number of fluorescent molecules, the number of antibodies bound to the fluorescent molecules, or the like, it has been difficult for the practitioner to compare the number of fluorescent molecules among a plurality of fluorescent substances or to compare data imaged under different conditions with each other.

The present modification has been made in view of the problem described above, and a spectrum extraction unit 1322 according to the modification extracts spectra for every fluorescent substance from a linked fluorescence spectrum using a reference spectrum including a linked autofluorescence reference spectrum and a linked fluorescence reference spectrum, calculated on the basis of the number of fluorescent molecules or the number of antibodies bound to the fluorescent molecules. More specifically, the spectrum extraction unit 1322 according to the modification extracts spectra for every fluorescent substance from a linked fluorescence spectrum by calculating a linked autofluorescence reference spectrum and a linked fluorescence reference spectrum for each fluorescent molecule or for each antibody by dividing each of the linked autofluorescence reference spectrum and the linked fluorescence reference spectrum used in the embodiment described above by the number of fluorescent molecules or the number of antibodies in an imaging element 1 [pixel] and performing calculation regarding a least square method (or a weighted least square method) using the calculated linked autofluorescence reference spectrum and linked fluorescence reference spectrum. Therefore, the separation processing unit 132 according to the modification can calculate the number of fluorescent molecules or the number of antibodies in a fluorescence stained specimen 30 as a result of fluorescence separation processing.

Figure 16:
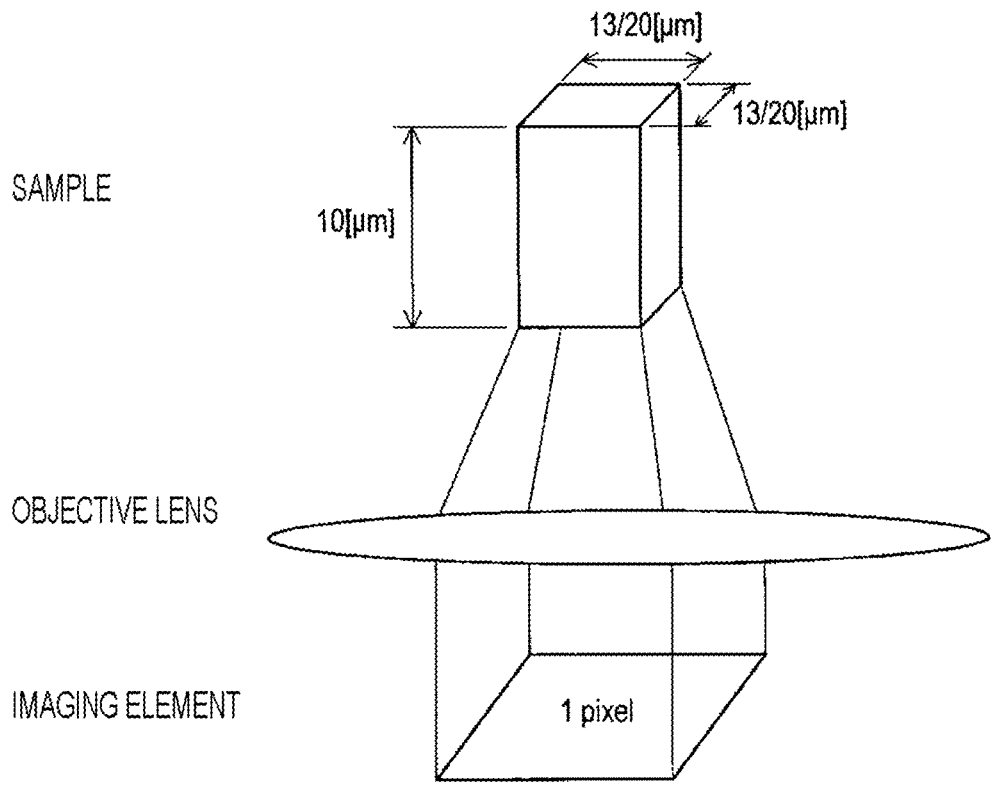
FIG. 16 is a diagram for describing a method of calculating the number of fluorescent molecules (or the number of antibodies) in an imaging element 1 [pixel] in a modification.

Here, a method of calculating the number of fluorescent molecules (or the number of antibodies) in an imaging element 1 [pixel] will be described with reference to FIG. 16. In a case where an imaging element and a sample are arranged with an objective lens interposed therebetween as illustrated in FIG. 16, it is assumed that a size of a bottom surface of the sample corresponding to the imaging element 1 [pixel] is 13/20 [µm]×13/20 [µm]. Then, when it is assumed that a thickness of the sample is 10 [µm], a volume [m$^3$] of this rectangular parallelepiped is represented by 13/20 [µm]×13/20 [µm]×10 [µm] (note that the volume [L] is represented by 13/20 [µm]×13/20 [µm]×10 [µm]×10$^3$).

Then, when it is assumed that a concentration of the antibodies (which may be, of course, the number of fluorescent molecules) included in the sample is uniform and is 300 [nM], the number of antibodies in the imaging element 1 [pixel] is represented by the following Equation (24).

[Equation 24]

$$300*10^{-9}*\left(\frac{13}{20}*\frac{13}{20}*10*(10^{-6})^1\right)*10^3*6.02*10^{23} \quad (24)$$

As described above, the number of fluorescent molecules or the number of antibodies in the fluorescence stained specimen 30 is calculated as the result of the fluorescence separation processing, such that the practitioner can compare the number of fluorescent molecules among a plurality of fluorescent substances or compare data imaged under different conditions with each other. Furthermore, while the brightness (or fluorescence intensity) is a continuous value, the number of fluorescent molecules or the number of antibodies is a discrete value. Therefore, an information processing apparatus 100 according to the modification can reduce a data amount by outputting the image information on the basis of the number of fluorescent molecules or the number of antibodies.

Other configurations, operations, and effects may be similar to those in the embodiment described above, and a detailed description thereof will thus be omitted here.

4. Third Embodiment

In the first and second embodiments described above, a case of extracting the spectra for every fluorescent substance from the linked fluorescence spectrum by performing the fluorescence separation processing using the linked autofluorescence reference spectrum (and the linked fluorescence reference spectrum) has been exemplified. On the other hand, in a third embodiment, a case of extracting fluorescence spectra for every fluorescent substance directly from a stained section will be exemplified.

Figure 17:
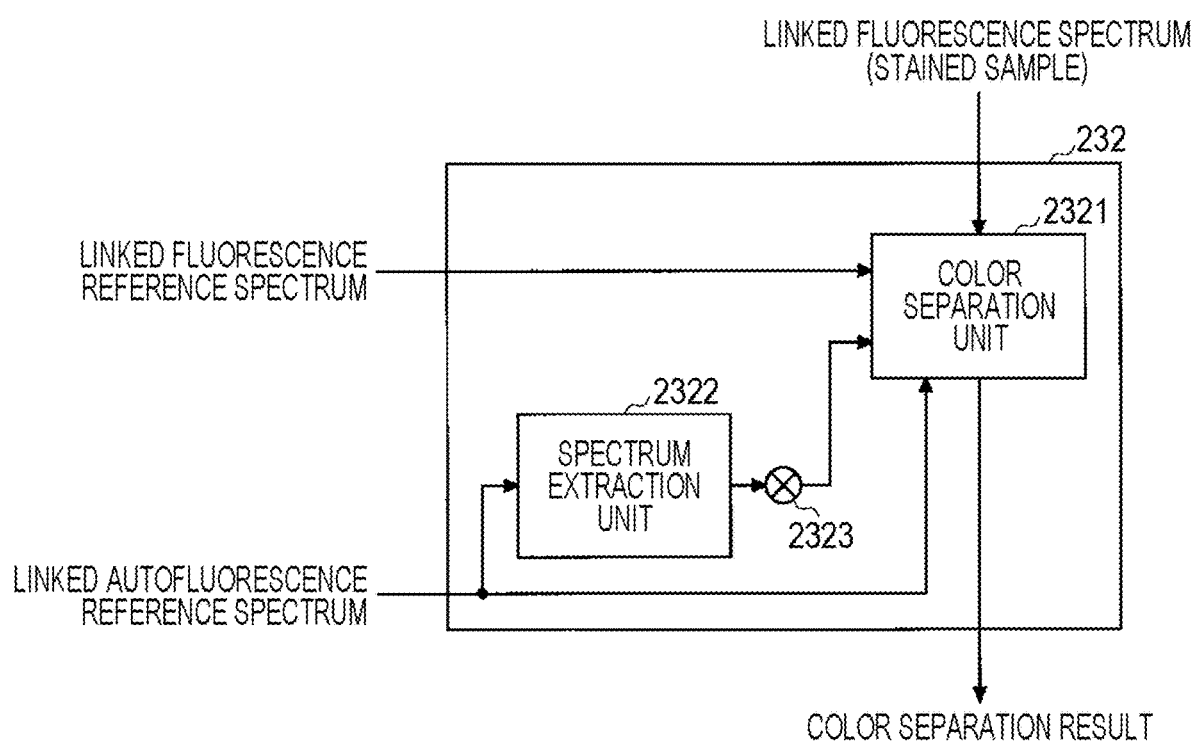
FIG. 17 is a block diagram illustrating a schematic configuration example of a separation processing unit according to a third embodiment.
Figure 18:
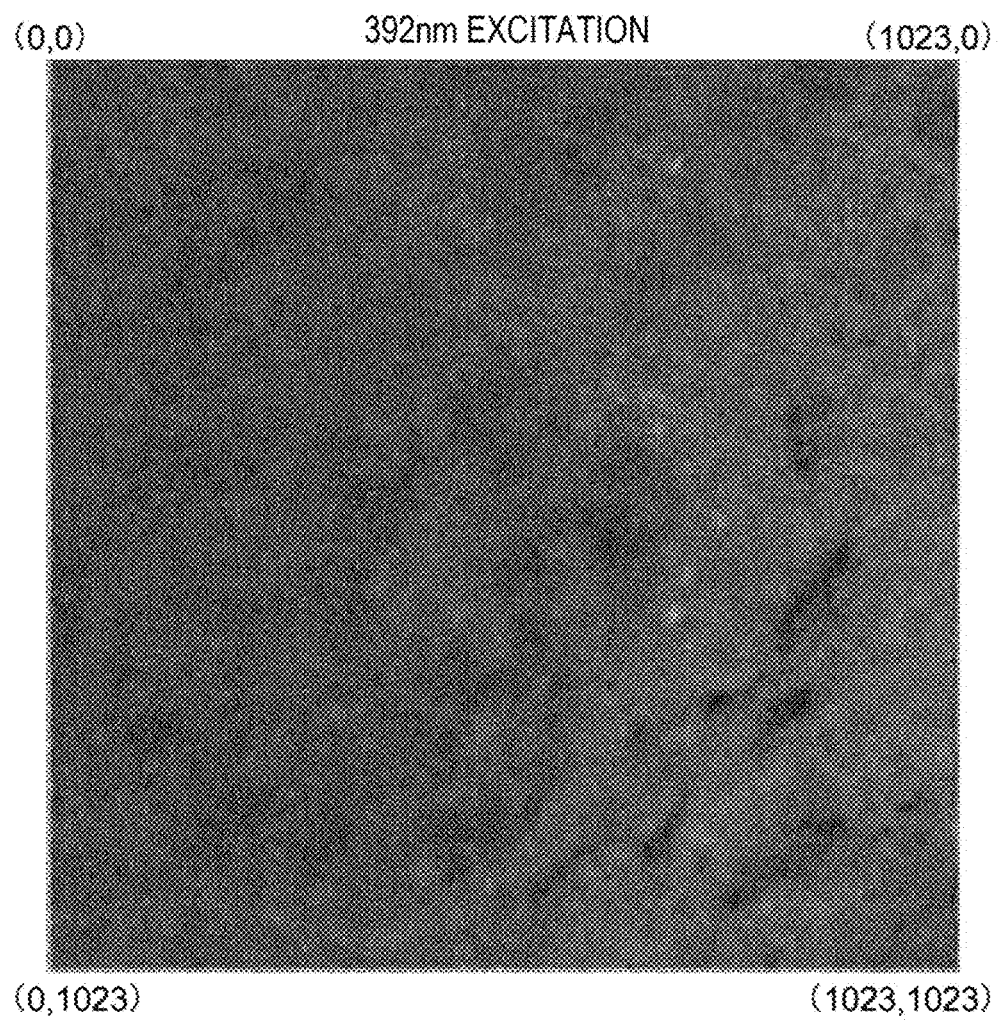
FIG. 18 is a diagram illustrating an example of a specimen image input to a matrix A in the third embodiment (excitation wavelength: 392 nm).
Figure 19:
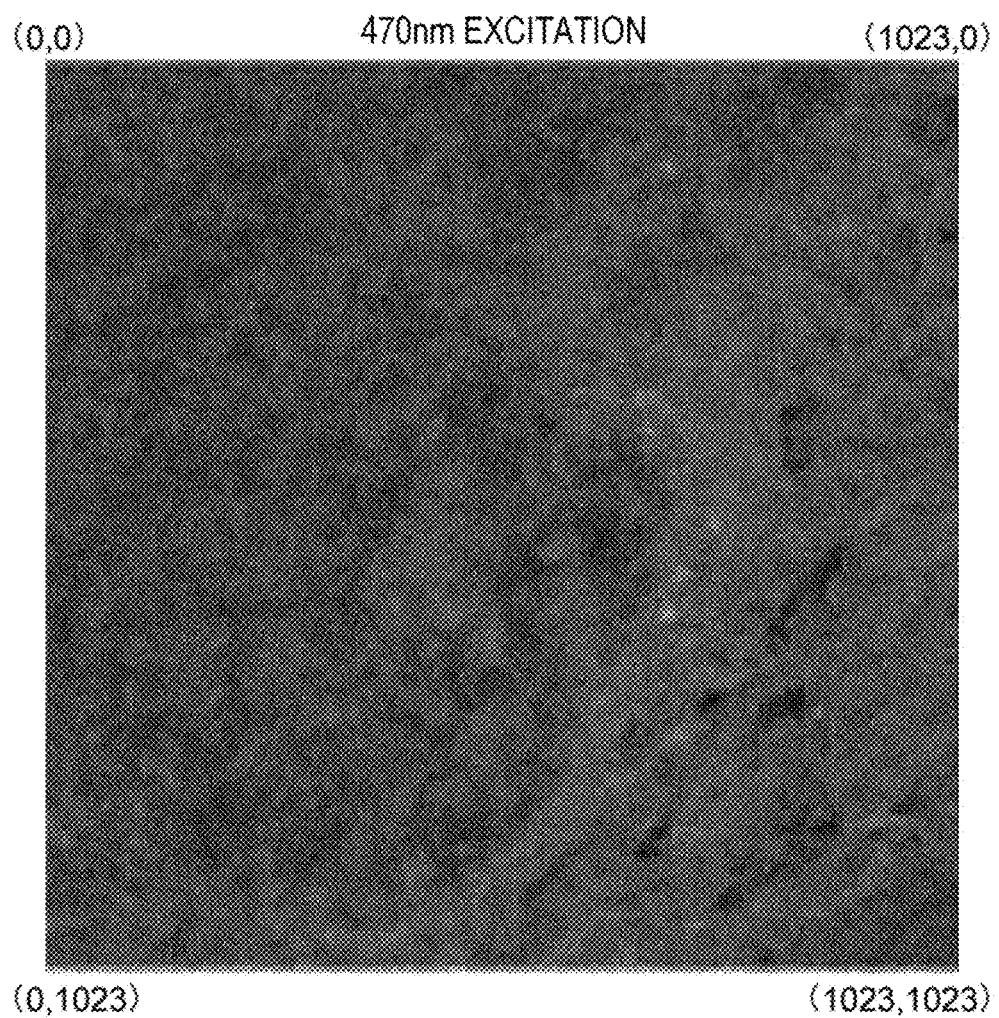
FIG. 19 is a diagram illustrating an example of a specimen image input to the matrix A in the third embodiment (excitation wavelength: 470 nm).
Figure 20:
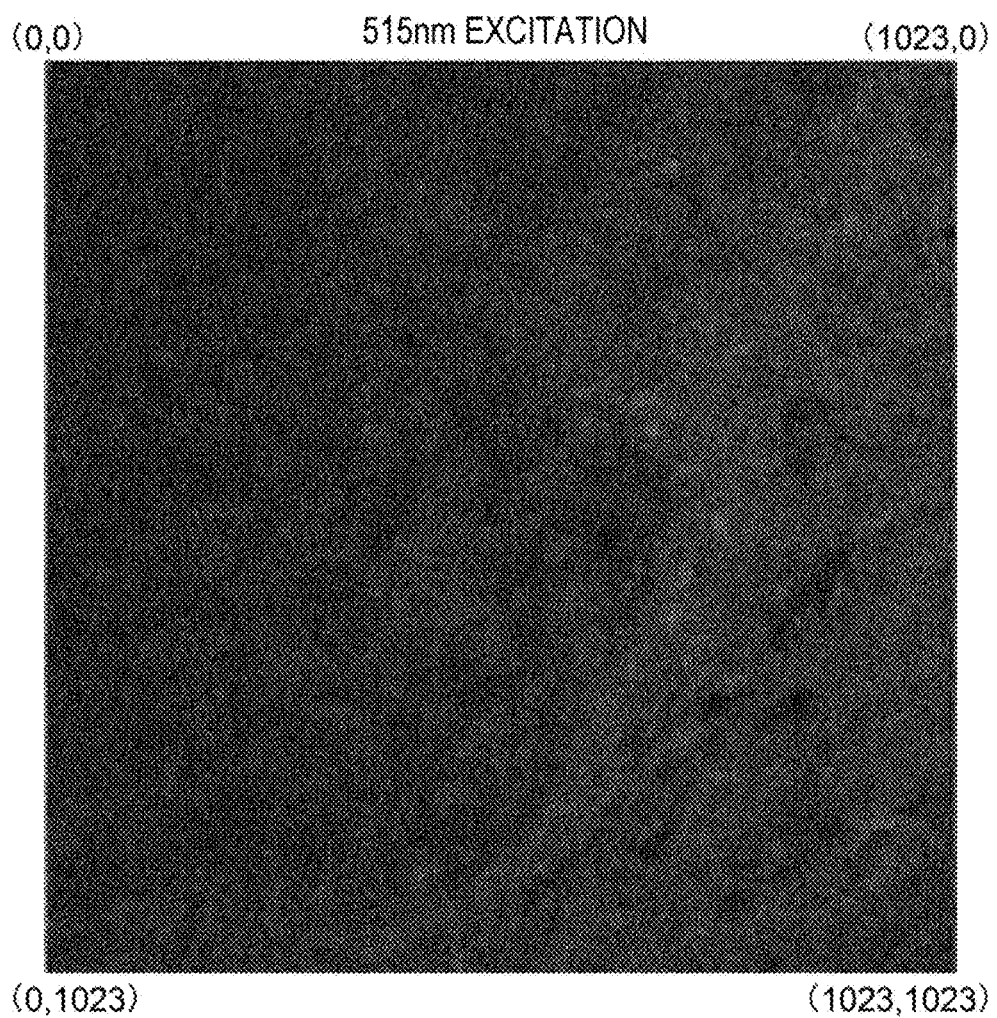
FIG. 20 is a diagram illustrating an example of a specimen image input to the matrix A in the third embodiment (excitation wavelength: 515 nm).
Figure 21:
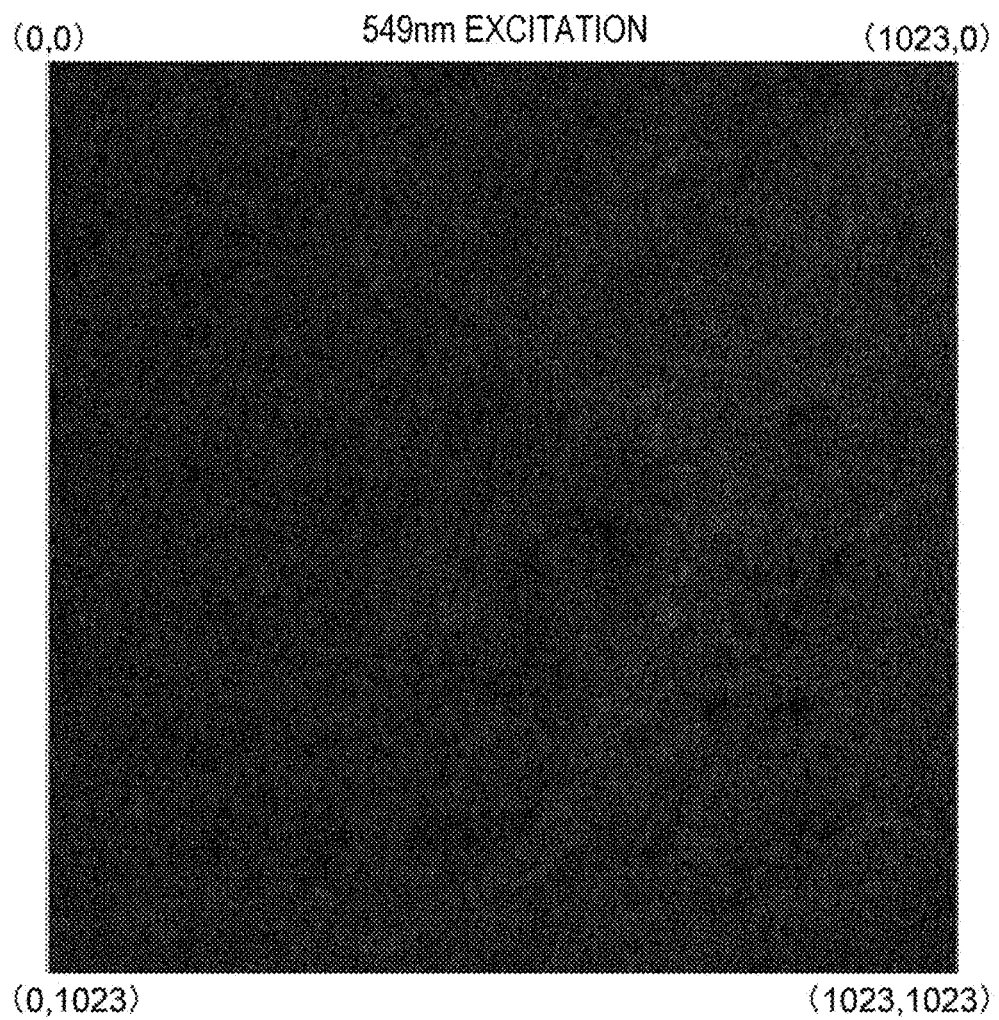
FIG. 21 is a diagram illustrating an example of a specimen image input to the matrix A in the third embodiment (excitation wavelength: 549 nm).
Figure 22:
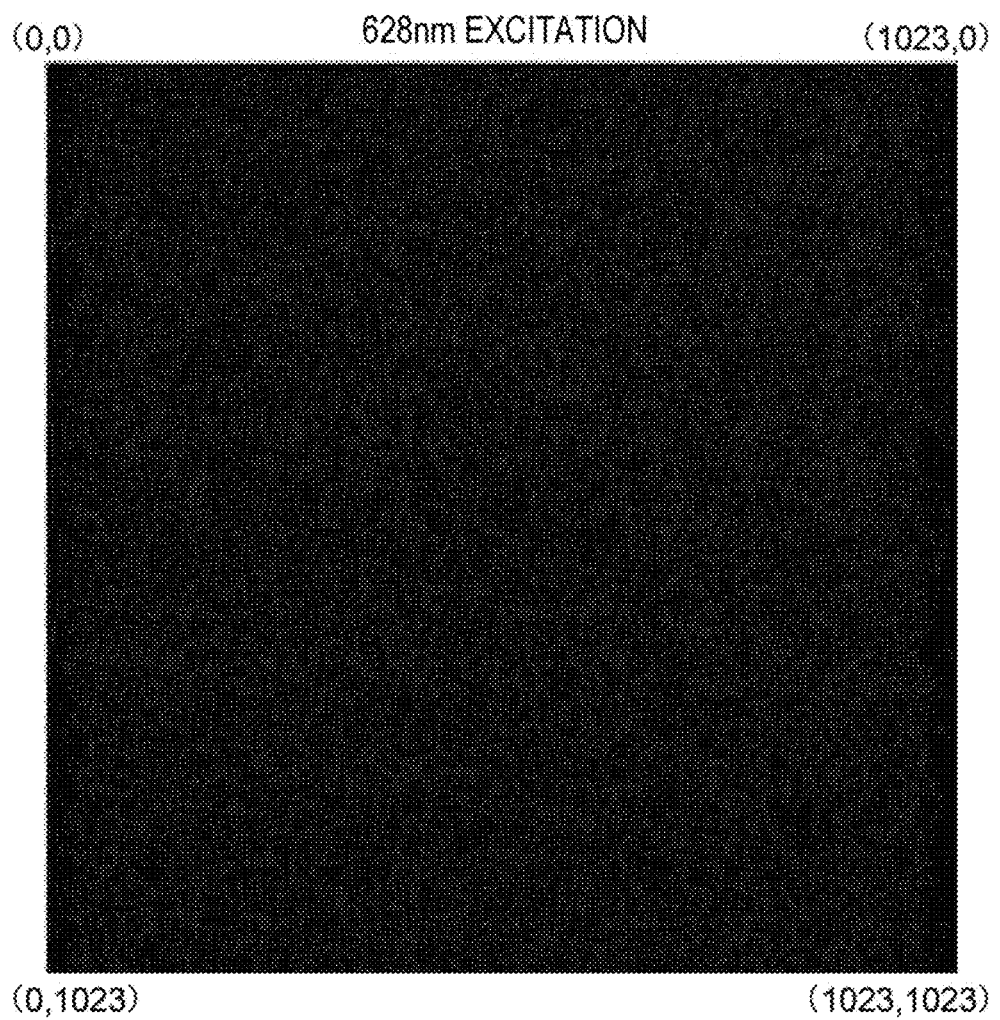
FIG. 22 is a diagram illustrating an example of a specimen image input to the matrix A in the third embodiment (excitation wavelength: 628 nm).
Figure 23:
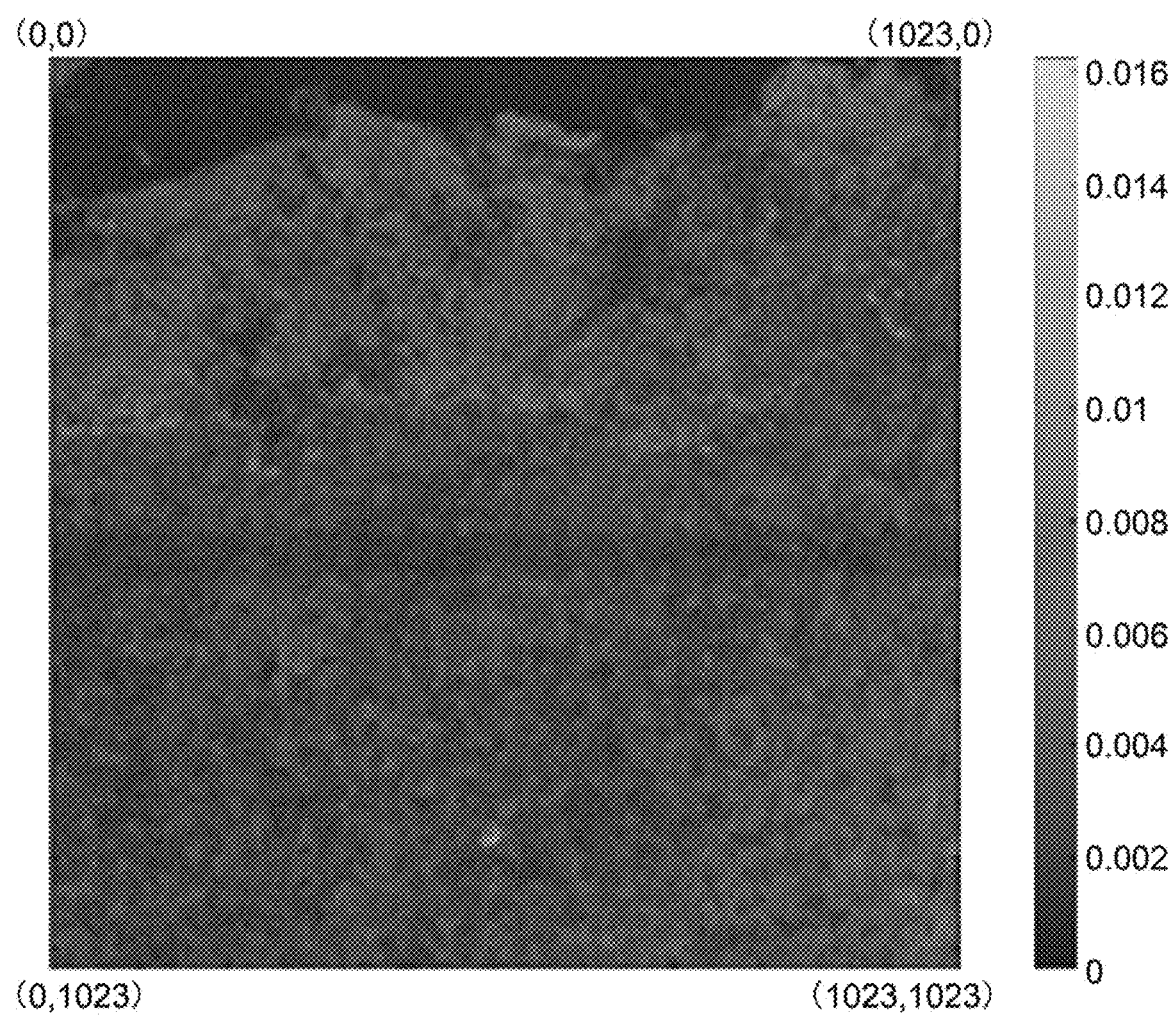
FIG. 23 is a diagram illustrating an example of a fluorescence-separated image acquired as a matrix W by NMF in a case where the specimen images illustrated in FIGS. 18 to 22 are input in the third embodiment (part 1).
Figure 24:
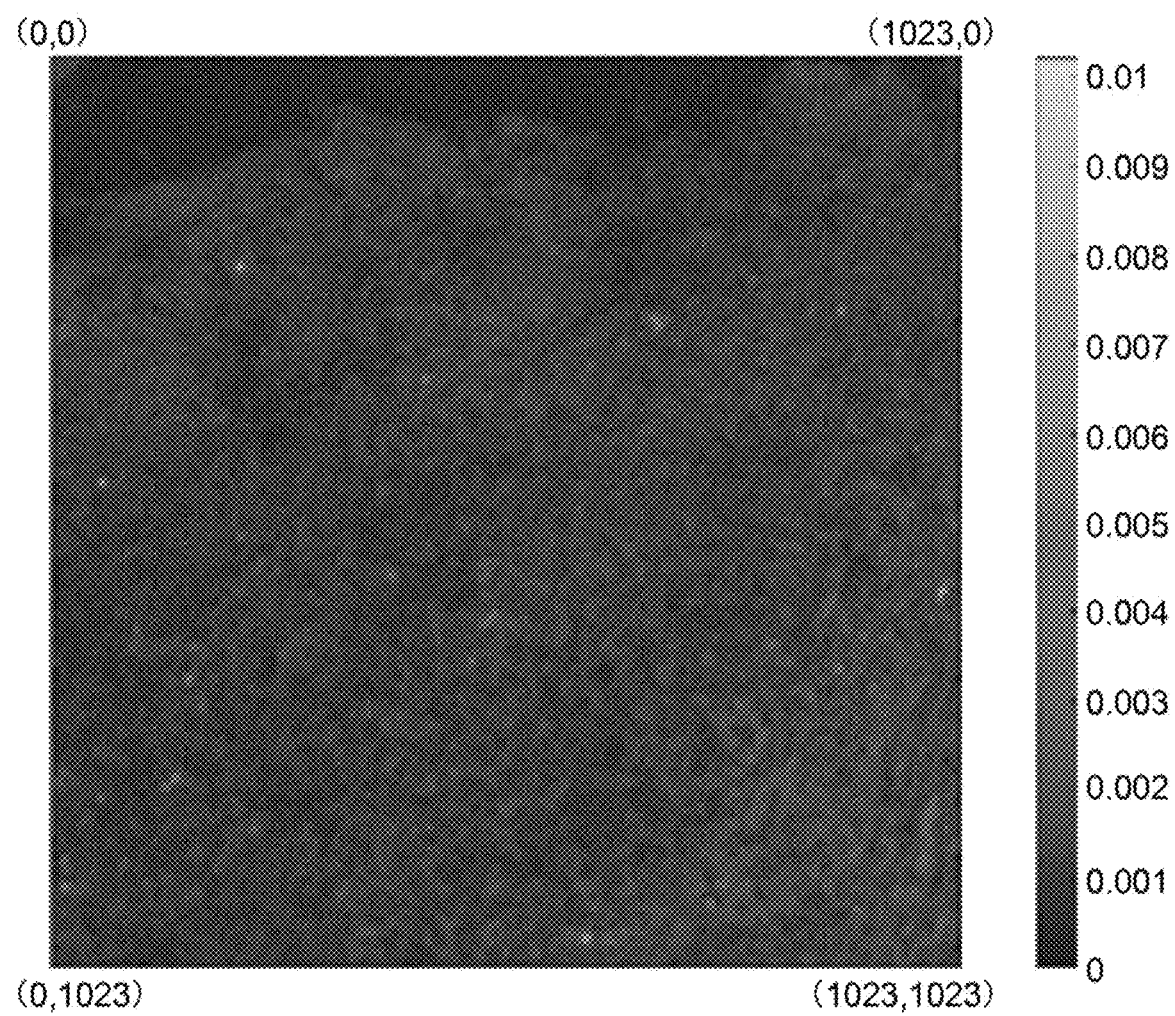
FIG. 24 is a diagram illustrating an example of a fluorescence-separated image acquired as the matrix W by the NMF in a case where the specimen images illustrated in FIGS. 18 to 22 are input in the third embodiment (part 2).
Figure 25:
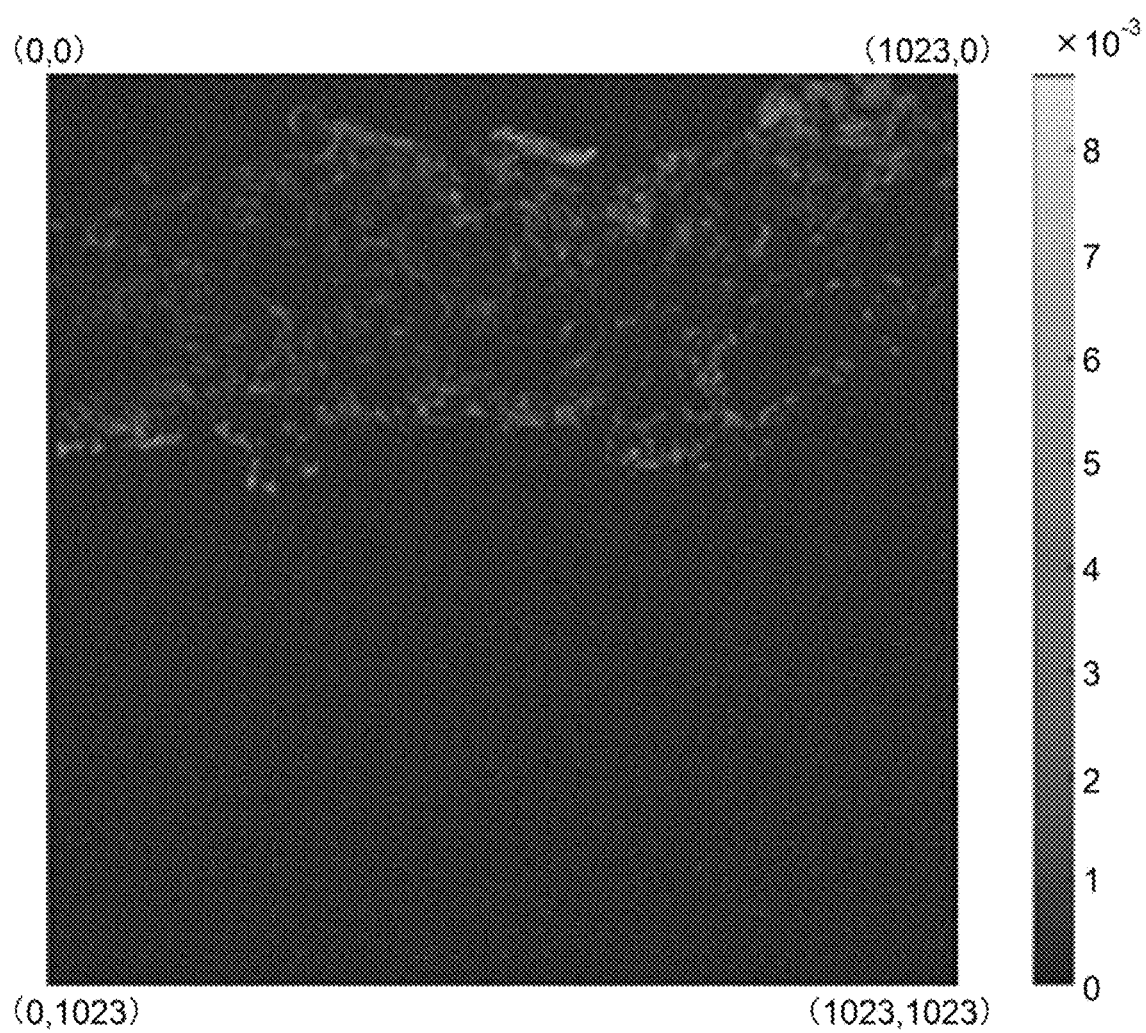
FIG. 25 is a diagram illustrating an example of a fluorescence-separated image acquired as the matrix W by the NMF in a case where the specimen images illustrated in FIGS. 18 to 22 are input in the third embodiment (part 3).
Figure 26:
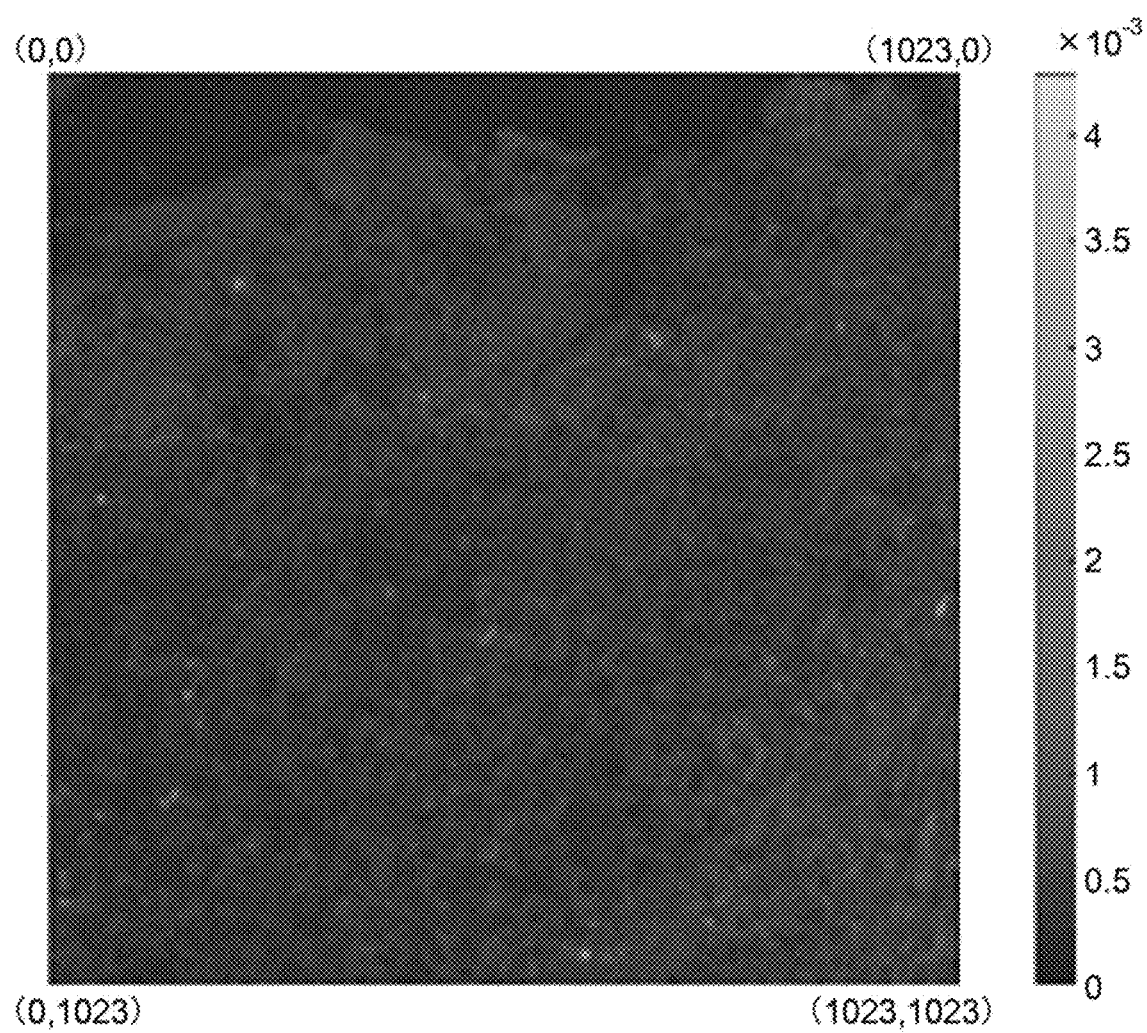
FIG. 26 is a diagram illustrating an example of a fluorescence-separated image acquired as the matrix W by the NMF in a case where the specimen images illustrated in FIGS. 18 to 22 are input in the third embodiment (part 4).
Figure 27:
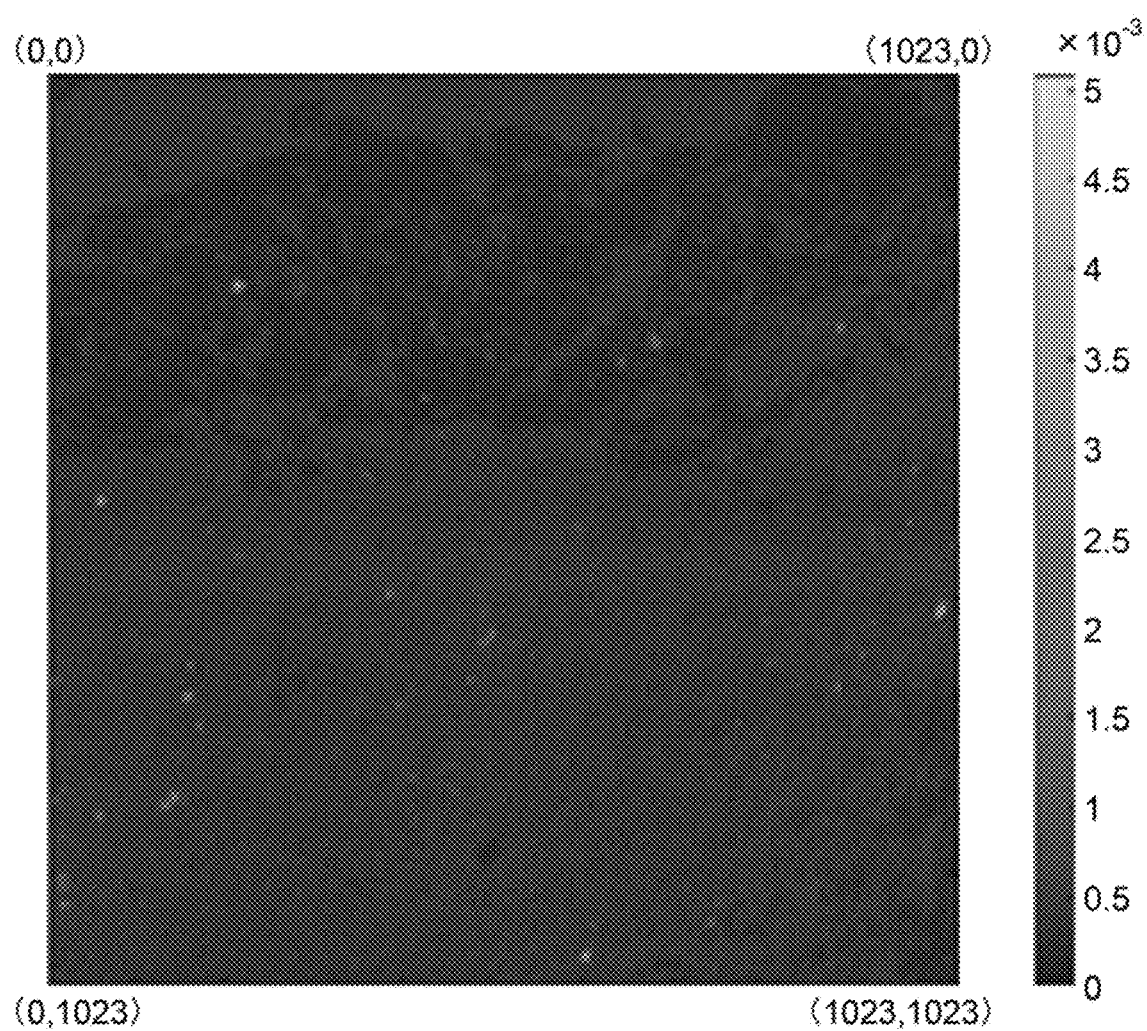
FIG. 27 is a diagram illustrating an example of a fluorescence-separated image acquired as the matrix W by the NMF in a case where the specimen images illustrated in FIGS. 18 to 22 are input in the third embodiment (part 5).
Figure 28:
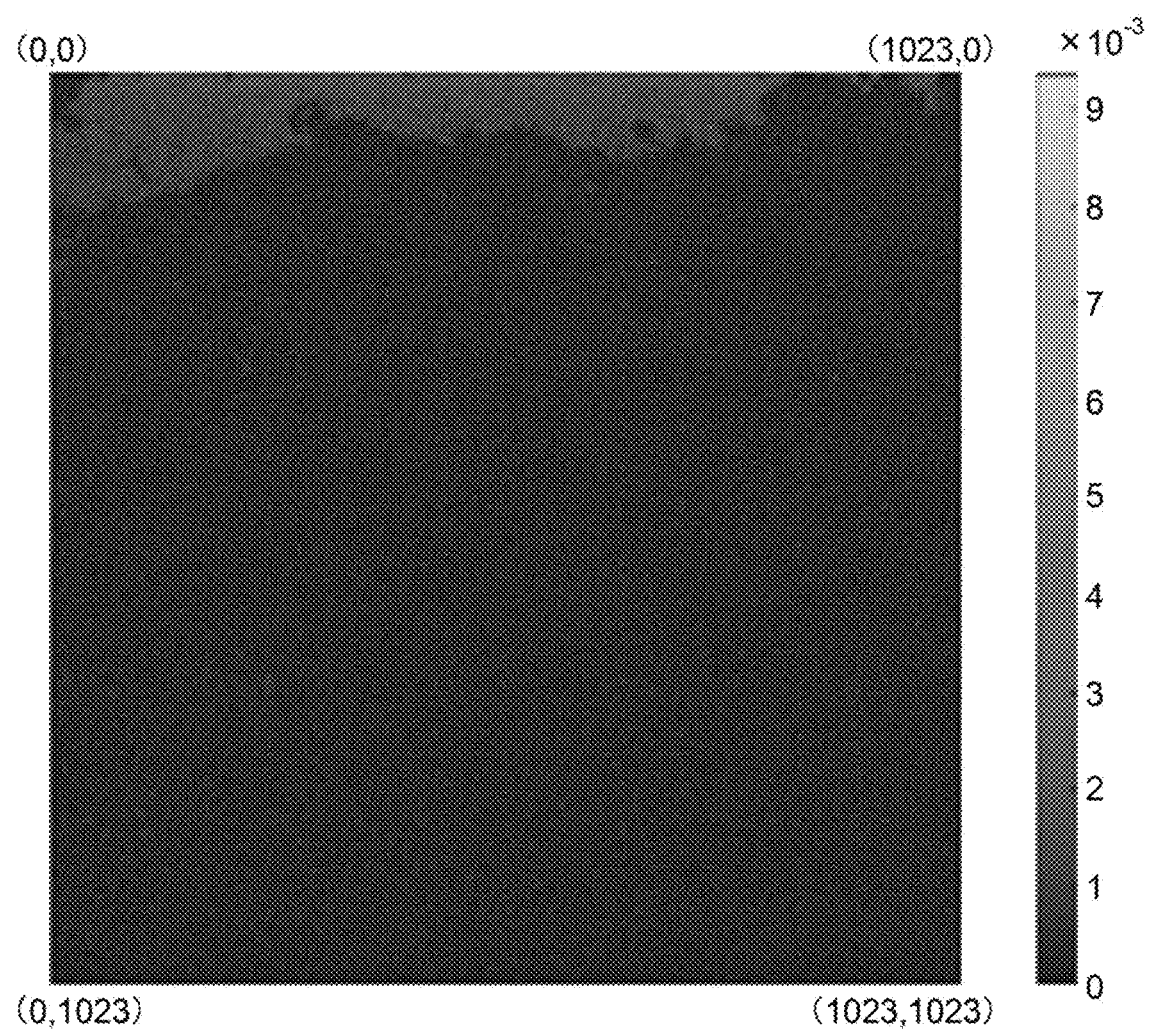
FIG. 28 is a diagram illustrating an example of a fluorescence-separated image acquired as the matrix W by the NMF in a case where the specimen images illustrated in FIGS. 18 to 22 are input in the third embodiment (part 6).
Figure 29:
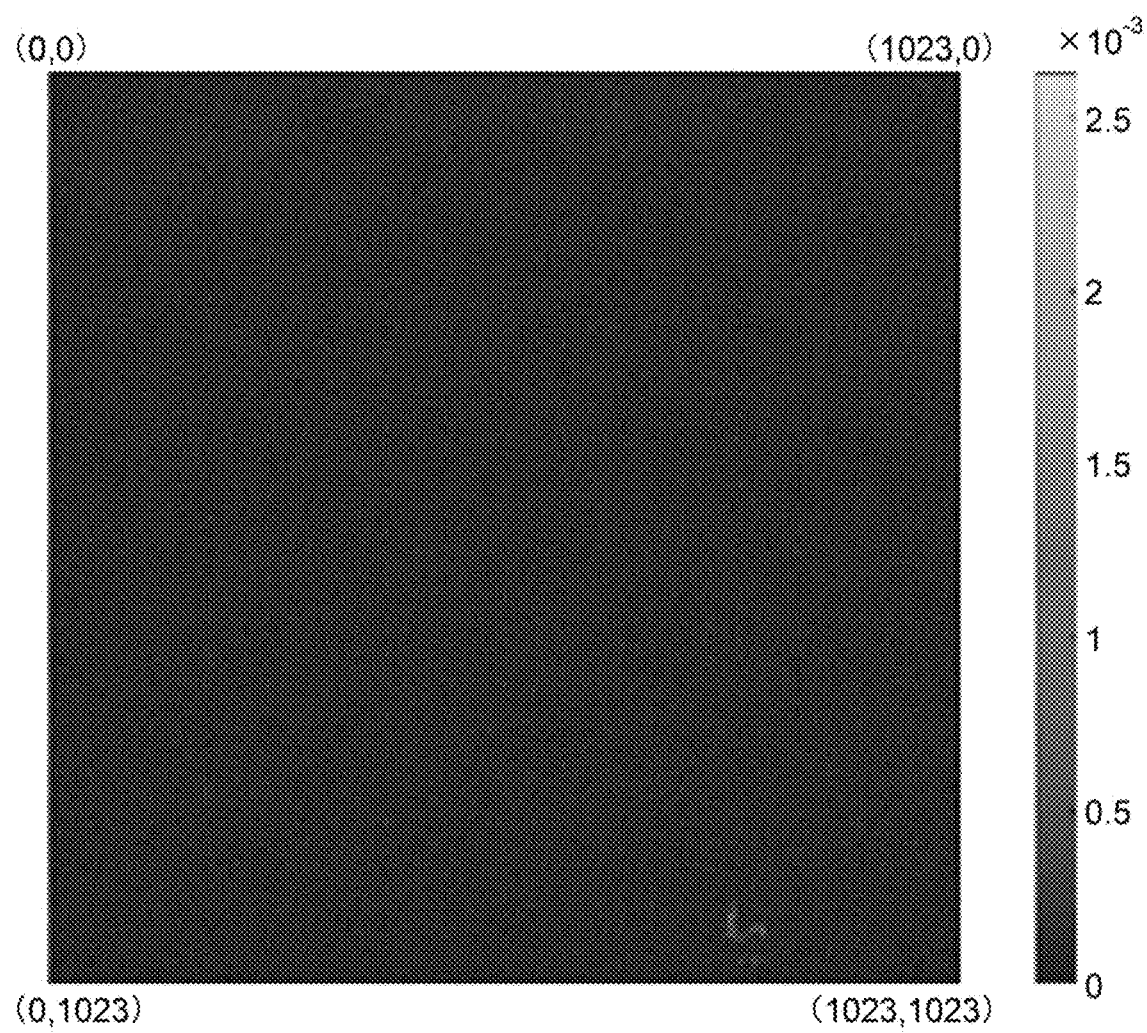
FIG. 29 is a diagram illustrating an example of a fluorescence-separated image acquired as the matrix W by the NMF in a case where the specimen images illustrated in FIGS. 18 to 22 are input in the third embodiment (part 7).

FIG. 17 is a block diagram illustrating a schematic configuration example of a separation processing unit according to the present embodiment. In an information processing apparatus 100 according to the present embodiment, a separation processing unit 132 is replaced with a separation processing unit 232 illustrated in FIG. 17.

As illustrated in FIG. 17, the separation processing unit 232 includes a color separation unit 2321, a spectrum extraction unit 2322, and a data set creation unit 2323.

The color separation unit 2321 color-separates a linked fluorescence spectrum of a stained section (also referred to as a stained sample) input from a link unit 131, for every molecule.

The spectrum extraction unit 2322 is a configuration that improves an autofluorescence spectrum so as to be able to obtain a more accurate color separation result, and adjusts a linked autofluorescence reference spectrum included in specimen information input from an information storage unit 121 so as to obtain a more accurate color separation result.

The data set creation unit 2323 creates a data set of autofluorescence reference spectra from a spectrum extraction result input from the spectrum extraction unit 2322.

More specifically, the spectrum extraction unit 2322 executes spectrum extraction processing using non-negative matrix factorization (NMF), singular value decomposition (SVD), or the like for the linked autofluorescence reference spectrum input from the information storage unit 121 and inputs a result of the spectrum extraction processing to the data set creation unit 2323. Note that in the spectrum extraction processing according to the present embodiment, autofluorescence reference spectra for every cell tissue and/or every type using, for example, a tissue micro array (TMA) are extracted.

The data set creation unit 2323 creates a data set (hereinafter also referred to as an autofluorescence data set) required for color separation processing by the color separation unit 2321 from the autofluorescence reference spectra for every cell tissue and/or every type input from the spectrum extraction unit 2322, and inputs the created autofluorescence data set to the color separation unit 2321.

The color separation unit 2321 separates the linked fluorescence spectrum into spectra for every molecule by executing color separation processing using the linked fluorescence reference spectrum and the linked autofluorescence reference spectrum input from the information storage unit 121 and the autofluorescence data set input from the data set creation unit 2323 for the linked fluorescence spectrum of the stained sample input from the link unit 131. Note that NMF or SVD can be used for the color separation processing.

As the NMF executed by the color separation unit 2321 according to the present embodiment, for example, NMF changed as follows from the NMF (see FIG. 13 and the like) at the time of extracting the autofluorescence spectrum from the non-stained section as described in the second embodiment can be used.

That is, in the present embodiment, the matrix A corresponds to a plurality of specimen images (N is the number of pixels and M is the number of wavelength channels) acquired from the stained section, the matrix H corresponds to fluorescence spectra for every extracted fluorescent substance (k is the number of fluorescence spectra (in other words, the number of fluorescent substances) and M is the number of wavelength channels), and the matrix W corresponds to an image of each fluorescent substance after fluorescence separation. Note that the matrix D is a mean squared residual.

Furthermore, in the present embodiment, an initial value of the NMF may be random, similar to the second embodiment. However, in a case where a result varies for every number of times of execution of the NMF, the initial value needs to be set in order to prevent the variation in the result.

FIGS. 18 to 22 are diagrams illustrating examples of specimen images input to the matrix A in the present embodiment, and FIGS. 23 to 29 are diagrams illustrating examples of fluorescence-separated images acquired as the matrix W by the NMF in a case where the specimen images illustrated in FIGS. 18 to 22 are input. Note that in each of FIGS. 18 to 22, a case where the specimen 20 has been stained with a single fluorescence reagent 10 for simplification of a description is illustrated. Furthermore, it is assumed that fluorescence spectra of a total of eight fluorescent pigments of Arachidonic Acid, Catalase, Collagen, FAD, Hemoglobin, NADPH, ProLong Diamond, and CK are given as initial values of the NMF.

When the NMF is solved with specimen images acquired at each of five excitation wavelengths (number (M) of wavelength channels=5) as illustrated in FIGS. 18 to 22 as the matrix A, seven fluorescence-separated images as illustrated in FIGS. 23 to 29 are acquired as the matrix W, and respective fluorescence spectra are acquired as the matrix H.

Note that in a case where fluorescence separation processing has been performed using an algorithm that changes the order of corresponding spectra depending on a calculation algorithm or an algorithm that needs to change the order of spectra in order to speed up processing or improve convergence of results, such as the NMF, which fluorescent pigment each of the fluorescence spectra obtained as the matrix H corresponds to can be specified by, for example, obtaining a Pearson product moment correlation coefficient (or a cosine similarity) for each of all combinations.

Furthermore, in a case where a default function (NMF) of MATLAB (registered trademark) has been used, even though an initial value is given, the order is changed and output is performed. This can be fixed by a self function, but even though the order is changed due to the use of the default function, it is possible to obtain a correct combination of substance and fluorescence spectrum by using the Pearson product moment correlation coefficient (or cosine similarity), as described above.

As described above, by using a configuration that solves the NMF with the specimen images acquired from the stained section as the matrix A, it becomes possible to extract the fluorescence spectra for every fluorescent substance directly from the stained section without requiring a procedure such as imaging of the non-stained section, generation of the linked autofluorescence reference spectrum, or the like. Therefore, it becomes possible to significantly reduce a time and a work cost required for the fluorescence separation processing.

Moreover, in the present embodiment, the fluorescence spectrum is extracted for every fluorescent substance from the specimen image obtained from the same stained section, and it becomes thus possible to acquire a more accurate fluorescence separation result as compared with, for example, a case of using an autofluorescence spectrum obtained from the non-stained section different from the stained section.

Other configurations, operations, and effects may be similar to those in the embodiment described above, and a detailed description thereof will thus be omitted here.

Note that in the present embodiment, the linked fluorescence spectrum may be used and may not be linked when extracting the fluorescence spectra for every fluorescent substance. That is, in the present embodiment, the link unit 131 may or may not generate the linked fluorescence spectrum. In a case where the link unit 131 does not generate the linked fluorescence spectrum, the extraction unit of the separation processing unit 132 executes processing for extracting the fluorescence spectra for every fluorescent substance from the plurality of fluorescence spectra acquired by the fluorescence signal acquisition unit 112.

5. Fourth Embodiment

In the third embodiment described above, the following method may be mentioned as a method of enhancing a quantitative property such as a concentration with respect to the stained pigment, or the like.

Figure 30:
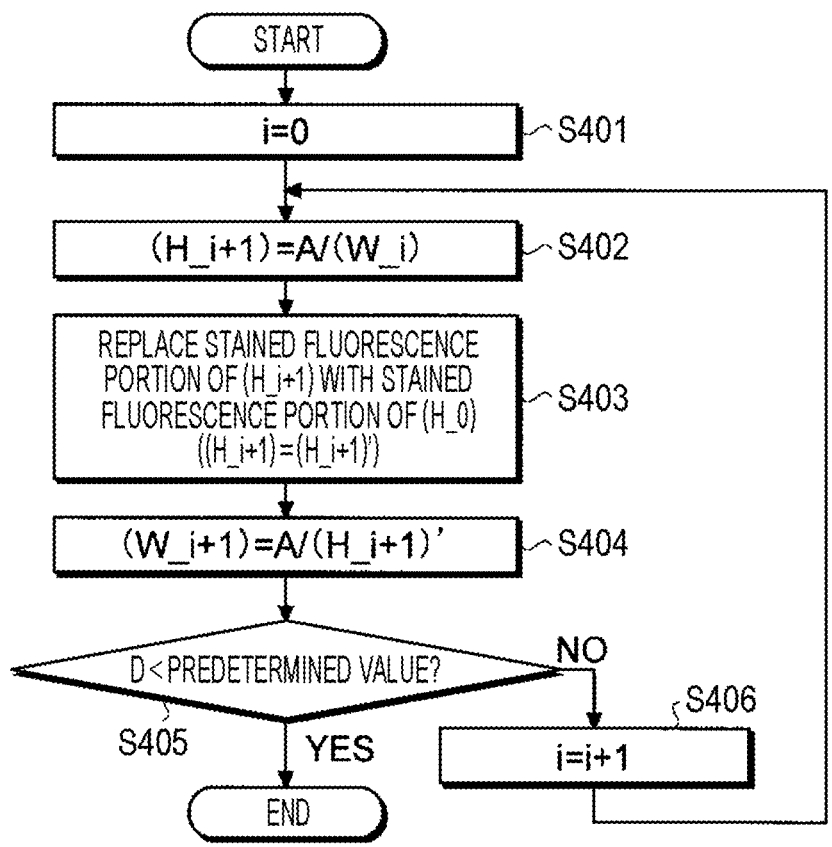
FIG. 30 is a flowchart for describing a flow of NMF according to a fourth embodiment.
Figure 31:
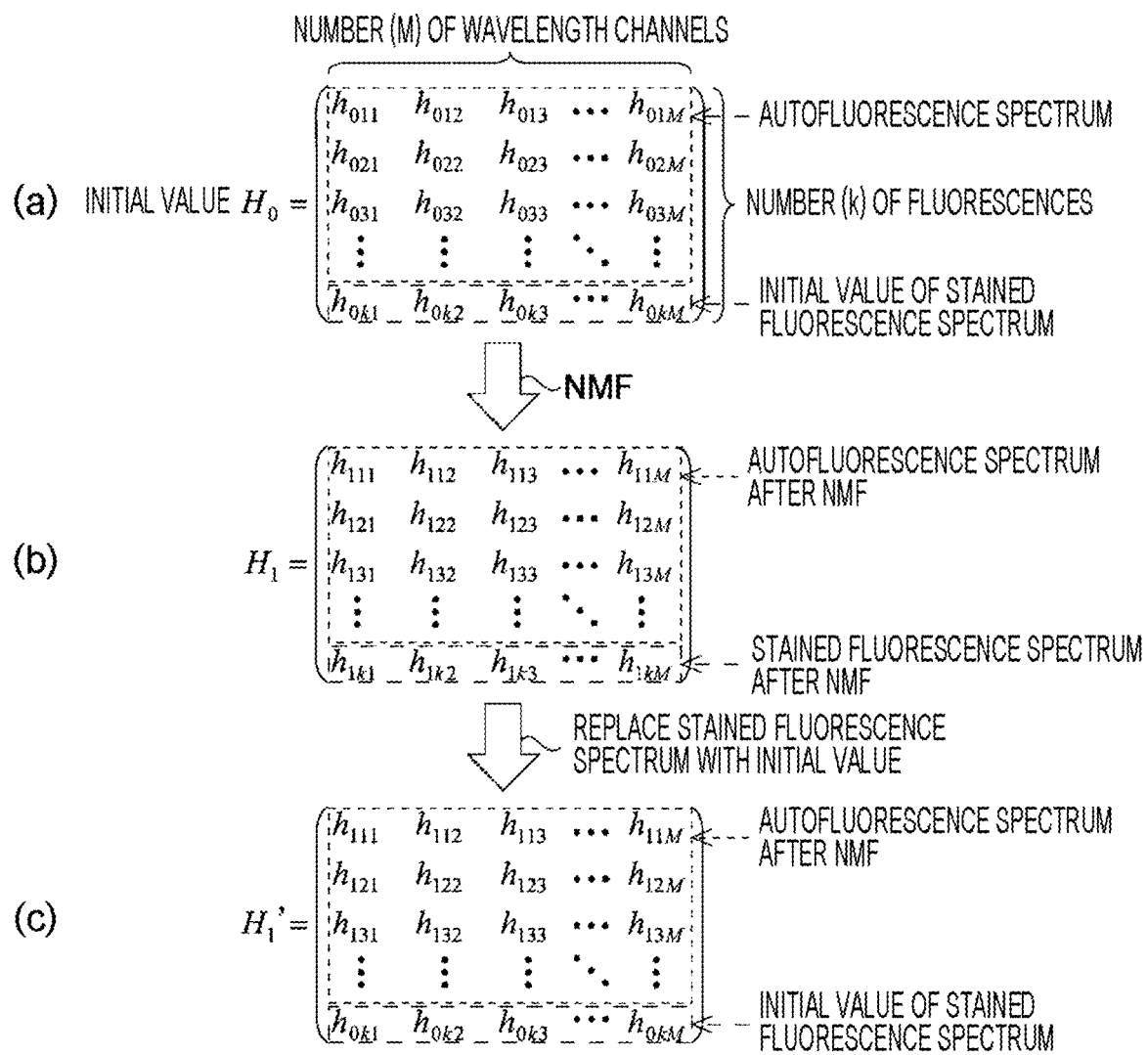
FIG. 31 is a diagram for describing a flow of processing in a first loop of the NMF illustrated in FIG. 30.

FIG. 30 is a flowchart for describing a flow of NMF according to a fourth embodiment. FIG. 31 is a diagram for describing a flow of processing in a first loop of the NMF illustrated in FIG. 30.

As illustrated in FIG. 30, in the NMF according to the present embodiment, first, a variable i is reset to zero (step S401). The variable i indicates the number of times of repetition of factorization in the NMF. Therefore, a matrix $H_0$ illustrated in (a) of FIG. 31 corresponds to an initial value of the matrix H. Note that in the present example, a position of a stained fluorescence spectrum in the matrix H is a bottom row for clarity, but is not limited thereto, and can be variously changed to a top row, a middle row, or the like.

Next, in the NMF according to the present embodiment, similar to normal NMF, a non-negative k-row M-column (k M) matrix $H_{i+1}$ is obtained by dividing the non-negative N-row M-column (N×M) matrix A by a non-negative N-row k-column (N×k) matrix $W_i$ (step S402). Therefore, for example, in the first loop, a matrix $H_1$ as illustrated in (b) of FIG. 31 is obtained.

Next, a row of a fluorescence stained spectrum in the matrix $H_{i+1}$ obtained in step S402 is replaced with the initial value of the fluorescence stained spectrum, that is, a row of the stained fluorescence spectrum in the matrix $H_0$ (step S403). That is, in the present embodiment, the fluorescence stained spectrum in the matrix H is fixed to the initial value. For example, in the first loop, it is possible to fix the stained fluorescence spectrum by replacing a bottom row in the matrix $H_1$ with a bottom row in the matrix $H_0$, as illustrated in (c) of FIG. 31.

Next, in the NMF according to the present embodiment, a matrix $W_{i+1}$ is obtained by dividing the matrix A by the matrix $H_{i+1}$ obtained in step S403 (step S404).

Thereafter, in the NMF according to the present embodiment, similar to the normal NMF, it is determined whether or not a mean squared residual D satisfies a predetermined branching condition (step S405), and in a case where the predetermined branching condition is satisfied (YES in step S405), the NMF ends with the finally obtained matrices $H_{i+1}$ and $W_{i+1}$ as solutions. On the other hand, in a case where the predetermined branch condition is not satisfied (NO in step S405), the variable i is incremented by 1 (step S406), and the processing then returns to step S402, and the next loop is executed.

Figure 32:
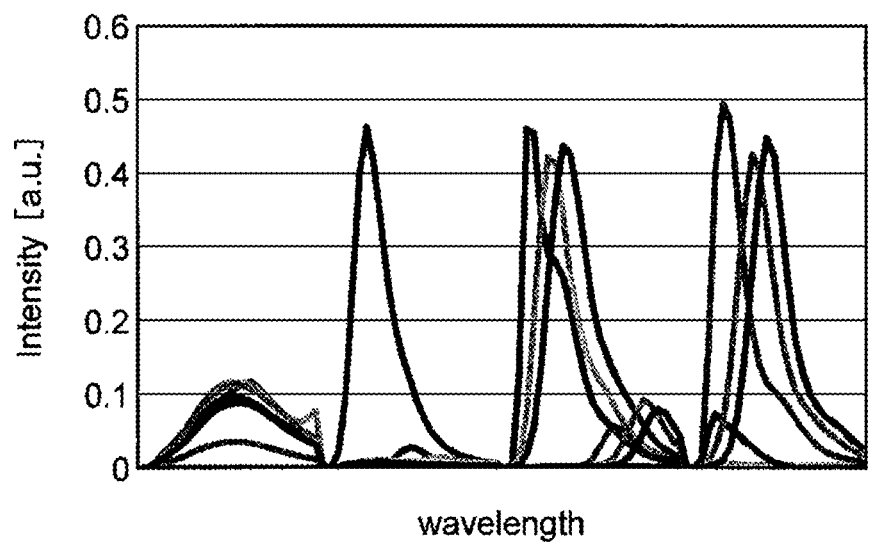
FIG. 32 is a graph illustrating an example of an initial value of a stained fluorescence spectrum.
Figure 33:
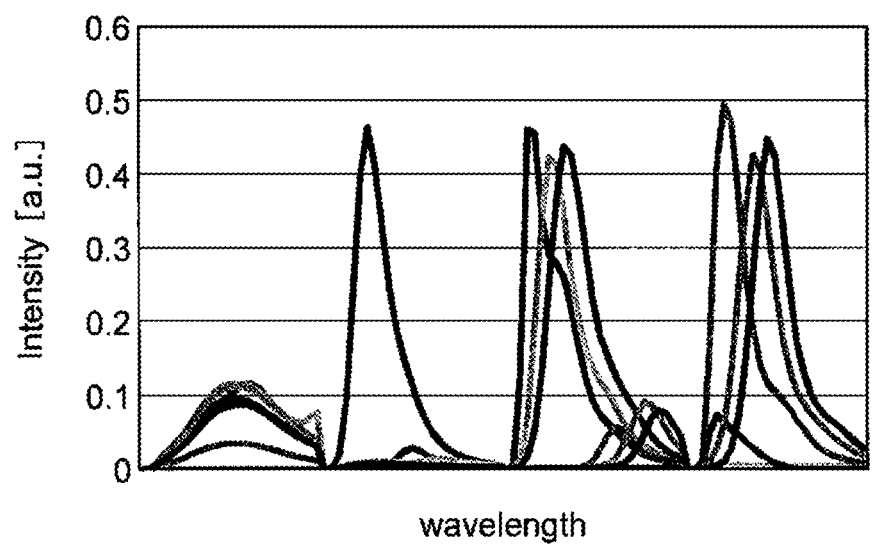
FIG. 33 is a graph illustrating an example of a stained fluorescence spectrum after executing the NMF according to the fourth embodiment.

FIG. 32 is a graph illustrating an example of an initial value of a stained fluorescence spectrum. FIG. 33 is a graph illustrating an example of a stained fluorescence spectrum after executing the NMF according to the present embodiment. As illustrated in FIGS. 32 and 33, it can be seen that the stained fluorescence spectrum is maintained as a spectrum equivalent to the initial value even in a case where the NMF according to the present embodiment is executed.

Figure 34:
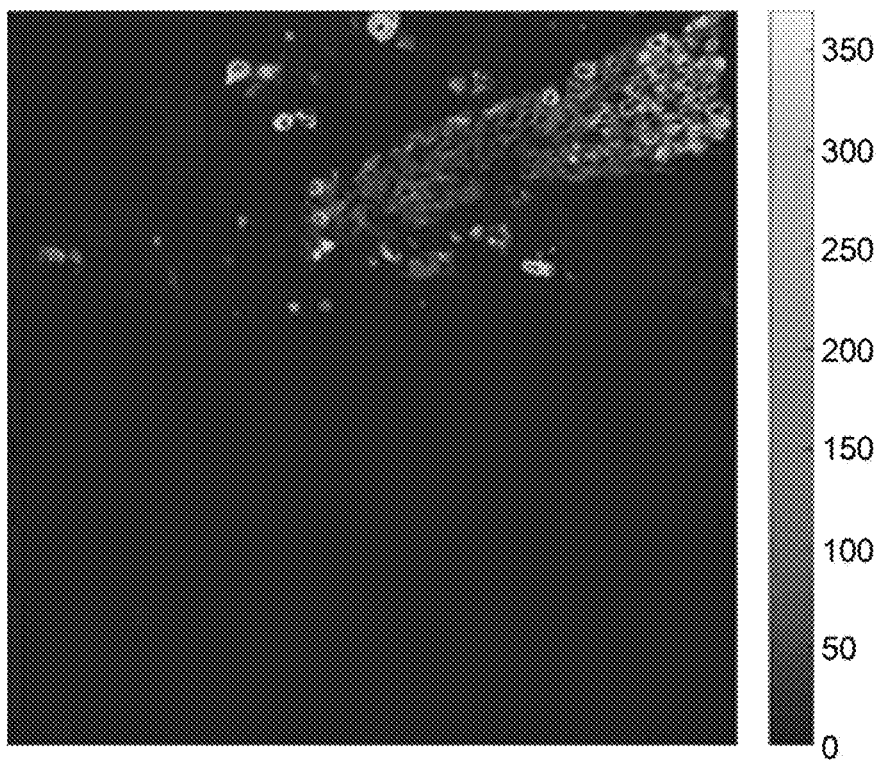
FIG. 34 is a diagram illustrating an example of a spectrum of a fluorescent substance extracted by a method that does not use a non-stained sample according to the fourth embodiment.
Figure 35:
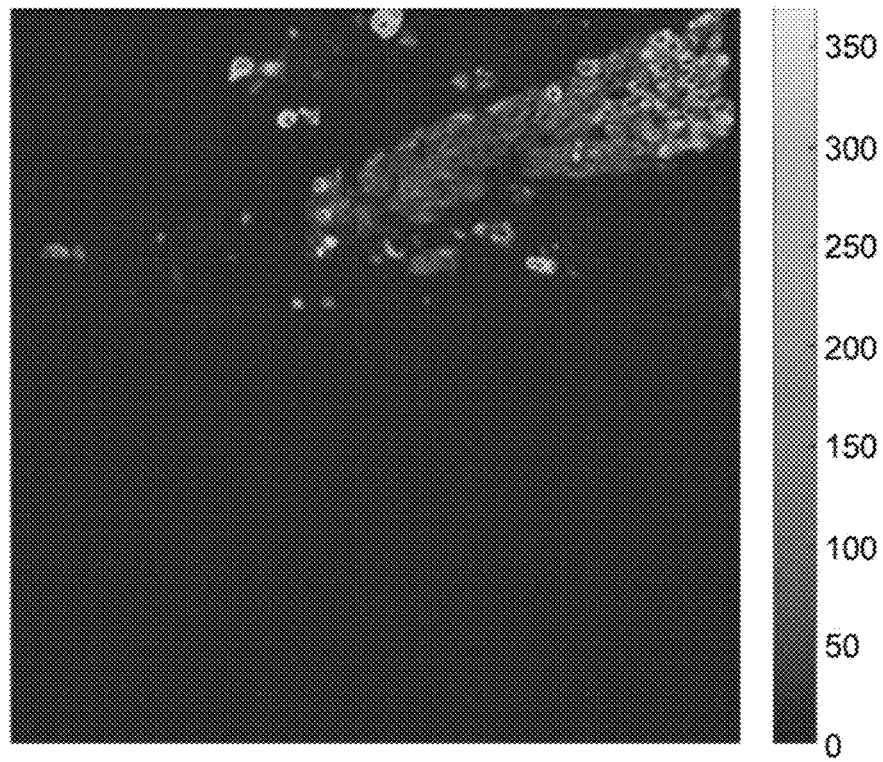
FIG. 35 is a diagram illustrating an example of a spectrum of a fluorescent substance extracted in a case where a non-stained sample is used.

Furthermore, FIG. 34 is a diagram illustrating an example of a spectrum of a fluorescent substance extracted by a method that does not use a non-stained sample according to the present embodiment and FIG. 35 is a diagram illustrating an example of a spectrum of a fluorescent substance extracted in a case where a non-stained sample is used Note that in FIGS. 34 and 35, a case where CD8 has been used as a marker antibody and Alexa Fluor 680 has been used as a fluorescent pigment is exemplified. As illustrated in FIGS. 34 and 35, according to the present embodiment, it is possible to extract the spectrum of the fluorescent substance with accuracy equal to that in a case where the non-stained sample has been used.

As described above, in a first method, in spectrum extraction and color separation of a multi-stained pathological section image (specimen image), it become possible to directly color-separate the stained sample using the NMF while ensuring a quantitative property of a stained fluorescence, that is, while maintaining a spectrum of the same tissue section non-stained sample for autofluorescence spectrum extraction. Therefore, it becomes possible to achieve accurate color separation, for example, as compared with a case of using another specimen. Furthermore, it becomes possible to reduce time and labor for imaging another specimen, or the like.

Note that a method using a recurrence formula that minimizes $D=|A-WH|^2$, a method using a quasi-Newton method (Davidon-Fletcher-Powell (DFP) method), a Broyden-Fletcher-Goldfarb-Shanno (BFGS) method or the like, or the like, can be considered as a method of minimizing the mean squared residual D. In those cases, the following method can be considered as a method of fixing the stained fluorescence spectrum to the initial value.

5.1. Fixing Method of Stained Fluorescence Spectrum in Minimization of Mean Squared Residual D Using Recurrence Formula In the method of minimizing the mean squared residual D using the recurrence formula that minimizes $D=|A|WH|^2$, loop processing that repeats steps including multiplication-type update formulas as expressed by the following Equations (25) and (26) is executed. Note that Equations (25) and (26), $A=(a_{i,j})_{N \times M}$, $H=(h_{i,j})_{k \times M}$, and $W=(w_{i,j})_{N \times k}$. Furthermore, $^t h$ and $^t w$ are transposed matrices of submatrices h and w, respectively.

[Equation 25]

$$w_{i,j}^{k+1} \leftarrow w_{i,j}^k \frac{(a^t h^k)_{i,j}}{(w^k h^{kt} h^k)_{i,j}} \quad (25)$$

[Equation 26]

$$h_{i,j}^{k+1} \leftarrow h_{i,j}^k \frac{(^t w^k a)_{i,j}}{(^t w^k w^k h^k)_{i,j}} \quad (26)$$

In such loop processing, in order to fix the stained fluorescence spectrum to the initial value, a method of inserting a step of executing the following Equation (27) between a step of executing Equation (25) and a step of executing Equation (26) can be used. Note that Equation (27) expresses that a submatrix corresponding to a stained fluorescence spectrum in updated $w_{i,j}^{k+1}$ is overwritten with a submatrix $w_{i,j(part)}^k$, which is the initial value of the stained fluorescence spectrum.

[Equation 27]

$$w_{i,j}^{k+1} \leftarrow w_{i,j(part)}^k \quad (27)$$

5.2. Fixing Method of Stained Fluorescence Spectrum in Minimization of Mean Squared Residual D Using a DFP Method, a BFGS Method, or the Like Furthermore, in the method of minimizing the mean squared residual D using the DFP method, the BFGS method or the like, when the mean squared residual D of a minimization target is $D(x)$ and x is a coordinate $(x_k=(a1, a2, \ldots, an)_k$ at the time of k-th update), $D(x)$ is minimized through the following steps. In the following steps, B indicates a Hessian matrix.

Update coordinate by $x_{k+1}=x_k-\alpha B_k^{-1} D'(x_k)$
Displacement to gradient at new coordinate $x_{k+1}$
Update Hessian inverse matrix $B_{k+1}^{-1}$ from $y_k= D'(x_{k+1})-D'(x_k)$ Various methods such as, for example, the DFP method expressed by the following Equation (28), the BFGF method expressed by the following Equation (29), or the like, can be applied to the update of the Hessian matrix Bk+1.

[Equation 28]

$$B_{k+1} = \left(I - \frac{y_k \Delta x_k^T}{y_k^T \Delta x_k}\right) B_k \left(I - \frac{\Delta x_k y_k^T}{y_k^T \Delta x_k}\right) + \frac{y_k y_k^T}{y_k^T \Delta x_k} \quad (28)$$

[Equation 29]

$$B_{k+1} = B_k + \frac{y_k y_k^T}{y_k^T \Delta x_k} - \frac{B_k \Delta x_k (B_k \Delta x_k)^T}{\Delta x_k^T B_k \Delta x_k} \quad (29)$$

In such a method of minimizing the mean squared residual D using the DFP method, the BFGS method or the like, there are several methods as a method of fixing an arbitrary coordinate, that is, a method of fixing the stained fluorescence spectrum to the initial value. For example, the stained fluorescence spectrum can be fixed to the initial value by a method of executing the following processing (1) or processing (2) at a timing of updating the coordinate.

(1) $-\alpha B_k^{-1} D'(x_k)=0$, that is, replace partial differential D'$(x_k)$ with zero (2) After calculating $x_k+1$ after updating the coordinate, forcibly replace a part of the obtained coordinate $x_{k+1}$ with $x_k$ (or a part of $x_k$)

6. Fifth Embodiment

Next, a sixth embodiment of the present disclosure will be described in detail with reference to the drawings.

A method of separating and analyzing certain data into elements configuring the data and coefficients of the elements, including machine learning, is widely used. As a method of decomposing data into elements (bases or spectra) (they are referred to as spectra in the present disclosure) and coefficients, there are various methods such as the eigenvalue decomposition, the singular value decomposition, the non-negative matrix factorization (NMF), or the like, described in the embodiment described above. It can be said that, in particular, NMF for non-negative data has a high similarity between an obtained solution and an actual spectrum (for example, absorption spectrum, fluorescence spectrum or the like of a material) and is advantageous in interpreting the data, since both of the spectra and the coefficients are non-negative values.

As described above, the NMF is a method of representing a data matrix A by the sum of the product of a spectrum S (corresponding to the matrix H of FIG. 13) and a coefficient C (corresponding to the matrix W of FIG. 13) and an error f (corresponding to the mean squared residual D of FIG. 13) and performing matrix factorization under a non-negative restraint condition so that the error $(f=|A-S\times C|^2)$ becomes minimum, and has a feature that it is easy to approximate the data by minimal spectra (low rank approximation). In this NMF, a calculation method using a recurrence formula is established, and a combination of S and C that minimizes the error f can be obtained by repeatedly calculating the following Equation (30).

[Equation 30]

$$Sijk+1=Sijk \times Xij$$

$$Cijk+1=Cijk \times Yij \quad (30)$$

Note that Xij and Yij are values represented by the following Equation (31), respectively.

[Equation 31]

$$Xij = \frac{(A^t C)ij}{(SC^t C)ij}$$

$$Yij = \frac{({}^t SA)ij}{({}^t SSC)ij} \quad (31)$$

Furthermore, in Equation (31), a matrix $'C$ and a matrix $'S$ are transposed matrices of the matrix C and the matrix S, respectively.

Here, a case where the matrix A has p data (corresponding to the number N of pixels of FIG. 13) of the number w (corresponding to the number M of wavelength channels of FIG. 13) and these data are approximated by n spectra of the number w of element components is considered. In that case, the matrix A can be represented by the following Equation (32).

[Equation 32]

$$A(p,w)=S(n,w)\times C(p,n) \quad (32)$$

In Equation (32), it is necessary to refer to a matrix A(p,w) when calculating Xij and Yij given by Equation (31) described above. Therefore, it is necessary to perform calculation for all points p for every iterative calculation.

Performing the calculation for all points p for every iterative calculation is hardly problematic if data to be analyzed is small-scale data, but becomes a factor that increases a calculation time in a case of large-scale data having a very large number of data points. Furthermore, in a case where all the p data cannot be expanded in a memory (for example, a RAM 903 in FIG. 42 as described later), a problem that access to an external storage device (for example, a storage device 908 of FIG. 42) frequently occurs, such that a processing time becomes more redundant can occur.

On the other hand, the present inventors have discovered that the spectrum S can be obtained by performing non-negative decomposition on the Gram matrix $'AA$ of the data matrix A instead of the data matrix A to be decomposed.

Therefore, in the present embodiment, the spectrum S, which is a solution, is obtained by converting the data matrix A into the Gram matrix $'AA$ and performing the non-negative decomposition on the Gram matrix $'AA$. By converting the data matrix A into the Gram matrix $'AA$, it is possible to make a processing-symmetric matrix a square matrix. Therefore, for example, the data matrix A in which the number N of pixels is extremely large with respect to the number M of wavelength channels is converted into the M×M Gram matrix $'AA$, and it becomes thus possible to significantly reduce the number of data points to shorten a calculation time and to significantly reduce a memory amount required for calculation. As a result, it is possible to achieve high efficiency of analysis.

(6.1. Outline of Processing by Processing Unit)

An information processing apparatus according to the present embodiment has, for example, a configuration similar to that of the information processing apparatus 100 (see FIG. 1) according to the embodiment described above, and a processing unit 130 (for example, a separation processing unit 132) executes the following operations.

First, the processing unit 130 according to the present embodiment obtains the spectrum S by calculating the Gram matrix $'AA$ of the matrix A in advance and performing non-negative decomposition of the calculated Gram matrix $'AA$ into $'AA=S\times E$, in a process of performing non-negative factorization or singular value decomposition of the data matrix A into $A=S\times C$.

Second, the processing unit 130 according to the present embodiment obtains the Gram matrix $'AA$ by convoluting each Gram matrix $'AqAq$ (q is an integer of 1 or more and n or less) as in the following Equation (33) using a subset in which $A(p,w)=A1(p1-pn1,w)+A2(pn1+1-pm,w)+\ldots+Ao(pm+1-p,w)$, in a process of calculating the Gram matrix $'AA$.

[Equation 33]

$${}^tAA={}^tA1A1+{}^tA2A2+\ldots+{}^tAnAn \quad (33)$$

Third, the coefficient C is obtained by solving $A=S\times C$ using the spectrum S obtained by the non-negative decomposition with respect to the Gram matrix described above.

(6.2. Configuration Example of Measurement System)

Figure 36:
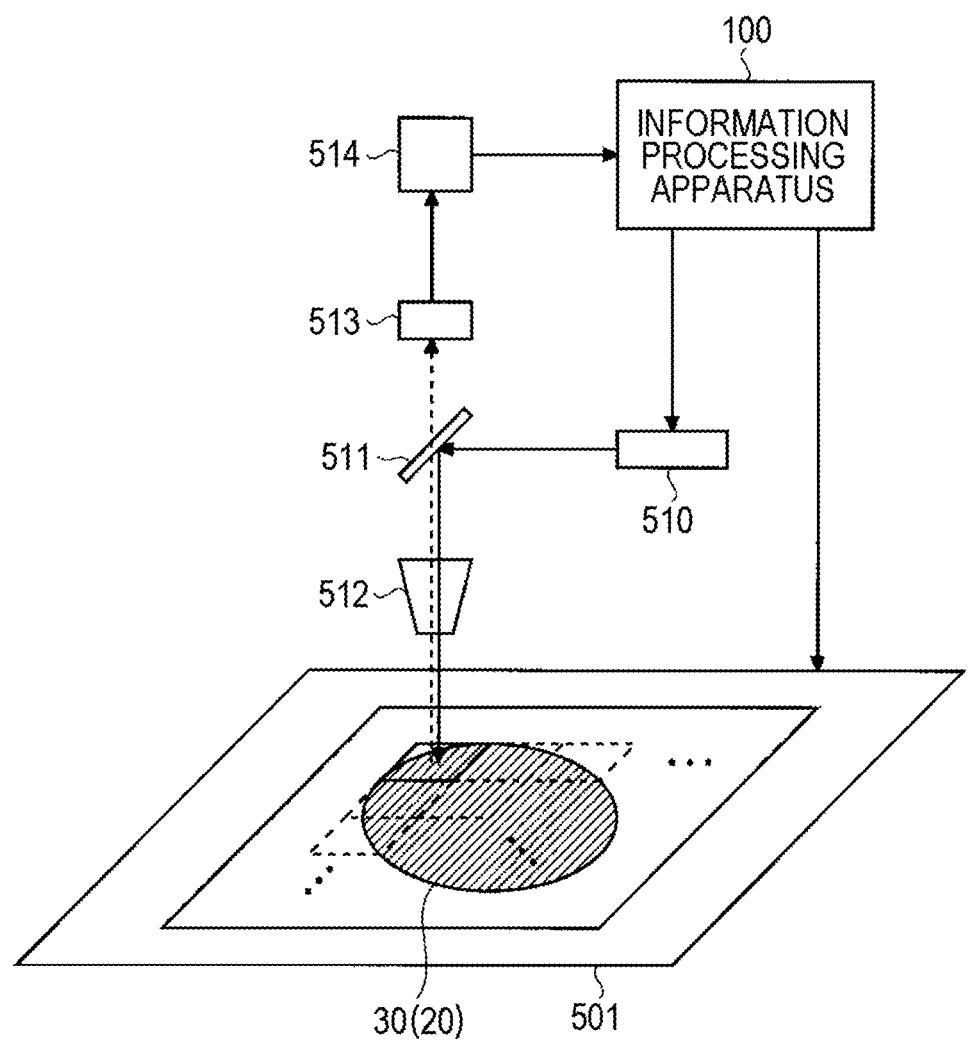
FIG. 36 is a diagram illustrating an example of a measurement system of an information processing system according to a sixth embodiment.

Next, a configuration example of a measurement system in the information processing apparatus 100 according to the present embodiment will be described. FIG. 36 is a diagram illustrating an example of a measurement system of an information processing system according to the present embodiment. Note that in FIG. 36, an example of a measurement system at the time of imaging a wide visual field of a fluorescence stained specimen 30 (or a specimen 20 that is a non-stained specimen), such as whole slide imaging (WSI) and the like is illustrated. However, the measurement system according to the present embodiment is not limited to the measurement system illustrated in FIG. 36, and may be variously modified as long as it is a measurement system capable of acquiring image data (hereinafter referred to as wide visual field image data) of a sufficient resolution of the entire imaging region or a region of interest, such as a measurement system that images the entire imaging region or a necessary region (also referred to as a region of interest) at a time, a measurement system that acquires an image of the entire imaging region or a region of interest by line scanning, or the like.

As illustrated in FIG. 36, the measurement system according to the present embodiment includes, for example, the information processing apparatus 100, an XY stage 501, an excitation light source 510, a beam splitter 511, an objective lens 512, a spectroscope 513, and a photodetector 514.

The XY stage 501 is a stage on which the fluorescence stained specimen 30 (or the specimen 20) that is an analysis target is placed, and may be, for example, a stage that is movable on a plane (XY plane) parallel to a placement surface of the fluorescence stained specimen 30 (or the specimen 20).

The excitation light source 510 is a light source for exciting the fluorescence stained specimen 30 (or the specimen 20), and emits, for example, a plurality of excitation lights having different wavelengths along a predetermined optical axis.

The beam splitter 511 includes, for example, a dichroic mirror or the like, reflects the excitation light from the excitation light source 510, and transmits a fluorescence from the fluorescence stained specimen 30 (or the specimen 20).

The objective lens 512 irradiates the fluorescence stained specimen 30 (or specimen 20) on the XY stage 501 with the excitation light reflected by the beam splitter 511.

The spectroscope 513 is configured by using one or more prisms, lenses or the like, and disperses a fluorescence emitted from the fluorescence stained specimen (or the specimen 20) and transmitted through the objective lens 512 and the beam splitter 511 in a predetermined direction.

The photodetector 514 detects a light intensity for every wavelength of the fluorescence dispersed by the spectroscope 513, and inputs a fluorescence signal (fluorescence spectrum and/or autofluorescence spectrum) obtained by the detection to a fluorescence signal acquisition unit 112 of the information processing apparatus 100.

In the configuration as described above, in a case where the entire imaging region exceeds a region (hereinafter referred to as a visual field) that can be imaged at a time, such as the WSI, imaging of each visual field s sequentially performed by moving the visual field by moving the XY stage 501 for every imaging. Then, by tiling image data (hereinafter, referred to as visual field image data) obtained by imaging each visual field, wide visual field image data of the entire imaging region is generated. The generated wide visual field image data is stored in, for example, a fluorescence signal storage unit 122. Note that the tiling of the visual field image data may be performed by an acquisition unit 110 of the information processing apparatus 100, may be performed by a storage unit 120 of the information processing apparatus 100, or may be performed by the processing unit 130 of the information processing apparatus 100.

Then, the processing unit 130 according to the present embodiment acquires the coefficient C, that is, a fluorescence-separated image for every fluorescent molecule (or autofluorescence-separated image for every autofluorescent molecule) by executing the processing described above for the obtained wide visual field image data.

(6.3. Operation Example)

Next, an operation example of the information processing apparatus 100 according to the present embodiment will be described. Note that the following description will focus on an operation of the processing unit 130.

Figure 37:
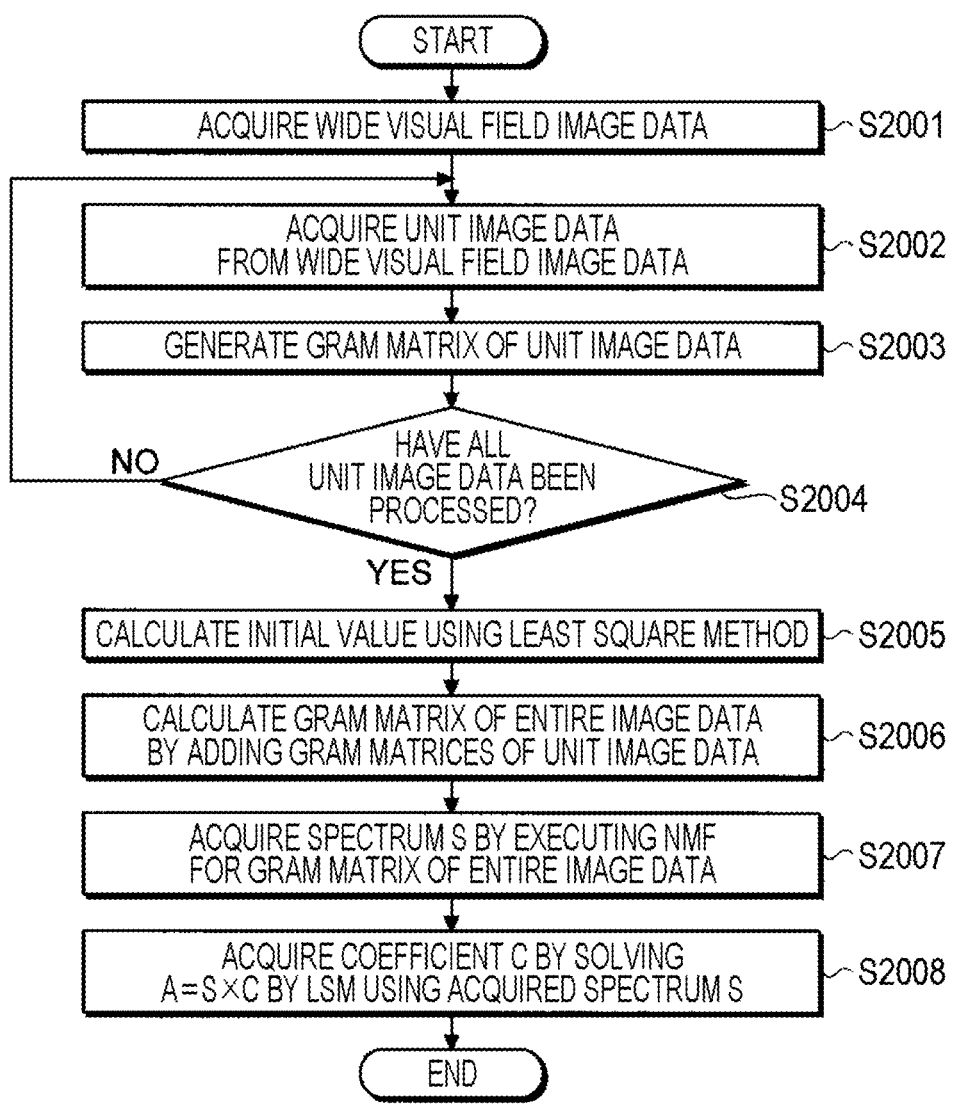
FIG. 37 is a flowchart illustrating an operation example of a processing unit according to the sixth embodiment.

FIG. 37 is a flowchart illustrating an operation example of the processing unit according to the present embodiment. Furthermore, FIGS. 38 to 40 are diagrams for describing processing executed by the processing unit in each step in FIG. 37.

As illustrated in FIG. 37, first, the processing unit 130 according to the present embodiment generates wide visual field image data (see, for example, wide visual field image data A of FIG. 38) of the entire imaging region by tiling visual field image data obtained by imaging each visual field (step S2001).

Figures 38, 39:
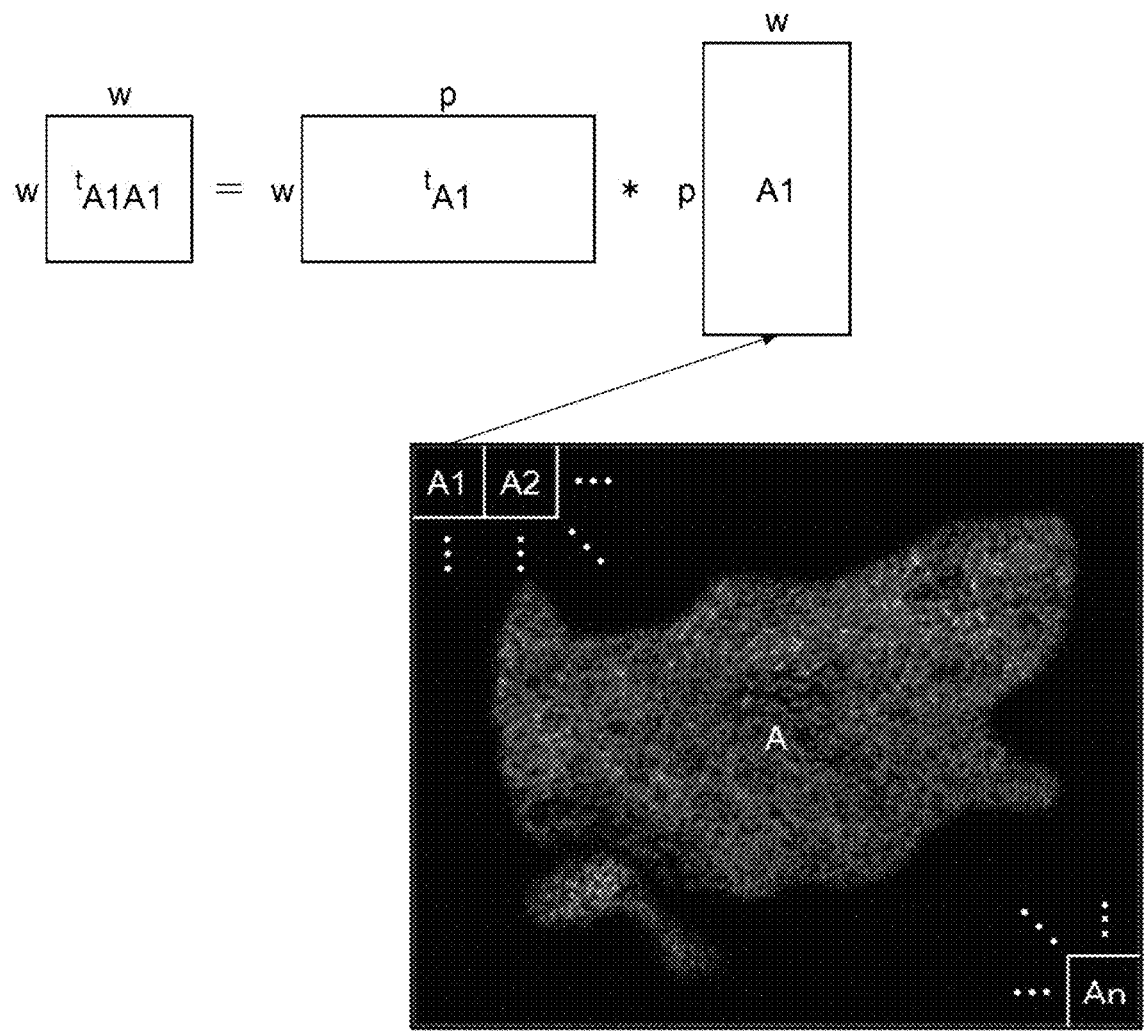
FIG. 38 is a diagram for describing processing executed by the processing unit in each step in FIG. 37 (part 1).
FIG. 39 is a diagram for describing processing executed by the processing unit in each step in FIG. 37 (part 2).

Next, the processing unit 130 acquires unit image data (for example, unit image data Aq (q is an integer of 1 or more and n or less) in FIG. 38), which is a part of the wide visual field image data A, from the wide visual field image data A (step S2002). The unit image data Aq may be variously changed as long as it is image data of a region smaller than the wide visual field image data A, such as image data corresponding to one visual field, image data of a preset size, or the like. Note that the image data of the preset size can include image data of a size determined by a data amount that can be processed at a time by the information processing apparatus 100.

Next, the processing unit 130 generates the Gram matrix $^tA1A1$ of unit image data A1 by multiplying a data matrix (this data matrix is referred to as A1 for clarity of a description) of the acquired unit image data Aq (referred to as unit image data A1 for clarity in the following description) by this transposed matrix $^tA1$, as illustrated in FIG. 38 (step S2003).

Next, the processing unit 130 determines whether or not generation of the Gram matrices $^tA1A1$ to $^tAnAn$ for all unit image data A1 to An has been completed (step S2004), and repeatedly executes steps S2002 to S2004 until the generation of the Gram matrices $^tA1A1$ to $^tAnAn$ for all the unit image data A1 to An is completed (NO in step S2004).

On the other hand, when the generation of the Gram matrices $^tA1A1$ to $^tAnAn$ for all the unit image data A1 to An is completed (YES in step S2004), the processing unit 130 calculates an initial value of the coefficient C from the obtained Gram matrices $^tA1A1$ to $^tAnAn$ by using, for example, a least square method (or a weighted least square method) (step S2005).

Next, the processing unit 130 calculates the Gram matrix $^tAA$ for the wide visual field image data A by adding the generated Gram matrices $^tA1A1$ to $^tAnAn$ (step S2006). Specifically, as described above, the processing unit 130 obtains the Gram matrix $^tAA$ by convoluting each Gram matrix $^tAqAq$ (q is an integer of 1 or more and n or less) as in the above Equation (33) using the subset in which $A(p,w)=A1(p1-pn1,w)+A2(pn1+1-pm,w)+ \ldots +Ao(pm+1-p,w)$.

Next, the processing unit 130 obtains the spectrum S by performing non-negative decomposition of the calculated Gram matrix $^t$AA into $^t$AA=S×E, as illustrated in FIG. 39 (step S2007). Note that the matrix E corresponds to a separated image fluorescence-separated from the wide visual field image data A.

Thereafter, the processing unit 130 acquires the coefficient C, that is, the fluorescence-separated image for every fluorescent molecule (or the autofluorescence-separated image for every autofluorescent molecule) by solving A=S×C by the least square method (or the weighted least square method) using the spectrum S obtained by the NMF for the Gram matrix $^t$AA, as illustrated in FIG. 40 (step S2008), and thereafter ends the present operation.

Note that in the NMF of step S2007, non-negative factorization of data may be executed with a specific spectrum fixed.

(6.4.1. First Modification)

Note that a case where the entire imaging region has been set as a processing target region has been exemplified in FIGS. 37 to 40, but the processing target region is not limited thereto, and can also be set as a region (region of interest) narrower than the entire imaging region. The region of interest may be, for example, a region in which an analysis target is projected, such as a region in which the fluorescence stained specimen 30 (or the specimen 20) exists in the wide visual field image data A, or the like. Furthermore, for example, morphological information of the fluorescence stained specimen 30 or the specimen 20 (for example, a cell, a tissue, or the like) may be used for setting the region of interest. Note that the morphological information may be a bright field image of the same tissue block, a non-stained image, and staining information, or may be, for example, an expression map of a target in the specimen 20. Furthermore, the morphological information may be information generated using a technology such as segmentation (acquisition and labeling of a region in units of one pixel) or the like in an image recognition technology of machine learning.

Figure 41:
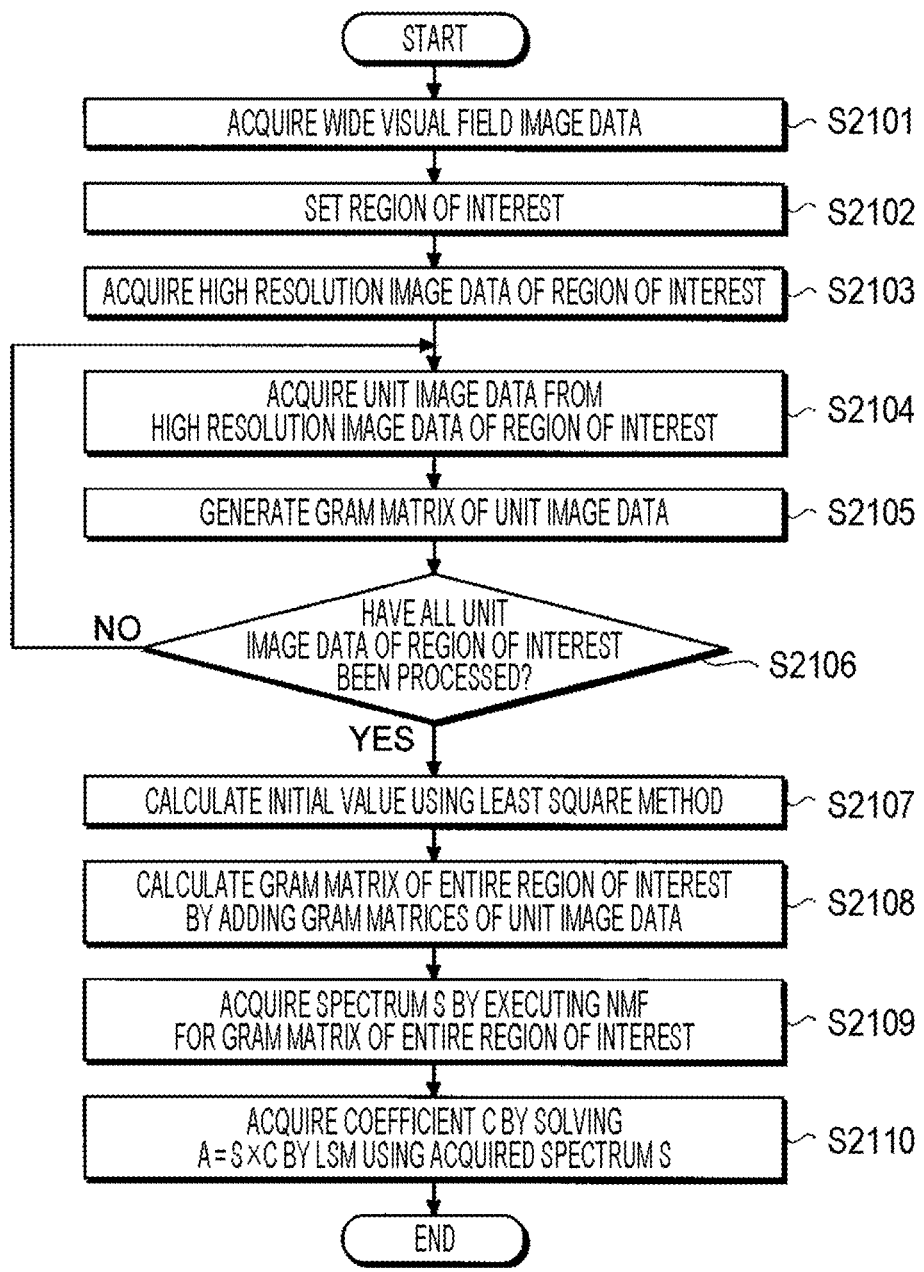
FIG. 41 is a flowchart illustrating an operation example of a processing unit according to a first modification of the sixth embodiment.

FIG. 41 is a flowchart illustrating an operation example of a processing unit according to a first modification of the present embodiment. As illustrated in FIG. 41, first, a processing unit 130 according to the present first modification generates wide visual field image data A of the entire imaging region by tiling visual field image data obtained by imaging each visual field (step S2101). In the present first modification, a resolution of the wide visual field image data A may be lower than a resolution of image data (for example, high resolution image data as described later), which is a processing target.

Next, the processing unit 130 sets a monitoring region, which is a processing target region, in the wide visual field image data A (step S2102). The setting of the region of interest may be executed on the basis of, for example, the morphological information and the like, as described above. However, the setting of the region of interest may be automatically performed by the processing unit 130 on the basis of the morphological information and the like, or may be manually performed by a user.

Next, the processing unit 130 requests, for example, a control unit 150 to acquire high resolution image data of the region of interest (step S2103). In response to such a request, the control unit 150 acquires the high resolution image data of the region of interest by controlling the measurement system (see FIG. 36) described above, an acquisition unit 110, and a storage unit 120. Note that the region of interest may be a range wider than one visual field.

Next, the processing unit 130 generates the Gram matrix $^t$AqAq of each of unit image data Aq acquired from the high resolution image data of the region of interest by performing operations similar to those of, for example, steps S2002 to S2004 of FIG. 37 (steps S2104 to S2106).

Next, the processing unit 130 calculates an initial value of the coefficient C from the obtained gram matrices $^t$A1A1 to $^t$AnAn by using a least square method (or a weighted least square method), similar to, for example, step S2005 of FIG. 37 (step S2107).

Next, the processing unit 130 calculates the Gram matrix $^t$AA for the wide visual field image data A by adding the generated Gram matrices $^t$A1A1 to $^t$AnAn (step S2108), obtains the spectrum S by performing non-negative decomposition of the calculated Gram matrix $^t$AA into $^t$AA=S×E (step S2109), and acquires the coefficient C, that is, the fluorescence-separated image for every fluorescent molecule (or the autofluorescence-separated image for every autofluorescent molecule) by solving A=S×C by the least square method (or the weighted least square method) using the spectrum S obtained by the NMF for the Gram matrix $^t$AA (step S2110), similar to, for example, steps S2006 to S2008 of FIG. 37, and thereafter ends the present operation. Note that in the NMF of step S2109, non-negative factorization of data may be executed with a specific spectrum fixed.

(6.4.2. Second Modification)

Note that in the operation example illustrated in FIG. 37 and the modification thereof (FIG. 41), a case where the wide visual field image data of the entire imaging region or the high resolution image data of the entire region of interest is first acquired, and the unit image data, which are parts of the wide visual field image data or the high resolution image data, are then acquired and processed sequentially has been exemplified, but the present disclosure is not limited thereto, and all or parts of the wide visual field image data or the high resolution image data can also be performed in a pipeline processing manner, for example. Specifically, for example, with respect to processing (for example, steps S2001 to S2004 in FIG. 37 or steps S2103 to S106 in FIG. 41) until the Gram matrix $^t$AqAq of each unit image data is generated, the Gram matrix $^t$AqAq for each unit image data may be generated by using the image data of each visual field output from the measurement system (see FIG. 36) as the unit image data and performing the processing described above in response to an input of the unit image data.

(6.5. Effect)

Regarding an effect expected by the present embodiment, hereinafter, with respect to a process until obtaining solutions of the spectrum S and the coefficient C of A=S×C by the NMF, a case (case 1) where the NMF of the matrix A(p,w) has been performed and a case (case 1) where the NMF of the Gram matrix $^t$AA(w,w) obtained from the matrix A has performed will be described by way of example.

In a case where it is assumed that calculation times are almost equal to each other for the four arithmetic operations and it is assumed that an overhead is not taken into consideration, when a calculation amount of an NMF loop is calculated for each of case 1 and case 2, it is estimated that a processing speed can be increased by about 6000 times in case 2 via the Gram matrix $^t$AA as compared with case 1 where the matrix A is subjected to the NMF.

Furthermore, in a case where calculation of ten to hundred unit image data with the wide visual field image data such as the WSI has been taken into consideration, it is estimated that a processing speed can be increased by about 60,000 to 600,000 times in case 2 where the Gram matrix $^t$AA of the wide visual field image data is calculated by convolving the Gram matrix of each unit image data as compared with case 1 where the wide visual field image data A is subjected to the NMF as it is.

Moreover, in a case where each unit image data is 1024×1024 image data and the number (M) of wavelength channels is hundred points, a maximum memory amount required for expanding data can be reduced to about 1/10,000 in case 2 where the Ggram matrix $^t$AA(w,w) of the matrix A is subjected to the NMF as compared with case 1 where the matrix A(p,w) is subjected to the NMF. In addition, in a case where ten to hundred unit image data have taken into consideration, it is possible to further reduce the memory amount, for example, it becomes possible to reduce the memory amount to 1/100,000 to 1/1,000,000.

Other configurations, operations, and effects may be similar to those in the embodiment described above, and a detailed description thereof will thus be omitted here.

7. Hardware Configuration Example

Figure 42:
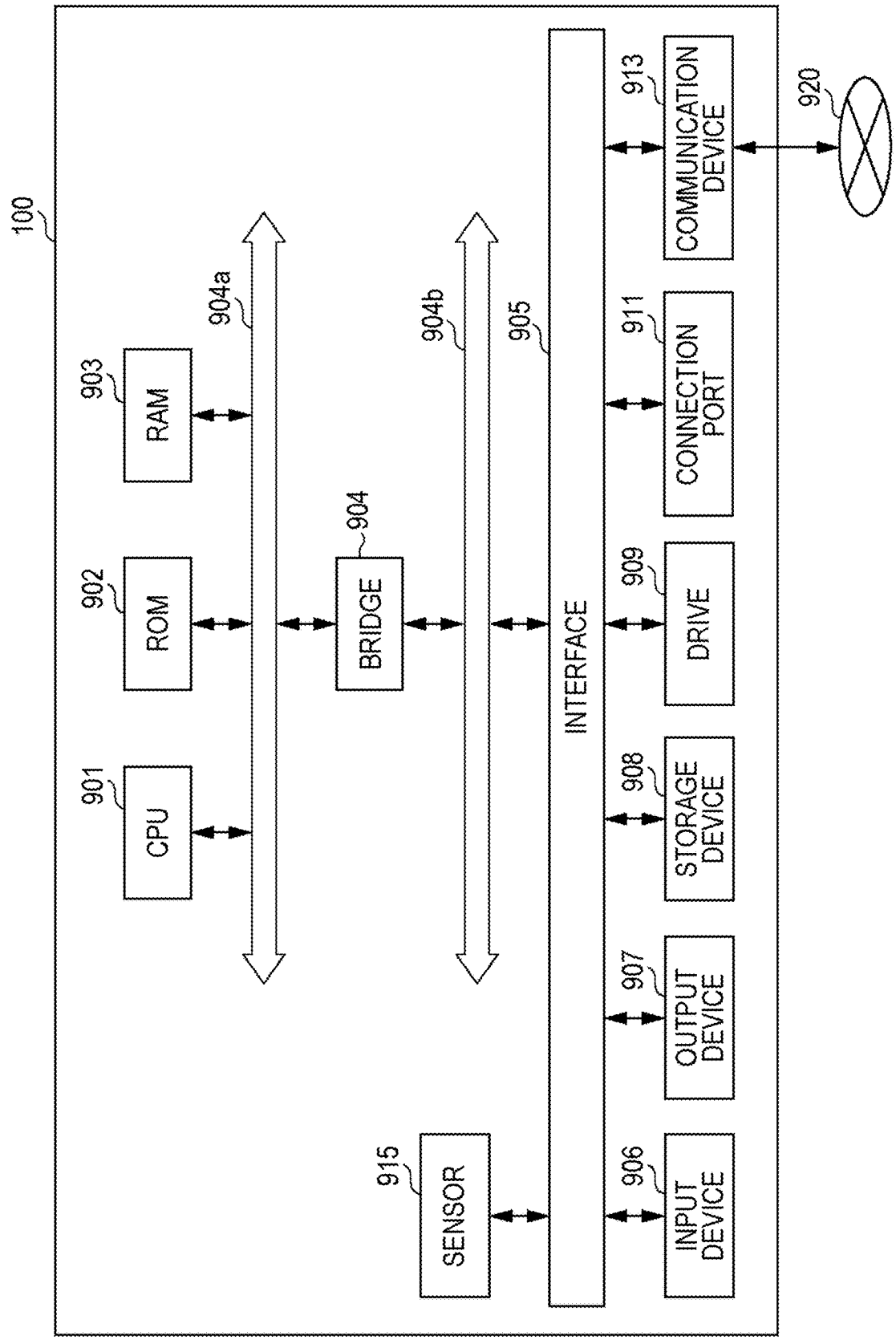
FIG. 42 is a block diagram illustrating a hardware configuration example of an information processing apparatus according to each embodiment and modification.

The modification of the present disclosure has been described hereinabove. Next, a hardware configuration example of an information processing apparatus 100 according to each embodiment and modification will be described with reference to FIG. 42. FIG. 42 is a block diagram illustrating a hardware configuration example of the information processing apparatus 100. Various processing by the information processing apparatus 100 is realized by cooperation between software and hardware described below.

As illustrated in FIG. 42, the information processing apparatus 100 includes a central processing unit (CPU) 901, a read only memory (ROM) 902, a random access memory (RAM) 903, and a host bus 904*a*. Furthermore, the information processing apparatus 100 includes a bridge 904, an external bus 904*b*, an interface 905, an input device 906, an output device 907, a storage device 908, a drive 909, a connection port 911, a communication device 913, and a sensor 915. The information processing apparatus 100 may have a processing circuit such as a digital signal processor (DSP), an application specific integrated chip (ASIC), or the like, instead of or together with the CPU 901.

The CPU 901 functions as an arithmetic processing device and a control device, and generally controls an operation in the information processing apparatus 100 according to various programs. Furthermore, the CPU 901 may be a microprocessor. The ROM 902 stores programs, operation parameters, or the like used by the CPU 901. The RAM 903 temporarily stores programs used in execution of the CPU 901, parameters appropriately changed in the execution, or the like. The CPU 901 can embody at least the processing unit 130 and the control unit 150 of the information processing apparatus 100, for example.

The CPU 901, the ROM 902, and the RAM 903 are connected to each other by the host bus 904*a* including a CPU bus or the like. The host bus 904*a* is connected to the external bus 904*b* such as a peripheral component interconnect/interface (PCI) bus or the like through the bridge 904. Note that the host bus 904*a*, the bridge 904, and the external bus 904*b* do not necessarily need to be separately configured, and functions of the host bus 904*a*, the bridge 904, and the external bus 904*b* may be mounted on a single bus.

The input device 906 is realized by, for example, a device such as a mouse, a keyboard, a touch panel, a button, a microphone, a switch, a lever, or the like, to which information is input by a practitioner. Furthermore, the input device 906 may be, for example, a remote control device using infrared rays or other electric waves, or may be an external connection device such as a mobile phone, a personal digital assistant (PDA), or the like corresponding to an operation of the information processing apparatus 100. Moreover, the input device 906 may include, for example, an input control circuit or the like that generates an input signal on the basis of the information input by the practitioner using the input means described above and outputs the generated input signal to the CPU 901. The practitioner can input various data to the information processing apparatus 100 or instruct the information processing apparatus 100 to perform a processing operation by operating the input device 906. The input device 906 can embody at least the operation unit 160 of the information processing apparatus 100, for example.

The output device 907 is a device that can visually or auditorily notify the practitioner of the acquired information. Such a device includes a display device such as a cathode ray tube (CRT) display device, a liquid crystal display device, a plasma display device, an electroluminescence (EL) display device, a lamp, or the like, a sound output device such as a speaker, a headphone, or the like, a printer device, or the like. The output device 907 can embody at least the display unit 140 of the information processing apparatus 100, for example.

The storage device 908 is a device for storing data. The storage device 908 is realized by, for example, a magnetic storage unit device such as a hard disk drive (HDD), a semiconductor storage device, an optical storage device, a magneto-optical storage device, or the like. The storage device 908 may include a storage medium, a recording device recording data in the storage medium, a reading device reading data from the storage medium, a deleting device deleting data recorded in the storage medium, and the like. The storage device 908 stores programs executed by the CPU 901 or various data, various data acquired from the outside, and the like. The storage device 908 can embody at least the storage unit 120 of the information processing apparatus 100, for example.

The drive 909 is a reader/writer for the storage medium, and is embedded in or externally mounted on the information processing apparatus 100. The drive 909 reads information recorded in a removable storage medium such as a magnetic disk, an optical disk, a magneto-optical disk, a semiconductor memory, or the like, that is mounted, and outputs the read information to the RAM 903. Furthermore, the drive 909 can write information to the removable storage medium.

The connection port 911 is an interface connected to an external device, and is a connection port to an external device capable of transmitting data by, for example, a universal serial bus (USB) or the like.

The communication device 913 is, for example, a communication interface including a communication device or the like for being connected to a network 920. The communication device 913 is, for example, a communication card or the like for wired or wireless local area network (LAN), long term evolution (LTE), Bluetooth (registered trademark), or wireless USB (WUSB). Furthermore, the communication device 913 may be a router for optical communication, a router for asymmetric digital subscriber line (ADSL), modems for various communication, or the like. The communication device 913 can transmit and receive a signal and the like, for example, to or from the Internet or another communication device according to a predetermined protocol such as, for example, transmission control protocol/Internet protocol (TCP/IP) and the like.

The sensor 915 includes a sensor (for example, an imaging element or the like) capable of acquiring a spectrum in the present embodiment, and may include other sensors (for example, an acceleration sensor, a gyro sensor, a geomagnetic sensor, a pressure sensor, a sound sensor, a distance measuring sensor, or the like). The sensor 915 can embody at least the fluorescence signal acquisition unit 112 of the information processing apparatus 100, for example.

Note that the network 920 is a wired or wireless transmission path of information transmitted from a device connected to the network 920. For example, the network 920 may include a public network such as the Internet, a telephone network, a satellite communication network, or the like, various local area networks (LANs) including Ethernet (registered trademark), a wide area network (WAN), or the like. Furthermore, the network 920 may include a dedicated line network such as the Internet protocol-virtual private network (IP-VPN) or the like.

The hardware configuration example capable of realizing the functions of the information processing apparatus 100 has been described hereinabove. Each component described above may be realized using a general-purpose member or may be realized by hardware specialized for the function of each component. Therefore, it is possible to appropriately change the hardware configuration to be used according to a technical level at the time of carrying out the present disclosure.

Note that a computer program for realizing each function of the information processing apparatus 100 as described above can be created and mounted in a personal computer (PC) or the like. Furthermore, a computer readable recording medium in which such a computer program is stored can be provided. The recording medium includes, for example, a magnetic disk, an optical disk, a magneto-optical disk, a flash memory, and the like. Furthermore, the computer program described above may be distributed through, for example, a network without using the recording medium.

8. Conclusion

As described above, the information processing apparatus 100 according to the first embodiment of the present disclosure irradiates the fluorescence stained specimen 30 with the plurality of excitation lights having the different wavelengths, acquires the plurality of fluorescence spectra corresponding to each of the plurality of excitation lights, corrects the plurality of fluorescence spectra on the basis of the intensities of the excitation lights, and links at least parts of the plurality of fluorescence spectra to each other in the wavelength direction to generate the linked fluorescence spectrum. Then, the information processing apparatus 100 extracts the spectra for every fluorescent substance from the reference spectrum including the linked autofluorescence reference spectrum in which the spectra of the autofluorescent substances are linked to each other in the wavelength direction and the linked fluorescence reference spectrum in which the spectra of the fluorescent substances are linked to each other in the wavelength direction. Then, the information processing apparatus 100 separates the linked fluorescence spectrum for every molecule using the extracted spectra for every fluorescent substance.

As such, the information processing apparatus 100 can output a unique spectrum as a separation result (separation result does not differ for every excitation wavelength) by executing the fluorescence separation processing using the reference spectrum linked in the wavelength direction. Therefore, a practitioner can more easily obtain a correct spectrum. Furthermore, the reference spectrum (linked autofluorescence reference spectrum) regarding autofluorescence used for separation is automatically acquired, and the fluorescence separation processing is performed, such that the practitioner does not need to extract a spectrum corresponding to the autofluorescence from an appropriate space of a non-stained section.

Furthermore, the information processing apparatus 100 according to the second embodiment of the present disclosure performs the fluorescence separation processing using the linked autofluorescence reference spectrum actually measured for every specimen 20. Therefore, the information processing apparatus 100 can realize more accurate fluorescence separation processing.

Moreover, the information processing apparatus 100 according to the modification of the present disclosure separates the linked fluorescence spectrum for every fluorescent substance using the reference spectrum including the linked autofluorescence reference spectrum and the linked fluorescence reference spectrum, calculated on the basis of the number of fluorescent molecules or the number of antibodies bound to the fluorescent molecules. Therefore, the information processing apparatus 100 can calculate the number of fluorescent molecules or the number of antibodies in a fluorescence stained specimen 30 as a result of fluorescence separation processing.

Furthermore, the information processing apparatus 100 according to the third embodiment of the present disclosure solves the NMF with the specimen image acquired from the stained section as the matrix A. Therefore, it becomes possible to extract the fluorescence spectra for every fluorescent substance directly from the stained section while significantly reducing a time and a work cost required for the fluorescence separation processing. In addition, in the third embodiment of the present disclosure, the fluorescence spectrum is extracted for every fluorescent substance from the specimen image obtained from the same stained section, and it becomes thus possible to acquire a more accurate fluorescence separation result as compared with, for example, a case of using an autofluorescence spectrum obtained from the non-stained section different from the stained section.

Hereinabove, the preferred embodiments of the present disclosure have been described in detail with reference to the accompanying drawings, but a technical scope of the present disclosure is not limited to such examples. It will be apparent to those skilled in the art of the present disclosure that various modifications or alterations can be conceived within the scope of the technical idea described in the claims, and it is naturally understood that these modifications or alterations also fall within the technical scope of the present disclosure.

Furthermore, the effects described in the present specification are merely illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

An information processing apparatus including:

a fluorescence signal acquisition unit that acquires a plurality of fluorescence spectra corresponding to each of a plurality of excitation lights having different wavelengths and irradiated to a fluorescence stained specimen, the fluorescence stained specimen being created by staining a specimen with a fluorescence reagent;

a link unit that generates a linked fluorescence spectrum by linking at least parts of the plurality of fluorescence spectra to each other in a wavelength direction;

a separation unit that separates the linked fluorescence spectrum into spectra for every fluorescent substance using a reference spectrum including a linked autofluorescence reference spectrum in which spectra of autofluorescent substances in the specimen are linked to each other in the wavelength direction and a linked fluorescence reference spectrum in which the spectra of the fluorescent substances in the fluorescence stained specimen are linked to each other in the wavelength direction; and an extraction unit that updates the linked autofluorescence reference spectrum using the spectra for every fluorescent substance separated by the separation unit.

(2)

The information processing apparatus according to the above (1), in which the extraction unit extracts the linked autofluorescence reference spectrum from a linked autofluorescence spectrum generated by linking at least parts of a plurality of autofluorescence spectra to each other in the wavelength direction, the plurality of autofluorescence spectra being acquired by irradiating a section with the plurality of excitation lights, and the section being the same as or similar to the specimen.

(3)

The information processing apparatus according to the above (2), in which the extraction unit extracts the linked autofluorescence reference spectrum by performing non-negative matrix factorization using the linked autofluorescence spectrum generated by linking at least parts of a plurality of autofluorescence spectra to each other in the wavelength direction, the plurality of autofluorescence spectra being acquired by irradiating the section with the plurality of excitation lights, and the section being the same as or similar to the specimen.

(4)

The information processing apparatus according to the above (3), in which the extraction unit extracts the linked autofluorescence reference spectrum by setting an initial value in the non-negative matrix factorization using an autofluorescence spectrum acquired in advance.

(5)

The information processing apparatus according to any one of the above (1) to (4), in which the separation unit separates the linked fluorescence spectrum into the spectra for every fluorescent substance using any one of a least square method or a weighted least square method using the reference spectrum.

(6)

The information processing apparatus according to the above (5), in which the separation unit separates the linked fluorescence spectrum into the spectra for every fluorescent substance by setting a matrix representing the linked fluorescence spectrum as Signal, setting a matrix representing the reference spectrum as St, setting a matrix representing a color mixture rate of each of the reference spectra in the linked fluorescence spectrum as a, and calculating the matrix a representing the color mixture rate when a sum of squares of values represented by the following Equation (34) becomes minimum:

[Equation 34]

$$\text{Signal} - a*St \qquad (34).$$

(7)

The information processing apparatus according to the above (6), in which the separation unit sets an upper limit value at which weighting is not performed as an Offset value and replaces the matrix St representing the reference spectrum in Equation (34) with a matrix St_ represented by the following Equation (35), in a case of using the weighted least square method:

[Equation 35]

$$St\_ = \frac{St}{\text{Signal} + \text{Offset value}}. \qquad (35)$$

(8)

The information processing apparatus according to any one of the above (1) to (7), in which the separation unit separates the linked fluorescence spectrum into the spectra for every fluorescent substance using the reference spectrum including the linked autofluorescence reference spectrum and the linked fluorescence reference spectrum, which are calculated on the basis of the number of fluorescent molecules or the number of antibodies bound to the fluorescent molecules.

(9)

The information processing apparatus according to the above (8), in which the separation unit separates the linked fluorescence spectrum into the spectra for every fluorescent substance using the reference spectrum including the linked autofluorescence reference spectrum and the linked fluorescence reference spectrum for each of the fluorescent molecules or for each of the antibodies.

(10)

The information processing apparatus according to any one of the above (1) to (9), in which the separation unit separates the linked fluorescence spectrum into the spectra for every fluorescent substance by performing the non-negative matrix factorization on the linked fluorescence spectra.

(11)

The information processing apparatus according to the above (10), in which the separation specifies a correspondence between the fluorescent substance and the extracted spectrum by calculating a product moment correlation coefficient with an initial value used for the non-negative matrix factorization for a spectrum extracted by the non-negative matrix factorization.

(12)

The information processing apparatus according to any one of the above (1) to (11), in which the link unit corrects the plurality of fluorescence spectra, and links at least parts of the plurality of fluorescence spectra after being corrected to each other in the wavelength direction.

(13)

The information processing apparatus according to the above (12), in which the link unit corrects intensities of the plurality of fluorescence spectra.

(14)

The information processing apparatus according to the above (13), in which the link unit corrects the intensities of the plurality of fluorescence spectra by dividing the plurality of fluorescence spectra by an excitation power density.

(15)

The information processing apparatus according to any one of the above (12) to (14), in which the link unit corrects a wavelength resolution of at least one of the plurality of fluorescence spectra to a wavelength resolution different from a wavelength resolution of another fluorescence spectrum.

(16)

The information processing apparatus according to any one of the above (1) to (15), in which the link unit extracts fluorescence spectra in wavelength bands including intensity peaks from each of the plurality of fluorescence spectra, and generates the linked fluorescence spectrum by linking the extracted fluorescence spectra to each other.

(17)

The information processing apparatus according to any one of the above (1) to (16), in which the linked fluorescence spectrum is discontinuously linked in the wavelength direction among the plurality of fluorescence spectra.

(18)

The information processing apparatus according to any one of the above (1) to (17), in which the fluorescence signal acquisition unit acquires first image data which is obtained by imaging the fluorescence stained specimen and includes the plurality of fluorescence spectra, and the separation unit separates the first image data into the spectra for every fluorescent substance by performing the non-negative matrix factorization on a first Gram matrix of the first image data.

(19)

The information processing apparatus according to the above (18), in which the separation unit calculates the first Gram matrix by convolving a second Gram matrix of each of a plurality of second image data obtained by dividing the first image data.

(20)

The information processing apparatus according to any one of the above (1) to (17), in which the fluorescence signal acquisition unit acquires first image data obtained by imaging the specimen that is non-stained and irradiated with the excitation light, and the extraction unit extracts the spectra for every autofluorescent substance from the first image data by performing the non-negative matrix factorization on a first Gram matrix of the first image data, and updates the linked autofluorescence reference spectrum using the extracted spectra for every autofluorescent substance.

(21)

The information processing apparatus according to the above (20), in which the extraction unit calculates the first Gram matrix by convolving a second Gram matrix of each of a plurality of second image data obtained by dividing the first image data.

(22)

A microscope system including: a light source that irradiates a fluorescence stained specimen with a plurality of excitation lights having different wavelengths, the fluorescence stained specimen being created by staining a specimen with a fluorescence reagent; an imaging apparatus that acquires a plurality of fluorescence spectra corresponding to each of the plurality of excitation lights; and a software used for processing using the plurality of fluorescence spectra, in which the software is executed on an information processing apparatus, and realizes:

generating a linked fluorescence spectrum by linking at least parts of the plurality of fluorescence spectra to each other in a wavelength direction;

separating the linked fluorescence spectrum into spectra for every fluorescent substance using a reference spectrum including a linked autofluorescence reference spectrum in which spectra of autofluorescent substances in the specimen are linked to each other in the wavelength direction and a linked fluorescence reference spectrum in which the spectra of the fluorescent substances in the fluorescence stained specimen are linked to each other in the wavelength direction; and updating the linked autofluorescence reference spectrum using the separated spectra for every fluorescent substance.

REFERENCE SIGNS LIST

10 Fluorescence reagent
11 Reagent identification information
20 Specimen
21 Specimen identification information
30 Fluorescence stained specimen
100 Information processing apparatus
110 Acquisition unit
111 Information acquisition unit
112 Fluorescence signal acquisition unit
120 Storage unit
121 Information storage unit
122 Fluorescence signal storage unit
130 Processing unit
131 Link unit
132 Separation processing unit
133 Image generation unit
140 Display unit
150 Control unit
160 Operation unit
200 Database

The invention claimed is:

1. An information processing apparatus comprising:
a fluorescence signal acquisition unit that acquires a plurality of fluorescence spectra corresponding to each of a plurality of excitation lights having different wavelengths and irradiated to a fluorescence stained specimen, the fluorescence stained specimen being created by staining a specimen with a fluorescence reagent;
a link unit that generates a linked fluorescence spectrum by linking at least parts of the plurality of fluorescence spectra to each other in a wavelength direction, wherein data segments of a predetermined spectral width are extracted from respective ones of the plurality of fluorescence spectra and the extracted data segments are linked together end-to-end in the wavelength direction to form the linked fluorescence spectrum, and wherein wavelengths at boundaries between the linked together data segments are not continuous;
a separation unit that separates the linked fluorescence spectrum into spectra for every fluorescent substance using a reference spectrum including a linked autofluorescence reference spectrum in which spectra of autofluorescent substances in the specimen are linked to each other in the wavelength direction and a linked fluorescence reference spectrum in which the spectra of the fluorescent substances in the fluorescence stained specimen are linked to each other in the wavelength direction; and an extraction unit that adjusts the linked autofluorescence reference spectrum using the separated spectra for every fluorescent substance, wherein the separation unit includes a first separation stage and a second separation stage, wherein the first separation stage is configured to generate a first separation result based on the linked fluorescence spectrum, wherein the extraction unit is configured to generate an adjusted linked autofluorescence reference spectrum by adjusting the linked autofluorescence reference spectrum based on the first separation result, wherein the second separation stage is configured to generate a second separation result based on the linked fluorescence spectrum and the adjusted linked autofluorescence reference spectrum, wherein the separation unit separates the linked fluorescence spectrum into the spectra for every fluorescent substance using any one of a least square method or a weighted least square method using the reference spectrum, wherein the separation unit separates the linked fluorescence spectrum into the spectra for every fluorescent substance by setting a matrix representing the linked fluorescence spectrum as Signal, setting a matrix representing the reference spectrum as St, setting a matrix representing a color mixture rate of each of the reference spectra in the linked fluorescence spectrum as a, and calculating the matrix a representing the color mixture rate when a sum of squares of values represented by the following Equation (1) becomes minimum:

[Equation 1]

$$\text{Signal} - a*St \quad (1),$$

and wherein the separation unit sets an upper limit value at which weighting is not performed as an Offset value and replaces the matrix St representing the reference spectrum in Equation (1) with a matrix St represented by the following Equation (2), in a case of using the weighted least square method:

[Equation 2]

$$St\_ = \frac{St}{\text{Signal} + \text{Offset value}}. \quad (2)$$

2. The information processing apparatus according to claim 1, wherein
the extraction unit extracts the linked autofluorescence reference spectrum from a linked autofluorescence spectrum generated by linking at least parts of a plurality of autofluorescence spectra to each other in the wavelength direction, the plurality of autofluorescence spectra being acquired by irradiating a section with the plurality of excitation lights, and the section being the same as or similar to the specimen.

3. The information processing apparatus according to claim 2, wherein
the extraction unit extracts the linked autofluorescence reference spectrum by performing non-negative matrix factorization using the linked autofluorescence spectrum generated by linking at least parts of a plurality of autofluorescence spectra to each other in the wavelength direction, the plurality of autofluorescence spectra being acquired by irradiating the section with the plurality of excitation lights, and the section being the same as or similar to the specimen.

4. The information processing apparatus according to claim 3, wherein
the extraction unit extracts the linked autofluorescence reference spectrum by setting an initial value in the non-negative matrix factorization using an autofluorescence spectrum acquired in advance.

5. The information processing apparatus according to claim 1, wherein
the separation unit separates the linked fluorescence spectrum into the spectra for every fluorescent substance using the reference spectrum including the linked autofluorescence reference spectrum and the linked fluorescence reference spectrum, which are calculated on a basis of the number of fluorescent molecules or the number of antibodies bound to the fluorescent molecules, or the reference spectrum including the linked autofluorescence reference spectrum and the linked fluorescence reference spectrum for each of the fluorescent molecules or for each of the antibodies.

6. The information processing apparatus according to claim 1, wherein
the separation unit separates the linked fluorescence spectrum into the spectra for every fluorescent substance by performing non-negative matrix factorization on the linked fluorescence spectra.

7. The information processing apparatus according to claim 6, wherein
the separation unit specifies a correspondence between the fluorescent substance and the extracted spectrum by calculating a product moment correlation coefficient with an initial value used for the non-negative matrix factorization for a spectrum extracted by the non-negative matrix factorization.

8. The information processing apparatus according to claim 1, wherein
the link unit corrects the plurality of fluorescence spectra, and links at least parts of the plurality of fluorescence spectra after being corrected to each other in the wavelength direction.

9. The information processing apparatus according to claim 8, wherein
the link unit corrects intensities of the plurality of fluorescence spectra.

10. The information processing apparatus according to claim 9, wherein
the link unit corrects the intensities of the plurality of fluorescence spectra by dividing the plurality of fluorescence spectra by an excitation power density.

11. The information processing apparatus according to claim 8, wherein
the link unit corrects a wavelength resolution of at least one of the plurality of fluorescence spectra to a wavelength resolution different from a wavelength resolution of another fluorescence spectrum.

12. The information processing apparatus according to claim 1, wherein
the link unit extracts fluorescence spectra in wavelength bands including intensity peaks from each of the plurality of fluorescence spectra, and generates the linked fluorescence spectrum by linking the extracted fluorescence spectra to each other.

13. The information processing apparatus according to claim 1, wherein
the linked fluorescence spectrum is discontinuously linked in the wavelength direction among the plurality of fluorescence spectra.

14. The information processing apparatus according to claim 1, wherein
the fluorescence signal acquisition unit acquires first image data which is obtained by imaging the fluorescence stained specimen and includes the plurality of fluorescence spectra, and
the separation unit separates the first image data into the spectra for every fluorescent substance by performing non-negative matrix factorization on a first Gram matrix of the first image data.

15. The information processing apparatus according to claim 14, wherein
the separation unit calculates the first Gram matrix by convolving a second Gram matrix of each of a plurality of second image data obtained by dividing the first image data.

16. The information processing apparatus according to claim 1, wherein
the fluorescence signal acquisition unit acquires first image data by imaging the specimen that is non-stained and irradiated with the excitation light, and
the extraction unit extracts the spectra for every autofluorescent substance from the first image data by performing non-negative matrix factorization on a first Gram matrix of the first image data, and updates the linked autofluorescence reference spectrum using the extracted spectra for every autofluorescent substance.

17. A microscope system comprising: a light source that irradiates a fluorescence stained specimen with a plurality of excitation lights having different wavelengths, the fluorescence stained specimen being created by staining a specimen with a fluorescence reagent; an imaging apparatus that acquires a plurality of fluorescence spectra corresponding to each of the plurality of excitation lights; and a non-transitory computer readable medium storing instructions that, when executed by processing circuitry, perform a process using the plurality of fluorescence spectra, the process comprising:
generating a linked fluorescence spectrum by linking at least parts of the plurality of fluorescence spectra to each other in a wavelength direction, wherein data segments of a predetermined spectral width are extracted from respective ones of the plurality of fluorescence spectra and the extracted data segments are linked together end-to-end in the wavelength direction to form the linked fluorescence spectrum, and wherein wavelengths at boundaries between the linked together data segments are not continuous;
separating the linked fluorescence spectrum into spectra for every fluorescent substance using a reference spectrum including a linked autofluorescence reference spectrum in which spectra of autofluorescent substances in the specimen are linked to each other in the wavelength direction and a linked fluorescence reference spectrum in which the spectra of the fluorescent substances in the fluorescence stained specimen are linked to each other in the wavelength direction; and
adjusting the linked autofluorescence reference spectrum using the separated spectra for every fluorescent substance, wherein separating the linked fluorescence spectrum for every fluorescent substance includes a first separating step and a second separating step, wherein the first separating step includes generating a first separation result based on the linked fluorescence spectrum, wherein the adjusting step includes generating an adjusted linked autofluorescence reference spectrum by adjusting the linked autofluorescence reference spectrum based on the first separation result, wherein the second separating step includes generating a second separation result based on the linked fluorescence spectrum and the adjusted linked autofluorescence reference spectrum, wherein
the separation unit separates the linked fluorescence spectrum into the spectra for every fluorescent substance using any one of a least square method or a weighted least square method using the reference spectrum, wherein
the separation unit separates the linked fluorescence spectrum into the spectra for every fluorescent substance by setting a matrix representing the linked fluorescence spectrum as Signal, setting a matrix representing the reference spectrum as St, setting a matrix representing a color mixture rate of each of the reference spectra in the linked fluorescence spectrum as a, and calculating the matrix a representing the color mixture rate when a sum of squares of values represented by the following Equation (1) becomes minimum:

[Equation 1]

$$\text{Signal} - a*St \quad (1),$$ and wherein the separation unit sets an upper limit value at which weighting is not performed as an Offset value and replaces the matrix St representing the reference spectrum in Equation (1) with a matrix St represented by the following Equation (2), in a case of using the weighted least square method:

[Equation 2]

$$St\_ = \frac{St}{\text{Signal} + \text{Offset value}}. \quad (2)$$

* * * * *